(12) United States Patent  
Rautio

(10) Patent No.: US 11,416,657 B2  
(45) Date of Patent: Aug. 16, 2022

(54) METHOD FOR SIMULATING VERTICALLY ORIENTED CURRENT IN A STRUCTURE

(71) Applicant: James C. Rautio, Phoenix, NY (US)

(72) Inventor: James C. Rautio, Phoenix, NY (US)

(73) Assignee: Sonnet Software, Inc.

(*) Notice: Subject to any disclaimer, the term of this patent is extended or adjusted under 35 U.S.C. 154(b) by 151 days.

(21) Appl. No.: 16/825,500

(22) Filed: Mar. 20, 2020

(65) Prior Publication Data

US 2021/0312106 A1  Oct. 7, 2021

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .............................. G06F 30/20; G06F 2111/10
See application file for complete search history.

(56) References Cited

U.S. PATENT DOCUMENTS

| | | | | |
|---|---|---|---|---|
| 6,129,459 A * | 10/2000 | Kishimoto | ........... | G01R 31/002 324/260 |
| 6,163,762 A * | 12/2000 | Rautio | .................... | G06T 11/40 703/5 |
| 2011/0082681 A1 * | 4/2011 | Teramae | ............... | G06F 30/367 703/14 |

OTHER PUBLICATIONS

Rautio JC. A conformal mesh for efficient planar electromagnetic analysis. IEEE transactions on microwave theory and techniques. Jan. 30, 2004;52(1):257-64. (Year: 2004).*

Rautio BJ, Okhmatovski VI, Cangellaris AC, Rautio JC, Lee JK. The unified-FFT algorithm for fast electromagnetic analysis of planar integrated circuits printed on layered media inside a rectangular enclosure. IEEE transactions on microwave theory and techniques. Apr. 14, 2014;62(5):1112-21. (Year: 2014).*

Rautio JC, Thelen M. A volume current based method of moments analysis of shielded planar 3-D circuits in layered media. In2020 IEEE/MTT-S International Microwave Symposium (IMS) Aug. 4, 2020 (pp. 146-149). IEEE. (Year: 2019).*

* cited by examiner

*Primary Examiner* — Chuen-Meei Gan
(74) *Attorney, Agent, or Firm* — Bond Schoeneck & King, PLLC; George McGuire; Jonathan Gray

(57) ABSTRACT

A computer-implemented method of simulating a vertically-oriented current distribution of current flowing through a plurality of layers of one or more three-dimensional conductors embedded in a shielded multi-layered dielectric includes the steps of dividing portions of the circuit into subsections, the portions containing z-directed current into rectangular prisms; independently modeling a current distribution within each subsection, and, specifically, within the rectangular prisms, independently modeling a basis function of linearly changing or uniform current along the z-axis; independently determining the fields resulting from such assumed basis functions; determining a voltage induced by such determined fields, corresponding to a transfer impedance or transfer admittance of the subsection; and calculating a current distribution in one or more conductors according to the transfer impedance or transfer admittance of each subsection and an assumed voltage across each subsection.

20 Claims, 8 Drawing Sheets

METHOD FOR SIMULATING VERTICALLY ORIENTED CURRENT IN A STRUCTURE

CROSS REFERENCE

This application claims the benefit of U.S. Provisional Patent Application No. 62/848,234, filed on May 15, 2019 and of U.S. Provisional Patent Application No. 62/924,882, filed on Oct. 23, 2019. Both provisional applications are herein incorporated by reference in their entirety.

BACKGROUND

This disclosure is related to a computer program product and a computer-implemented method of simulating a current distribution in an arbitrary circuit or other structure embedded in shielded layered media, and, more specifically, simulating the vertically-directed current in an such an arbitrary circuit or structure embedded in a shielded multi-layered media through the use of tapered vias.

SUMMARY

All examples and features mentioned below can be combined in any technically possible way.

According to an aspect, a computer-implemented method of simulating a vertically-oriented current distribution of current flowing through a plurality of layers of a three-dimensional structure embedded in a shielded multi-layered dielectric, includes the steps of: dividing the structure into a plurality of subsections, wherein at least one portion of the structure having vertically-oriented current is divided into at least one rectangular prism subsection having a first surface disposed perpendicular to a z-axis and a second surface disposed perpendicular to the z-axis; independently assigning a current in each of the subsections, wherein z-directed current in the at least one rectangular prism subsection linearly changes from a first value at the first surface of the rectangular prism subsection to a second value at the second surface of the rectangular prism subsection; wherein the first value is different from the second value; calculating an induced voltage in each of the plurality of subsections resulting from each independently modeled current, the induced voltage in each of the plurality of subsections corresponding to a transfer impedance or transfer admittance; and calculating a current distribution in one or more conductors according to the transfer impedance or transfer admittance of each subsection and an assumed voltage across each subsection.

In an example, the assumed voltage is zero except where a voltage source is coupled.

In an example, the assumed voltage is proportional to the current in the subsection.

In an example, the first value is higher than the second value.

In an example, the first value is lower than the second value.

In an example, z-directed current in a second rectangular prism subsection is constant throughout.

In an example, both the first predetermined value and second predetermined value are nonzero.

In an example, at least one portion of the structure carrying horizontal current is divided into volume rooftop subsections.

In an example, at least one portion of the structure carrying horizontal current is divided into rooftop subsections.

In an example, the current distribution is calculated via a matrix inversion.

According to another aspect, a computer program product stored on a non-transitory computer-readable medium includes a set of non-transitory computer-readable instructions for simulating a vertically-oriented current distribution of current flowing through a plurality of layers of a three-dimensional structure embedded in a shielded multi-layered dielectric, the instructions including the steps of: dividing the structure into a plurality of subsections, wherein at least one portion of the structure having vertically-oriented current is divided into at least one rectangular prism subsection having a first surface disposed perpendicular to a z-axis and a second surface disposed perpendicular to the z-axis; independently assigning a current in each of the subsections, wherein z-directed current in the at least one rectangular prism subsection linearly changes from a first value at the first surface of the rectangular prism subsection to a second value at the second surface of the rectangular prism subsection; wherein the first value is different from the second value; calculating an induced voltage in each of the plurality of subsections resulting from each independently modeled current, the induced voltage in each of the plurality of subsections corresponding to a transfer impedance or transfer admittance; and calculating a current distribution in one or more conductors according to the transfer impedance or transfer admittance of each subsection and an assumed voltage across each subsection.

In an example, the assumed voltage is zero except where a voltage source is coupled.

In an example, the assumed voltage is proportional to the current in the subsection.

In an example, the first value is higher than the second value.

In an example, the first value is lower than the second value.

In an example, z-directed current in a second rectangular prism subsection is constant throughout.

In an example, both the first predetermined value and second predetermined value are nonzero.

In an example, at least one portion of the structure carrying horizontal current is divided into volume rooftop subsections.

In an example, at least one portion of the structure carrying horizontal current is divided into rooftop subsections.

In an example, the current distribution is calculated via a matrix inversion.

The details of one or more implementations are set forth in the accompanying drawings and the description below. Other features, objects, and advantages will be apparent from the description and the drawings, and from the claims.

FIGURES

In the drawings, like reference characters generally refer to the same parts throughout the different views. Also, the drawings are not necessarily to scale, emphasis instead generally being placed upon illustrating the principles of the various aspects.

DETAILED DESCRIPTION

The simulation of arbitrary circuits and structures are an important part of any electrical design process. Without simulation, such structures must be fabricated and individually tested before being redesigned, fabricated, and tested again. Simulation allows such circuits to be redesigned without requiring repeated and costly, time consuming fabrication and testing. However, the simulation process itself can be time consuming, requiring hours, even days, to simulate a single complex circuit with meaningful accuracy (a 50 frequency analysis might require 50 hours or more to complete). This length of simulation time bogs down design time, slows time-to-market, and, ultimately, represents a costly proposition for electrical design.

Figure 1:
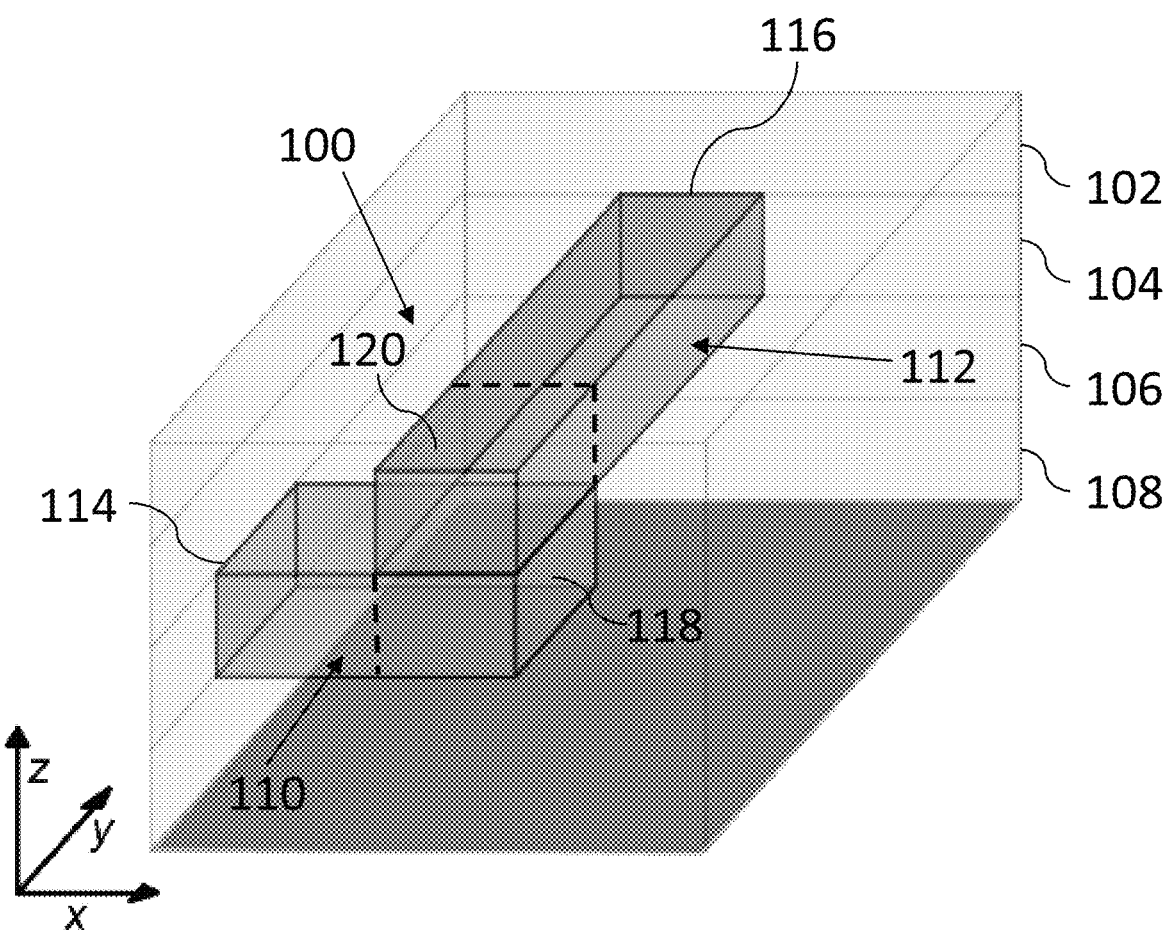
FIG. 1 shows a perspective view of a circuit disposed in a shielded multi-layered media, according an example.

Referring now to FIG. 1 there is shown a simple, illustrative three-dimensional structure 100 in shielded (i.e. surrounded on all sides by a conductor) multi-layered media. The multi-layered media, in this example, is comprised of four dielectric layers 102, 104, 106, 108, as indicated on the back two sides of the box, although any number of layers greater than zero may be used. Typically, the layers have different thicknesses, dielectric constants, loss tangents, conductivities, and other constitutive parameters, but they can also be the same. Furthermore, the layers are planar and have top and bottom surfaces that are mutually parallel. The sidewalls of the box are typically fully shielding, i.e., composed of a perfect conductor that allows no electromagnetic field from the interior to penetrate outside. However, in general, the sidewalls may provide any desired surface impedance boundary condition. For example, a wall composed of a lossy conductor will provide a resistive boundary condition. This can be true for box sidewalls, as well as the top and bottom covers. For the purposes of this disclosure, a "shielding" requires being covered in either a perfect or lossy conductor.

As shown in this example, the structure 100 comprises two thick conductors—bottom conductor 110 and top conductor 112—stacked one on top of the other. The circuit of FIG. 1 is merely provided as an example of the type of structure for which the method described in conjunction with FIG. 2 may be used. In alternative examples, the structure 100 can assume any variety of shapes and configurations and have any number of layers (rather than just two, as shown in FIG. 1). Furthermore, the structure 100 need not be a conductor at all, but rather, for the purposes of this disclosure, can be comprised any material differing from the embedding media.

A voltage can be applied across the structure 100 to create a current distribution within it. In an example, the voltage is a high-frequency (e.g., 10 GHz) time-varying voltage. In the example of FIG. 1 the voltage can be applied between the left-most face of bottom conductor 110 (denoted as face 114) and the immediately adjacent box sidewall. This is known in the art as an 'infinitesimal gap voltage source' because the gap between which the voltage is applied has zero width. In this example, the box sidewall can be viewed as 'ground.' The voltage could also be applied between the rear-most face of top conductor 112 (denoted as face 116) and the immediately adjacent (back) sidewall. (Although the voltage can be applied across any two points of any portion of the structure). In both cases the voltage exists between the circuit and ground. This is how nearly all circuits are excited for EM analysis. In an alternative example, however, the voltage can be applied between any two points in a circuit (such as between face 114 and face 116).

As a result of this applied voltage, a current distribution, which includes both horizontal current and vertical current, forms within structure 100. The portion of the structure 100 in which only horizontal current flows can be accurately modelled, for example, using Method of Moments, realized with infinitely-thin rooftop subsections, volume rooftop subsections, or other known subsections.

The junction region where the bottom conductor 110 and top conductor 112 overlap (i.e., more generally, where the layers of the structure overlap), however, requires vertical current, which is typically modeled using stacks of "uniform vias" (blocks of constant vertical current). Stated differently, the current in a given uniform via is vertically directed and is the same magnitude and phase everywhere. Stacks of uniform vias are thus used in a Method of Moments analysis to simulate a piecewise-constant representation of the vertical current, which is then used to solve for the current distribution of vertical current within the circuit. But uniform vias are poor representations of the actual vertical current distribution, which in reality gradually and smoothly changes in both magnitude and phase as it flows along a long via. Thus, in order to accurately model vertical current, a large number of very short uniform via blocks are required to generate a piecewise-constant representation with sufficient resolution to achieve the desired simulation accuracy.

For complex circuits, the large number of vias required to accurately model vertical current is computationally prohibitive. Matrix solve is the main numerical bottleneck in this analysis. Matrix solve is an $N^3$ operation where N is the number of subsections, meaning that each modeled subsection exponentially increases the computational complexity and time required to simulate the vertical current distribution. The computational complexity to solve structures such as a large array of through-silicon-vias (TSVs), for example, is prohibitive. There exists, then, a need in the art for a computer-implemented method that can drastically reduce the number of subsections, and thus, time, required to model the z-directed current distribution within a three-dimensional structure disposed within a shielded multi-layered media. So-called 'iterative matrix solves' can result in faster solve times, but, in spite of decades of research, are still lacking in robustness, consistent ability to reach convergence, and reliable accuracy especially for shielded structures such as are considered here.

Accordingly, various examples described in this disclosure are directed toward an efficient computer-implemented method for modeling the z-directed current distribution within a three-dimensional structure disposed within a shielded multi-layered media. More specifically, various examples describe using subsections of linearly-changing vertical current. Using such subsections, rather than only uniform subsections, the number of subsections required to model vertical current may be reduced by a factor of approximately 6.6, reducing the numerical complexity by approximately 280 times, thus allowing a computer to solve for the vertical current distribution approximately 280 times faster. Stated differently, an analysis which would require one hour using only uniform vias may be reduced to 13 seconds, and an analysis that would require 50 hours can be reduced to under 11 minutes, while retaining the same degree of accuracy.

For the purposes of this disclosure, the x-y axes are oriented parallel to the surfaces of the dielectric layers and the z-axis is oriented perpendicular to the surfaces of the dielectric layers. Z-directed current (alternatively referred to in this disclosure as "vertical current"), then, is current that flows in a direction perpendicular to the surfaces of the dielectric layers. Z-directed current can cross the top and bottom surfaces of the dielectric layers, flowing between layers of the dielectric. A structure that connects multiple layers of the structure disposed in different dielectric layers is known as a via. Thus, any via that carries current will be carrying current that has, at least, a z-directed component. It should be understood that the designations of an "x-axis," a "y-axis," and a "z-axis" are somewhat arbitrary and can be interchanged without affecting the underlying concept—the axes are so defined to represent a useful way for describing the orientation of the rectangular prisms and the direction of current within a circuit. For example, the axes could be reoriented such that current flowing perpendicular to the surface of the dielectric layers flowed parallel to the x-axis, without changing the underlying concept described herein. In fact the choice of coordinate system to describe this problem is completely arbitrary. Any choice may be made and the underlying physics remains unchanged.

Figure 2:
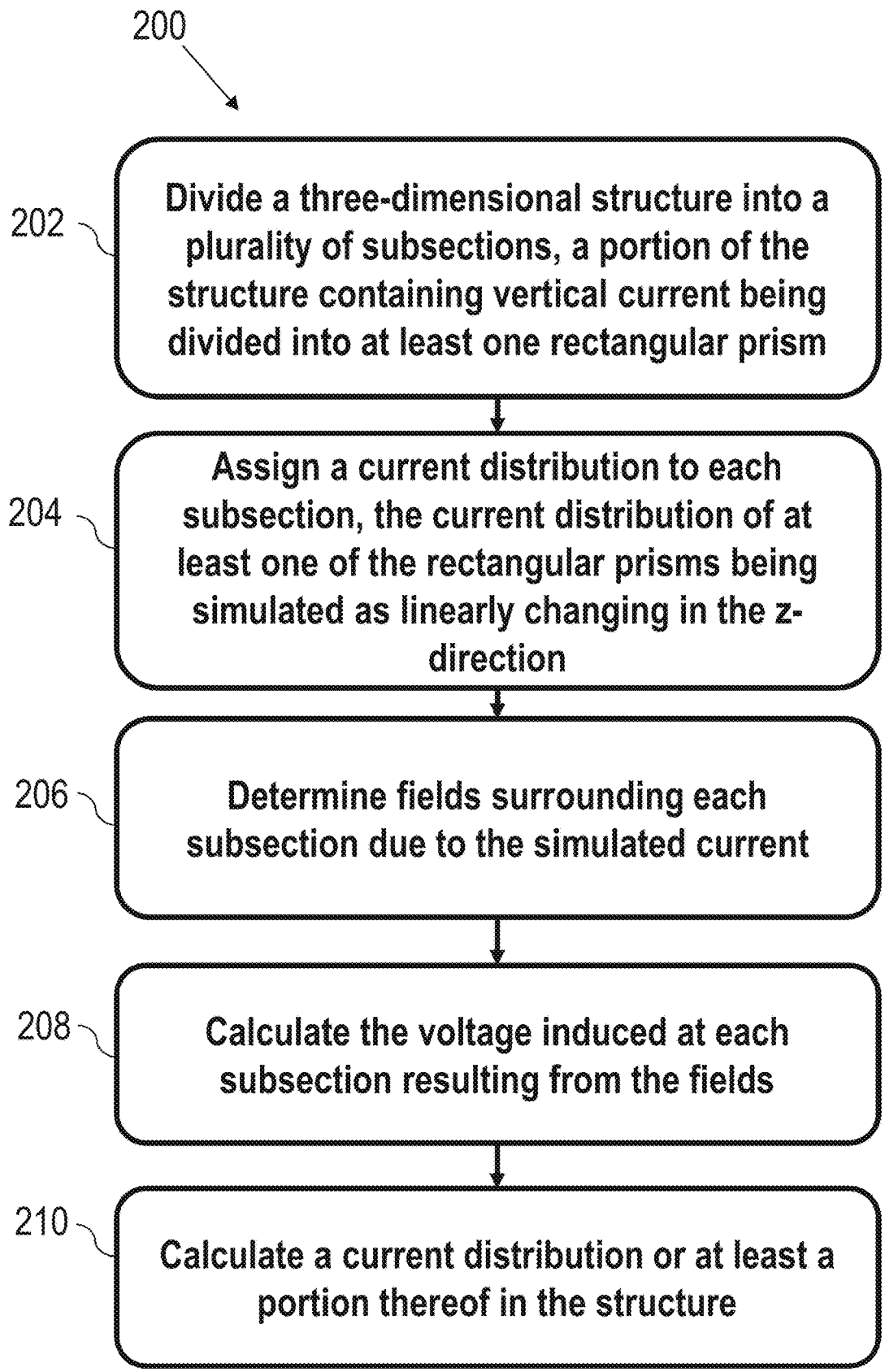
FIG. 2 shows a flowchart of a method for simulating current within a circuit, according to an example.

FIG. 2 shows a flowchart of such a computer-implemented method 200 for simulating a vertically-oriented current distribution of current flowing through a plurality of layers of a three dimensional structure (e.g., structure 100) embedded in a multi-layered dielectric, which is computationally efficient and, thus, faster to implement than previous methods. The computer may be a general-purpose computer comprising a processor and a non-transitory storage medium containing instructions that, when executed by the processor, carry out the steps described in method 200; however, it should be understood that any computing device, suitable for carrying out the steps described in connection with FIG. 2 can be used.

At step 202, the arbitrary three-dimensional circuit is divided into many subsections that are typically small (the range of subsection sizes can extend from a few millimeters down to a fraction of a micron) with respect to the wavelength (e.g., $\frac{1}{10}^{th}$ of a wavelength or $\frac{1}{100}^{th}$ of a wavelength) of the voltage applied to the planar circuit. Typically, the subsection size is adjusted to be small at the highest frequency (shortest wavelength) and then the same size subsection is used at all frequencies. In practice, the smallest subsection size is actually set by the largest size that allows subsectioning of the finest portions of the circuit. This often turns out to also be small with respect to wavelength. For Method of Moments, only the structure (again, everything in the structure that is different from the embedding multi-layered media) is meshed; the embedding dielectric layers (as used in this disclosure, "dielectric" includes lossless and lossy dielectric, as well as semiconductors like silicon) and the shielding box are not meshed. As is described below, the subsections can be rooftop subsections, volume rooftop subsections, rectangular prism subsections, or any other suitable subsection.

As part of this step, any via (i.e., portion of the circuit through which current can flow between portions of the structure disposed in adjacent dielectric layers) or any portion of the structure which otherwise carries z-directed current during use, can be subdivided into rectangular prisms (or at least one rectangular prism). Consider, for example, the region of transition in FIG. 1, where the lines overlap and touch. This region can be divided into two rectangular prism subsections, designated in FIG. 1 as subsections 118 and 120. The bottom subsection 118 envelops the right end of the lower line. The top subsection 120 envelops the near end of the upper line. It is in these two regions that vertical (z-directed) current flows.

Figure 3A:
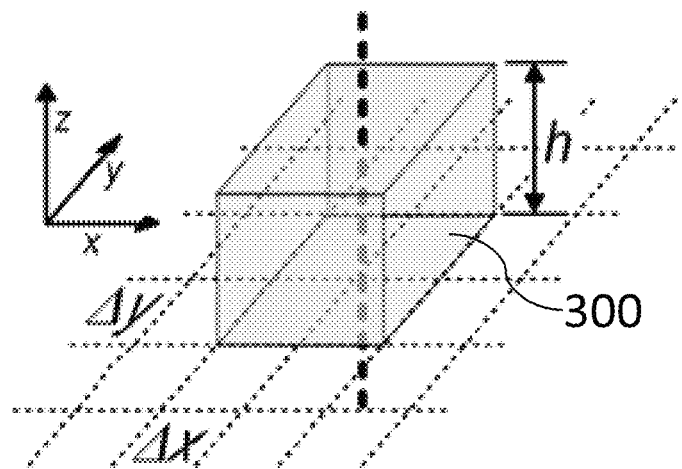
FIG. 3A shows a perspective view of a rectangular prism volume subsection, according to an example.

A rectangular prism is defined as a three-dimensional object which has six faces that are rectangles. One such rectangular prism subsection is shown in FIG. 3A. As shown, the top and bottom surfaces of the rectangular prism are arranged parallel to the x-y plane, and the side surfaces (i.e., those surfaces other than the top and bottom surfaces) are arranged either perpendicular to the x-axis (i.e., parallel to the y-z plane) or perpendicular to the y-axis (i.e., parallel to x-z plane). Which surface of the surfaces parallel to the x-y plane is identified as the "bottom" surface or the "top" surface is largely for the purpose of convenience in explanation, and the names may be interchanged (as long as they are done so consistently throughout) without affecting the underlying concept. The sides of the rectangular prism are thus arranged parallel to the z-axis.

In the example of FIG. 3A, a single subsection is shown to cover an area of 24$x$ by 24$y$ and extends over a thickness of h, corresponding to the thickness of the layer in which the subsection is disposed. The subsection, as shown, thus extends across the width of the via and across the height of the dielectric layer. It should, however be understood that, in various alternative examples, the subsection can extend across only a portion of the dielectric, and thus h may be some height less than the thickness of a dielectric layer. Furthermore, the subsection can have a thickness h greater than a particular dielectric layer and thus can extend across multiple layers. In this disclosure, a rectangular prism subsection within a via is alternatively referred to as a "via block," or simply a "block." In addition, not only can a via block extend over multiple dielectric layers, it can also extend over multiples of 2Δx by 2Δy.

Generally, the values of Δx, Δy, and h are selected such that the smallest possible via extends over just 2Δx by 2Δy and over the thickness of the layer and is called a 'basis function' (this will be described further, below). It should be understood that the measurements 2Δx and 2Δy are selected for purposes of convenience. Conceivably, a subsection could extend over some distance besides 2Δx and 2Δy. In such an instance, the values of Δx and Δy are selected to extend over the same distance that the 2Δx and 2Δy values would have otherwise covered. For example, a subsecution could extend over just one delta Δx and Δy, in which case, the values of Δx and Δy would be double the values of Δx and Δy when 2Δx and 2Δy is used for a single subsection. (Likewise, if the subsection extends over 0.5Δx and 0.5Δy, the values of Δx and Δy would be quadruple the values of Δx and Δy when 2Δx and 2Δy is used for a single subsection.) In other words, the physical meshing would be the same, the only difference is the "yardstick" being used to measure it. Similarly, the thickness of a subsection could extend over a fraction of a layer, in which case the layer in which the subsection is disposed is conceptually split into multiple layers with one layer thickness equal to a subsection height. Again, the situations would be physically equivalent—the only thing changing is the size of the layer thickness "yardstick." Multiple basis functions can be added together side-by-side and one-on-top-of-the-other and get a large via subsection, or use a single basis function for the smallest possible via subsection. In order to maximize the use of FFT in the numerical calculations that follow in the steps below, it is preferable that all via basis functions use the same values for Δx and Δy. However, different vias in the same structure can use different values for Δx and Δy, but this will limit or eliminate use of FFT and thus slow the calculation time.

At step 204, each subsection is independently assigned a predetermined current distribution typically having both a magnitude and a phase. ("Independently," for the purposes of this disclosure, means "separately." Thus, the analysis that follows in steps 206 and 208 results from the current distribution assigned to a single subsection and is similarly separately performed for each remaining subsection. The analysis, however, of each separate subsection can occur simulataneously or concurrently). The current distribution on the subsection assumes a specific form that is a sum of one or more fundamental current distributions known as a 'basis functions' or 'expansion functions' and is typically assumed to have a peak current density of unit magnitude (e.g., 1 A/m² for volume current basis functions), although other magnitudes can be used. The basis function assigns the shape of the current distribution on each subsection. In addition to magnitude, a phase is typically assigned to each subsection, thus current can have a phase shift across a conductor, moving from one basis function to the next. For example, one basis function might be at phase 0 degrees, the next at 10 degrees, etc.

The remaining steps described below are used to numerically evaluate the magnitude and/or phase of the current for each basis function. The magnitude and phase is, in certain examples, selected so that the total induced voltage on all subsections (except where an input voltage is applied) goes to zero. The total current on the subsection is then the basis function (which gives it the shape of the current distribution) multiplied by the determined magnitude and/or phase.

Horizontal current can be simulated using a mixture of any known basis functions for each type of subsection. The smallest possible subsection consists of a single basis function. For example, the basis functions for rooftop subsections are known and one or more may be joined together in any way desired to construct each (typically larger) rooftop subsection. Likewise, for volume rooftop subsections the basis functions for volume rooftop subsections can be used.

The basis function within at least one rectangular prism subsection that includes vertical current can be assigned a tapered via basis function. If the rectangular prism of FIG. 3A exists at the bottom of a via (e.g., bottom subsection 118), the vertical current on the bottom surface of the rectangular prism must be zero because it is an open circuit. Thus, only horizontal current can flow there. At the top surface of the bottom block (where the bottom and top via blocks touch), the vertical current within this subsection will be at a maximum. This is where all the previously horizontal current from the subsection (over the entire thickness of the bottom conductor 110) is now flowing vertically to connect with the near end of the top line (at the top of top conductor 112). The tapered via can be viewed as picking up and gathering all of the horizontal current and converting it to vertical current. This is why it is linearly tapered. For example ½ way up the tapered via, the tapered via will have gathered ½ of the total incoming horizontal current. Thus, in order to model the vertical current in the bottom block, a via subsection with zero current at one surface in the x-y plane (in this example, the bottom surface) and maximum current at the opposite surface in the x-y plane (in this example, the top surface), i.e., a tapered via, can be used. This example, in which vertical current is at a minimum at the bottom surface and at a maximum at the top surface, may also be referred to as an 'up via' or an 'up-tapered via' or a 'tapered up-via' as it is often used to transition current upwards from a horizontal volume rooftop.

Generally speaking, a subsection can be any size that contains an integer number of basis functions. In this manner, basis functions can be conceived of as building blocks. In practice, all the basis functions of a given type (like a tapered via, or a volume rooftop) are all the same size. In theory, however, any size basis functions can be mixed (i.e., using different sizes all in the same analysis; using basis functions of differing size, however, limits the use of the FFT and thus slows the calculation.

Figure 3B:
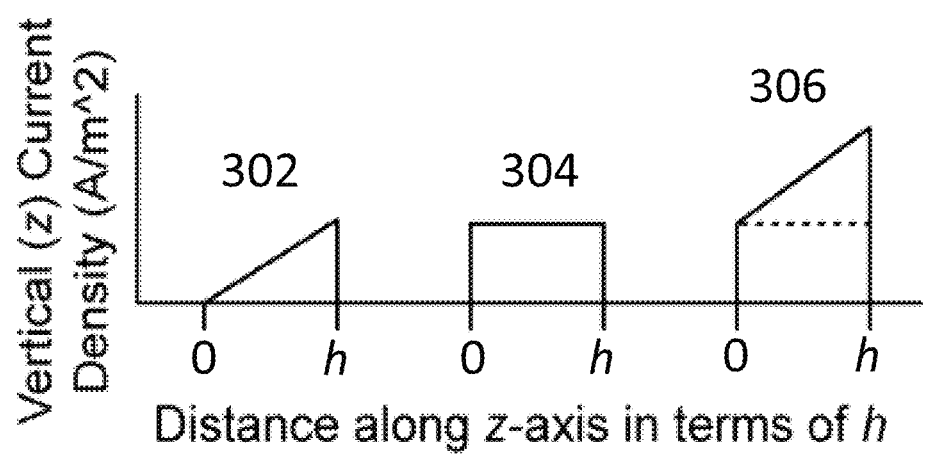
FIG. 3B shows a plurality of plots of vertical current within a rectangular prism subsection, according to an example.

In FIG. 3B, plot 302, shows the magnitude of the vertical volume current within a via block when a tapered volume up via subsection (i.e., basis function) occupies that block. The current is the same everywhere in any horizontal cross-section, and it tapers linearly from zero at the bottom to a maximum at the top, or, assuming the base of the block is at z=0, $$J_Z = \frac{z}{h} \quad\quad 1$$

Note that the 'taper' refers only to the vertical current density variation within the via. The physical shape of a tapered via is a rectangular prism, as described above in connection with FIG. 3A. Thus, at least one of the rectangular prism subsections in the via or z-directed current portion of the circuit (as determined in step 202) is assumed to contain current changing linearly (in magnitude and/or phase) in the z-direction. Thus, current density in a tapered via is linearly changing in magnitude and/or phase in the z-direction.

The nature of the assigned z-directed current distribution—whether it linearly increases from the bottom surface up to the top surface, linearly increases from the top surface down to the bottom surface, or remains uniform from the bottom surface to the top surface—is selected based on the respective location of the rectangular prism subsection within the circuit.

For example, consider now the vertical current in the top block (e.g., top subsection 120), at the near end of the top line. The top surface of the top block must have zero vertical current. All current flow has transitioned to horizontal current flow in the volume rooftops used to model the top line. The bottom surface of the top block, where it meets the top surface of the bottom block, must have maximum vertical current as all the previously horizontal current is flowing vertically across this surface. Thus, a tapered via that has zero current at the top and maximum current at the bottom in order to model the vertical component of current in this region is required. This is referred to in this disclosure as a 'down via', a 'down-tapered via', or a 'tapered down-via' as it is often used to transition current downwards.

The current distribution in a via block disposed at the center of a via stack, where the current at the top surface is typically equal to current at the bottom surface, can be modeled as a "uniform via." A uniform via has constant vertical current throughout, as shown in FIG. 3B plot 304. For example, a via block will have a uniform current distribution if the via block is the center block within an odd number of stacked via blocks (such as is shown, for example, FIG. 4A) with the top and bottom ends of the stack open circuited, as in a resonator (often used in filters) or a dipole (an antenna).

FIG. 3B plot 306 shows the current distribution for a tapered via and a uniform via occupying exactly the same volume, i.e., combined by superposition. The total current in the via volume is the (weighted) sum of the two currents, which allows modeling of a current that linearly tapers from one value at the bottom of the via (as determined by the uniform via as the up-tapered via has zero current here) to another value at the top of the via (as determined by the uniform via plus the maximum current present in the up-tapered via). This is required, for example, when a length of the structure extends over three or more layers. The via at the bottom end will require only an up-tapered via (which has zero current at the bottom end). Superposition allows modelling current with any slope at any level. The linearly tapered via current (plot 302), when combined in the same volume with a uniform current via (plot 304), allows representation of via current that varies linearly from one value at the bottom of the via to another value at the top of the via (plot 306). All interior via blocks typically require both a tapered and a uniform via, adding together as shown in plot 306, in order to represent the non-zero current at either end of any given interior via block. When both the tapered via and the uniform via are collocated in the same via block and also treated as separate subsections, application of Method of Moments results in the calculation of how much current each subsection should have to best represent the actual current distribution in the circuit being analyzed. The top layer requires zero current at the top end, which can be represented by a down via or by an up-tapered via being subtracted from a uniform via, and thus canceling to zero at the top.

In general, a piecewise-linear representation of the current flowing in a long via is realized by dividing the via into multiple uniform plus tapered via subsections (i.e., a stack of via blocks, described herein as a "via stack"). When the current is modeled flowing from a thick conductor on one level to a thick conductor on another level, as in FIG. 1, this allows the horizontal current from a volume rooftop to transition to vertical via current and, on the next layer, to transition back to horizontal current. A transition of current from a volume rooftop subsection on one layer up to the next layer cannot be accomplished with a uniform via at all. A tapered via is required. Uniform vias have long been in use to transition current from one infinitely thin rooftop to another infinitely thin rooftop on an adjacent layer. The tapered via also models current changing smoothly along the length of a long via due to high frequency electromagnetic effects. This is in sharp contrast to uniform vias which allow only a piecewise-constant model of what is in reality a smoothly changing current along the length of the via.

Figure 4A:
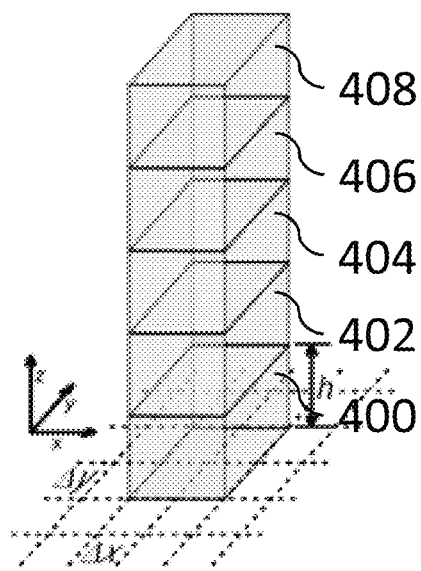
FIG. 4A shows a perspective view of a stack of rectangular prism subsections, according to an example.
Figure 4B:
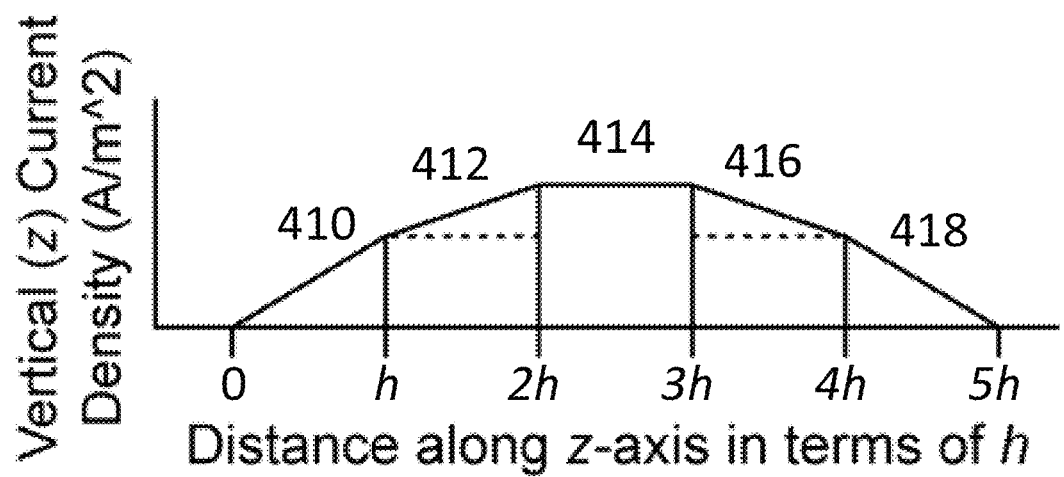
FIG. 4B shows a graph of the vertical current within a stack of rectangular prism subsections, according to an example.

An example via stack, yielding such a piecewise linear representation of the current on the via stack, is shown in FIG. 4A. The via stack of FIG. 4 includes five via blocks 400, 402, 404, 406, and 408. (Although each via block shown in FIG. 4 is of the same height, it should be understood that, in alternative examples, the via blocks can be of various heights and need not be the same.) As shown in FIG. 4B, the bottom end of the stack contains only an up via (410). The top end contains only a down via (418). All other blocks contain both an up via (or, alternately a down via) and a uniform via (412, 414, 416). A lengthy (compared to wavelength) via can be accurately modelled by such a stack of via blocks.

Note that block 406 in the via stack of FIG. 4 appears to be modelled as a superposition of a uniform via and a down via (416). However, a down via is not actually required. If a block is occupied by both an up via and a uniform via, Method of Moments assigns a negative weight to the up via when a down via is required. This subtracts the up via current from the uniform via current creating the effect of a down via. Fundamentally, a down via is an up via subtracted from a uniform via. Thus, of the three types of vias, down, uniform, and up, only two should be used in any given volume block as the third is a linear combination of the other two. Use of all three via types results in a singular moment matrix. Matrix inversion, and thus the entire analysis, fails when this happens. Here, only the uniform via and up via are used. If a down via is needed it is formed by subtracting an up via from a uniform via. Alternatively, instead of an up via, only a down via and a uniform via may be used. Likewise, in a different example, only a down via and an up via may be used, where the uniform via is simulated as a superposition of an up via and a down via.

There are many via basis functions that can be used to obtain a tapered via by superposition. In general any selection of two vias with linear taper plus offset, as in 306 in FIG. 3B (even including zero offset, as in 302, or zero slope, as in 304) may be used as long as one is not 'linearly dependent' on the other, i.e., one cannot be written as a simple multiple of the other. For example, two linear tapered up-vias, both starting at zero but with different tapers are linearly dependent and not suitable. However, an up-tapered via starting at zero and a second up tapered via starting at 0.5, are linearly independent regardless of the slope of their respective tapers. In other words, the up-tapered, the down-tapered, and the uniform via may all be written as a weighted sum of those two vias. Any set of via basis functions that include a linear taper and may be linearly combined, i.e., by application of superposition to obtain the tapered vias described here is deemed to be equivalent to the tapered via described in this disclosure.

Steps 206 and 208 are analytical developments, i.e., performed in terms of general equations. These equations are developed once and then executed by a computer processor following the steps of a computer program. The equations are written so that they may be applied to any specific kind of basis function in any location within the shielded layered media. After implementation in a computer program, the computer program then applies the equations to all the corresponding types of subsections (which are formed from one or more basis functions) required for analysis of a specific circuit.

At step 206 the fields surrounding each subsection due to the assigned basis function current, including the effect of all layers of dielectric and the effect of the surrounding conducting walls, but excluding all other circuit metal, are independently determined. For the purposes of this disclosure, individual basis functions are determined for all subsections. This analysis is easily extended to subsections composed of multiple basis functions by invoking superposition. The subsection with the assumed current distribution is referred to as the 'source' subsection and can be viewed conceptually as a tiny transmit antenna within the shielded layered media.

Derivation of the reaction integrals used by Method of Moments starts by derivation of the full dyadic Green's function in terms of waveguide modes, where the waveguide modes are defined for each dielectric layer by the shielding box sidewalls. Next, the Green's function is multiplied by the tapered via current density and integrated over the volume of the tapered via. This determines the fields that surround the tapered via.

In general, this analytical portion of the analysis is based on representing the fields surrounding a tapered via as a weighted sum of all possible TE (transverse electric, i.e., no z-directed electric field) and TM (transverse magnetic, i.e., no z-directed magnetic field) rectangular waveguide modes, with the conducting sidewalls of the box (FIG. 1) forming a rectangular waveguide that propagates waves in the z-direction. While the sidewalls are typically perfectly conducting, sidewalls with any arbitrary surface impedance can be implemented by appropriate modification of the waveguide modes being used. These rectangular waveguide modes, together, form a complete orthogonal basis for representing all possible fields in the shielded-layered media. When the source subsection has only z-directed current, the TE waveguide mode amplitudes are all zero. Z-directed current generates only TM waveguide modes.

The basic variables for this analysis are defined using standard rectangular waveguide terminology and are detailed in eq. (1)-(11) in Appendix 1, below. The rectangular waveguide is formed by the conducting sidewalls of the shielding box with the dielectric layers viewed as forming a (vertical) cascade of homogenous rectangular waveguides. Also, as is standard practice for most RF (radio frequency) and microwave work, fields are assumed to have a time-harmonic dependence of exp(jωt), where ω is the radian frequency of the time-harmonic wave. When this term is substituted into the governing differential and integral equations (also known as Maxwell's Equations) it cancels out of all expressions leaving only the complex (i.e., real and imaginary) amplitudes of the various time-harmonic waves. Thus, in all work presented here, only the complex amplitude of all waves at each frequency need be considered.

The Fourier series amplitudes for both a square and a triangular pulse are also required. This is a result of the integral of the basis functions (which are formed from rectangular and triangular pulses, FIG. 3B plot 302 shows a rectangular pulse and 304 shows the first half of a triangle pulse) multiplied by the sines and cosines of the rectangular waveguide modes. The required Fourier coefficients follow.

$$F_R(\Delta x) = \begin{cases} \frac{2}{k_x}\sin(k_x\Delta x), & k_x \neq 0 \\ \Delta x, & k_x = 0 \end{cases} \quad 2$$

$$F_T(\Delta x) = \begin{cases} \frac{1}{\Delta x k_x^2}(1-\cos(k_x\Delta x)), & k_x \neq 0 \\ 2\Delta x, & k_x = 0 \end{cases} \quad 3$$

The subscript R refers to the Fourier coefficients for a rectangular pulse, (FIG. 3B, plot 304). The subscript T refers the Fourier coefficients for a triangle pulse, a ramp-up (FIG. 3B plot 302) immediately followed by a ramp down, in this case, in the x-direction. The horizontal rooftop function current distribution is a triangle pulse (including both ramp-up followed by a ramp-down) in the direction of the current flow and a rectangle pulse variation in the direction perpendicular to the current flow.

The above Fourier coefficients are for a rectangle or triangle pulse variation in the x-direction. For a pulse in the y-direction, change $\Delta x$ to $\Delta y$ and $k_x$ to $k_y$. A rooftop with x-directed current will have a triangle pulse variation in the x-direction and a rectangle pulse variation in the y-direction with corresponding Fourier coefficients of $F_T(\Delta x)$ and $F_R(\Delta y)$.

The tapered volume via results use the Fourier coefficients in the following expressions:

$$F_{VTA}(x,y) = F_R(\Delta x)F_R(\Delta y)N_3 g_3(x,y) \quad 4$$

$$F_{RFX}(x,y) = F_T(\Delta x)F_R(\Delta Y)N_2 g_1(x,y) \quad 5$$

$$F_{RFY}(x,y) = F_R(\Delta x)F_T(\Delta y)N_1 g_2(x,y) \quad 6$$

Eq. (4) is the Fourier coefficients for a VIA (with the same coefficients used for both tapered and uniform vias), which uses a rectangular pulse for the current distribution in both x- and y-directions. Eq. (5) is the Fourier coefficients for a rooftop basis function with x-directed current, RFX, which uses a triangle pulse (ramp up followed by ramp down) in the x-direction and a rectangle pulse in the y-direction. Both surface (i.e., infinitely thin) and volume rooftops use the same coefficients. Eq. (6) is the Fourier coefficients for a rooftop with y-directed current, RFY, in which $N_1$ is substituted for $N_2$ and $g_2$ is substituted for $g_1$. The N coefficients are normalizing constants and the g functions contain the x and y varying sines and cosines of the waveguide modes. These are both detailed in the first few equations of Appendix 1. Note that the waveguide mode numbers in these equations and in certain other equations below are not explicit, for clarity. When the standard waveguide constants are substituted in for these and other expressions, for example, for $k_x$ and $k_y$, then the mode numbers, m and n, become explicit.

The results also include the following term $$D = (1 - r_{iT}r_{iB})\sin(k_{iz}h) + (r_{iT}+r_{iB})\cos(k_{iz}h) \quad 7$$

as a denominator. The index i represents the waveguide mode numbers and is used to sum over all TE and TM m and n modes. However, for via source subsections, which have only z-directed current, all TE modes are zero. Thus our sums, in this disclosure, are all over TM modes only.

The $r_{iT}$ and $r_{iB}$ are the normalized surface impedances present on the top (T) and bottom (B) surfaces of the dielectric layer containing the volume via subsection. If perfectly conducting ground planes are present on both surfaces, then $r_{iT}$ and $r_{iB}$ are both zero. If there are additional layers of dielectric between either cover and the via-containing layer, the surface impedances of the covers are transformed by standard rectangular waveguide transmission line theory through the intervening dielectric layers to the source layer's top and bottom surfaces. Details and a full derivation are provided in Appendix 1 and values are determined recursively using eq. (23)-(26) and (31)-(34).

At step 208, equations for the voltage induced in the location of all other subsections are independently determined based on the field equations that were determined in step 206. The other subsections (i.e., those subsections not viewed as the source subsection in this step) can be viewed as tiny receiving antennas and are called 'field' subsections. To calculate the voltage induced in each field subsection, the electric field due to the source subsection is integrated at the location of and over the volume of the field subsection. This is known as a 'reaction integral' and can be viewed as the electromagnetic coupling between two subsections. It is convenient, although not strictly necessary, to first multiply the electric field by a weighting function prior to integration. For example, if the weighting function is a delta function, such that the electric field is effectively sampled at a specified point and without integration, the 'point matching' variety of Method of Moments results. For this work, Method of Moments is illustrated by selecting as a weighting function the basis function that will eventually be used to represent current on the field subsection. This results in the 'Galerkin technique' or 'Galerkin' implementation of the Method of Moments. In addition, the source subsection is itself also viewed as a field subsection and the 'self-coupling', i.e., the voltage induced in the source subsection by the current on the source subsection, is determined. These equations, which have been determined for the electromagnetic coupling between any possible pair of specific types of basis functions with arbitrary locations within the shielded layered media are implemented in a computer program.

The result is an equation with an exact analytical infinite summation for the integrated voltage on each field subsection that exactly includes the effect of the dielectric layers and the box. The summations are typically performed numerically using the FFT (Fast Fourier Transform) which is easily organized so that all summations are performed to nearly full numerical precision. Thus, the summation results are described as 'numerically exact.' (As will be understood by a person of ordinary skill in the art, the term "numerically exact" differs from a truly "exact" calculation. An "exact" computation would require the computation of an infinite number of items. This calculation, however, can be truncated at some point after the terms of the infinite sum become so small that the differences no longer matter.) The exact equations for these summations are listed below. In alternative examples, the summations could also be done directly, i.e., without the use of the FFT algorithm, by calculating each term and adding them up. This is generally less computationally efficient, but could be required if different values of $\Delta x$ and/or $\Delta y$ are used in different places in the circuit.

This summation is repeated for every subsection, letting each one take its turn as a 'tiny transmitting antenna,' source subsection independently. This calculation includes the voltage induced in the source subsection by itself. Once complete, all this information about coupling between all possible pairs of subsections can be stored in a matrix. (A matrix represents a convenient way to solve a system of equations, and, in alternative examples, the same system of equations can be solved without the use of a matrix.) For example, if 1.0 amperes placed on subsection number 18 induces, or couples, 2.318654876 volts in subsection number 32, then the (32, 18) element of the matrix is 2.318654876. This matrix is called the 'moment matrix'. So the (matrix) equation is now: (Voltage on Each Subsection)=(Big Moment Matrix)*(Current on Each Subsection). Notably, this is just a matrix version of Ohm's law, with the induced voltage representing a transfer impedance from the current on each subsection. (In an alternate embodiment, the matrix may be inverted to represent transfer admittance.) The advantage of using a Galerkin technique is that the matrix is symmetric. Thus the (18, 32) element of the matrix takes the same value. Symmetric matrices can be stored with half the memory and require half the time to fill as compared to a full matrix.

Stated differently, the result of step 208 is equations that, given a meshing, or subsectioning, of a specific circuit, allow a computer program to calculate numerical values for an N×N matrix equation: V=Z*I, where V and I are N×1 column vectors and Z is an N×N matrix, which is called an impedance matrix. The moment matrix is Z, which at this stage of the analysis is an impedance matrix. The first row of that matrix equation may be written as $V_1=Z_{11}*I_1+Z_{12}*I_2+Z_{13}*I_3+\ldots$, where $V_1$ is the total voltage induced in subsection 1, which is the sum of voltages induced in subsection 1 by the current on all subsections. The meaning of this equation may be explained as follows: The current on each subsection is the basis function(s) of that subsection (determined in step 204) multiplied by the overall current amplitude as set by the vector I. Thus the actual current on subsection 1 is the current assumed on the basis function(s) that compose subsection 1 multiplied by the first element of the I vector, $I_1$. The voltage on subsection 1 due to current on subsection 1 is $Z_{11}$ multiplied by $I_1$. This is the voltage that the current on subsection 1 induces on itself, or the 'self-coupling'. In an analogous manner, the voltage on subsection 1 due to current on subsection 2 is $Z_{12}$ multiplied by $I_2$. In a similar manner, $Z_{13}$ multiplied by 13, the current on subsection 3, is the voltage induced across subsection 1 by the current on subsection 3. This is repeated for the current on each of the remaining subsections. The entire voltage summation process is then repeated for each of the remaining subsections $V_2$, $V_3$, $V_4$, etc. However, this process works only if the current on each subsection as specified by the I vector is known. The values of the I vector are not known in advance: the I vector is actually the unknown being solved for. Fortunately, the values that the voltage vector must be are known: the entire voltage vector must be zero (no voltage is allowed across a perfect conductor) except for the subsection upon which we apply a known input voltage. Therefore, this matrix equation is solved for the unknown current vector in terms of the known voltage vector. This can use any of the many well-known matrix solve techniques, for example, 'LU Decomposition' or 'Gaussian Elimination', etc. This takes place in step 210, as described below. Use of the so-called 'iterative matrix solves' at this point and for this specific type of problem are not yet sufficiently robust or accurate for all possible circuits.

The exact analytical equations for the Method of Moments reaction integrals, here denoted by S, even though they are used to fill the Method of Moments Z matrix, for tapered volume vias are listed below. Again, these are the voltages induced in a field subsection by current in a source subsection. These equations are evaluated for pairs of the specified basis functions at the specified locations within the layer with results used to fill the Method of Moments Z matrix and form the solution to the central problem in formulating a method of moments analysis. Derivations are fully detailed in Appendix 1. It should be understood that the equations presented in this disclosure assume a specific form and can be presented in many different forms equivalent to the forms used herein.

The reaction integral for coupling between a tapered via (TV) centered at $(x_0,y_0)$ that extends vertically over the entire layer thickness, h, and an infinitely thin (horizontal) rooftop with x-directed current (RFX) centered at $(x_1,y_1,z)$ where z is the level at which the infinitely thin rooftop is placed and is within or on the surface of the same layer follows (summation is over all TM modes only) (eq. 194 and 191 in Appendix 1).

$$S_{TVtoRFX} = \sum \frac{F_{VIA}(x_0, y_o)F_{RFX}(x_1, y_1)}{Y_i k_{iz} h}\left(1 - \frac{z_3(z)}{D}\right) \qquad 8$$

$$Z_3(z) = \sin(k_{iz}(h-z)) + r_{iT}\cos(k_{iz}(h-z)) + (1 - r_{iT}k_{iz}h)(\sin(k_{iz}z) + r_{iB}\cos(k_{iz}z)) \qquad 9$$

For coupling between a tapered via centered at $(x_0,y_0)$ and infinitely thin rooftops with y-directed current (RFY) centered at $(x_1,y_1)$, substitute $F_{RFY}$ for $F_{RFX}$ in the above expression.

The reaction integral for coupling between a tapered volume via centered at $(x_0,y_0)$ and a volume rooftop with x-directed current (VRFX) centered at $(x_1,y_1)$, both extending over the entire thickness, h, of the same layer follows (eq. 203 in Appendix 1).

$$S_{TVtoVRFX} = \sum \frac{F_{VIA}(x_0, y_o)F_{RFX}(x_1, y_1)}{Y_i k_{iz}^2 h}\left(k_{iz}h - \frac{Z_{3V}(h)}{D}\right) \qquad 10$$

$$Z_{3V}(h) = (2 - r_{iT}k_{iz}h)(1 - \cos(k_{iz}h)) + (r_{iT} + r_{iB} - r_{iT}r_{iB}k_{iz}h)\sin(k_{iz}h) \qquad 11$$

For coupling between a tapered via centered at $(x_0,y_0)$ and a volume rooftop with y-directed current (VRFY) centered at $(x_1,y_1)$, substitute $F_{RFY}$ for $F_{RFX}$ in the above expression.

As with all reaction integral results in this disclosure, the summation over the index i is taken over all TM modes only. For clarity, the modal summation index i, which sums over all m, n waveguide modes, is not always explicitly given, but can be easily determined from the standard waveguide mode definitions detailed in eq. (1)-(11) in Appendix 1, below.

The reaction integral for coupling between a tapered volume via centered at $(x_0,y_0)$ and a uniform volume via (UV) centered at $(x_1,y_1)$, both extending over the entire thickness, h, of the same layer, follows (eq. 232 in Appendix 1).

$$S_{TVtoUV} = \sum \frac{F_{VIA}(x_0, y_o)F_{VIA}(x_1, y_1)}{y_i}\left(\frac{Z_{4U}(h)}{D} + \frac{k_{iz}h}{2} \frac{j\omega\mu k_{iz}^2 y_i}{k_{ic}^2}\right) \qquad 12$$

$$Z_{4U}(h) = \left(\frac{r_{iT} - r_{iB}}{k_{iz}h} + r_{iT}r_{iB}\right)(1 - \cos(k_{iz}h)) - r_{iT}\sin(k_{iz}h) \qquad 13$$

The reaction integral for coupling between a tapered volume via (TV) centered at $(x_0,y_0)$ and another tapered volume via centered at $(x_1,y_1)$, both extending over the entire thickness, h, of the same layer follows (eq. 244 and 240 in Appendix 1).

$$S_{TVtoTV} = \sum \frac{F_{VIA}(x_0, y_o)F_{VIA}(x_1, y_1)}{Y_i}\left(\frac{Z_6(h)}{D} + \frac{k_{iz}h}{3} \frac{j\omega\mu k_{iz}^2 Y_i}{k_{ic}^2}\right) \qquad 14$$

$$Z_6(h) = \frac{1}{k_{iz}^2 h^2}[(r_{iT} + r_{iB} - r_{iT}r_{iB}k_{iz}h)k_{iz}h + \{(r_{iT}r_{iB} + 1)k_{iz}h - r_{iT}k_{iz}^2h^2 - r_{iT} - r_{iB}\}\sin(k_{iz}h) + \{2 - (r_{iT} - r_{iB})k_{iz}h - r_{iT}r_{iB}k_{iz}^2h^2\}(\cos(k_{iz}h) - 1)] \qquad 15$$

Using the Galerkin technique, as described above, the moment matrix is symmetric. This means that the source subsection and field subsection can be swapped and exactly identical couplings result. For example, to calculate the electromagnetic coupling from current on a volume rooftop to an up-tapered via, simply use equation (10) to calculate the coupling from current on an up-tapered via to a volume rooftop. Thus, reciprocity applies and the resulting method of moments impedance matrix is symmetric.

At step 210, a current distribution in the structure is determined according to the transfer impedance or transfer admittance of each subsection and an assumed voltage across each subsection. This can be accomplished by inverting the Moment Matrix. Now the equation becomes (Big Inverted Moment Matrix)*(Voltage on Each Subsection)= (Current on Each Subsection) and assume all voltages (except where there are inputs to the circuit) are zero. Where the structure is comprised of a conductor, there is zero voltage on all non-input conductors because a perfect conductor must always have zero voltage across it. In other words, the Z matrix is inverted such that I=Y*V, where Y=$Z^{-1}$. The moment matrix is now an admittance matrix. If the input voltage source is applied to subsection 1, then $V_1$ is set to 1 (the value of the applied voltage) and the remaining subsection voltages (i.e., all of the remaining $V_x$ values) are set to zero. The result is obtained by substituting the now known voltages into the voltage vector V and given the admittance matrix Y, as calculated above based on the reaction integral equations, the computer numerically evaluates I=Y*V, the magnitude of the current for every subsection. The actual current distribution on each subsection is now the magnitude of the current in the vector I for each subsection multiplied by the basis function(s) that make up each subsection. The current distribution in the circuit is now the sum of all the actual current distributions on all the subsections and the problem is solved. The result is provided to the user by way of a GUI or other post-processing interface.

Again, the voltages are set to zero when it is assumed that the conductor is a perfect conductor (that is, in the lossless case). If, however, if there is loss in a subsection, then the voltage on that subsection will not be zero. Rather, it will be proportional to the current flowing in the subsection. So the final voltage in subsection 1 must be $R_1$*$I_1$, where the resistance of subsection 1 is $R_1$, rather than zero voltage if it were a perfect conductor. So now the equation for subsection 1 becomes $V_1+R_1$*$I_1=Z_{11}$*$I_1+Z_{12}$*$I_2+Z_{13}$*$I_3+$ . . . . Since $I_1$ is typically not known a priori, the $R_1$*$I_1$ term is moved over to the right hand side, or: $V_1=(Z_{11}-R_1)$*$I_1+Z_{12}$*$I_2+Z_{13}$*$I_3+$ . . . . In order to make the voltage on a lossy subsection proportional to the current flowing through it as per Ohm's Law, the corresponding Method of Moments impedance (Z) matrix is modified by subtracting the Ohmically-generated voltage (those voltages resulting from the modeled current flowing through a lossy subsection) from the appropriate matrix elements. As with all the other reaction integrals, for a Galerkin technique, the electric field generated by the source subsection is multiplied by the basis function(s) forming the field subsection before integrating the generated electric field over the volume of the subsection. The procedure for including loss in the reaction integrals follows exactly the same procedure as indicated above, however the required integrals are often nearly trivial to perform and are detailed in Appendix 4.

Unlike the electromagnetically induced voltages, the Ohmically induced voltages affect only the subsections that the inducing current touches. Thus, if subsection 1 overlaps subsection 2, but is only adjacent to subsection 3, only $Z_{11}$ and $Z_{12}$ are modified (as above), but $Z_{13}$ is left alone as $I_1$ does not induce any Ohmic voltage on subsection 3. In the lossless case, then, the remaining voltages are set to zero;

whereas in the lossy case the remaining voltages are made to be proportional to the current flowing through the subsection as described above.

Conceptually, the above-described computer-implemented method can be described as follows: First, the entire circuit is subsectioned into small subsections. Next, a specific pre-determined current distribution is placed on one subsection (i.e., the basis function). That subsection is then taken all by itself and a voltage is calculated that, say, one Amp, on that subsection induces at the location of each of the other subsections (and on itself). This is performed for each subsection in turn. (Mathematically, this fills a matrix with all the pair-wise electromagnetic couplings.) Next, a current is placed on all the subsections at the same time and those currents are adjusted so that the total voltage induced on every subsection is zero. (Mathematically, this is done by matrix inversion.) In other words, a voltage cannot exist across a perfect conductor. To generate current in the circuit in the first place, a voltage must be placed on one or more subsections. That subsection can be viewed as the 'input connector'. The currents on all the subsections that give us zero voltage on all conductors (except the input connector) in the circuit form the current distribution on the circuit and is the solution. If there is loss (i.e., the conductors are not perfect conductors), the voltage on a conductor is not quite zero. Rather, current flowing in the conductor generates a small voltage across that conductor. This is just Ohm's Law and is realized by a small modification to the equations.

The above reaction integrals all assume the source and field subsections are completely within the same layer of dielectric. For a complete analysis, the reaction integrals between subsections within different layers must also be calculated. To do this, source subsection and field subsection are first selected. Then the reaction integral result with both source and field subsections within the same layer are determined using the equations presented above. However, for this example, the actual field subsection is within a different layer. The field layer can be viewed as being connected to the source layer by a cascade of rectangular waveguides (the sidewalls of the box and intervening layers of dielectric forming the waveguides). Since the coupling to the field subsection is a sum of waveguide modes, standard waveguide cascaded transmission line theory can be used to determine the modification of the amplitude of each waveguide mode that originates in the source layer once it arrives in the field layer. The modified waveguide mode amplitudes are then summed to realize the reaction integral for the field subsection in the field layer due to current in the source subsection in the source layer. This is detailed in Appendix 3.

A short description of the effectiveness of method 200, and, specifically, the use of tapered vias, follows. Presently, as described above, when using shielded 3-D multi-layer planar method of moments EM (electromagnetic) analysis, vertical current is modeled using only uniform vias. The current everywhere in a given block is vertically directed and is the same magnitude and phase. In an actual physical vertical circuit, the vertical current gradually and smoothly changes in both magnitude and phase as it flows along a long via. In order to accurately model this using uniform vias, a long via is modeled using a stack of short (with respect to wavelength) via blocks. While the magnitude and phase of the current on each block is still constant within the block, it can change from one block to the next.

For example, the current distribution on a quarter wave vertical dipole above a ground plane, in reality, is a quarter of a sine wave, with zero current at the top (open end) and maximum current at the bottom where it connects to a groundplane, with the current varying smoothly in between. Since this is a shielded analysis, antenna analysis is problematic. However, a vertical quarter wave open circuited stub is of interest and is considered below. Physically, it is nearly identical to the vertical quarter wave antenna, except for radiation. Just like the antenna, the open circuited stub has a sinusoidal current distribution.

Figure 5:
FIG. 5 shows a graph of the vertical current within a stack of rectangular prism subsections, according to an example.

FIG. 5 shows how this actual sinusoidal current is modeled when using only uniform vias. The actual smoothly varying (typically sinusoidal) current for a full half wave dipole or, in a shielded environment, a half wave resonator, is shown as curve 502, while the approximation using the uniform vias is shown as the piecewise-constant function 504, 506, 508, 510, 512. The error due to this piecewise-constant function model becomes smaller as shorter via blocks are used to model the open circuited stub. Accordingly, much finer meshing (i.e., shorter via blocks), and thus, many more subsections and longer analysis time, is required to achieve high accuracy.

If tapered vias are added to the uniform vias, with each tapered via occupying the exact same via block as each uniform via, by superposition, the current in each via block is now modeled as a constant plus a linear taper. This results in a piecewise-linear representation of the current along the length of the quarter wave long stub, as shown in FIG. 4B, again for a full half wave dipole, or, in a shielded environment, a half wave resonator. (Note that 'taper' refers only to the current density variation within the block. The physical shape of each via block is still a rectangular prism.) This represents the actual quarter wave sinusoid much more accurately than uniform vias alone. Thus, for a given accuracy, far fewer subsections are needed.

Figure 6:
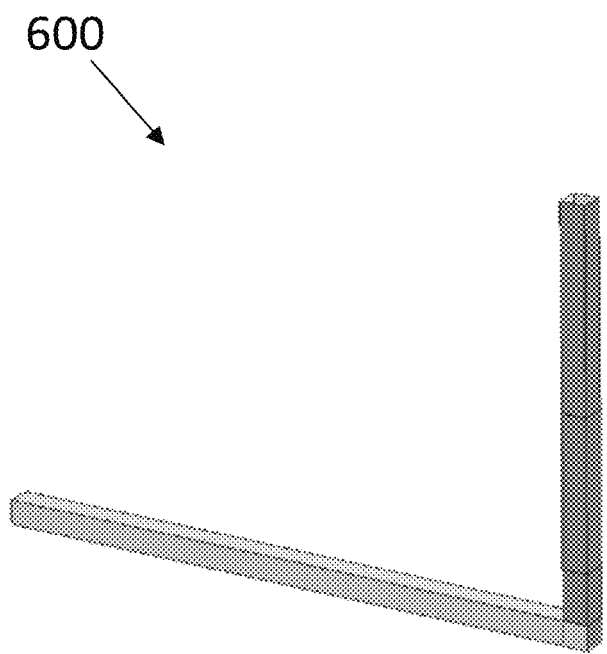
FIG. 6 shows a perspective view of a circuit disposed in a shielded media, according to an example.
Figure 7:
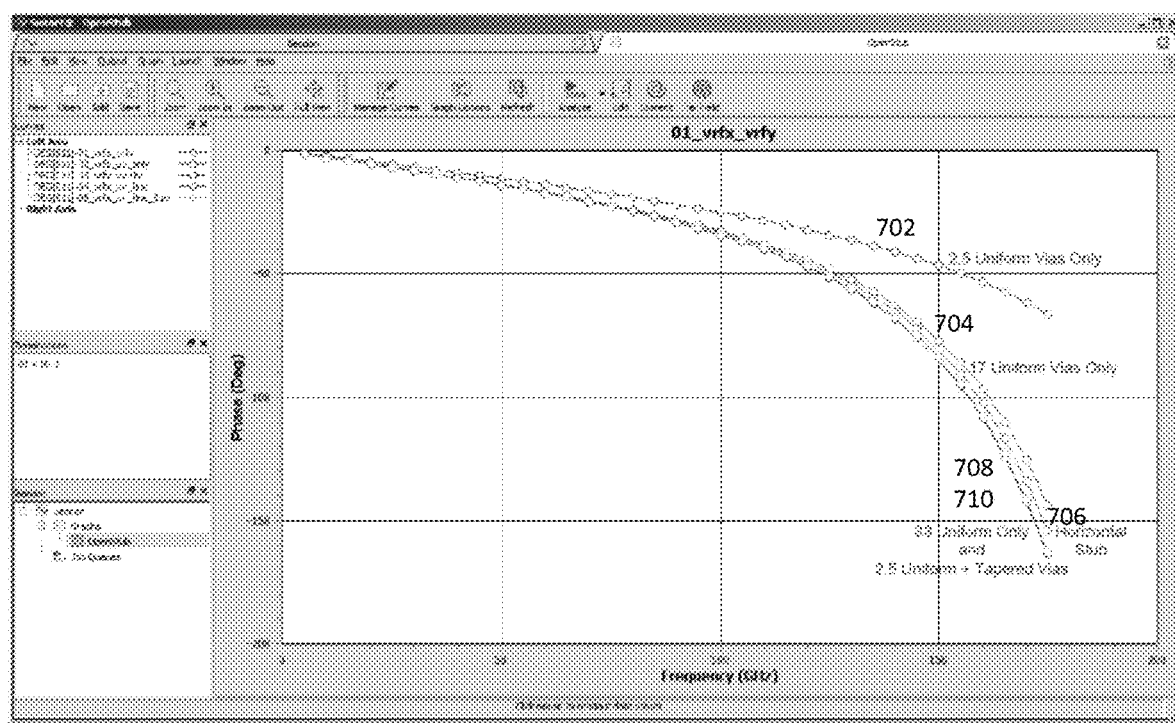
FIG. 7 shows a graph of the modeled circuit over a plurality of frequencies under multiple meshing techniques and numbers of subsections, according to an example.

FIG. 6 shows a vertical open circuited stub. The stub is fed by a horizontal transmission line in order to verify the successful transition from horizontal to vertical current, as well as to verify the substantial increase in accuracy that tapered vias allow on the vertical portion of the stub. The vertical stub in this figure is divided into 2.5 via blocks (the bottom via block is half the length of the other via blocks and is counted as half of a block for speed calculation) as indicated by horizontal lines dividing the length of the vertical stub. FIG. 7 shows results for the various meshing alternatives. Curve 702 shows the result when using only long uniform via blocks, 2.5 of them, along the length of the stub. Note that this result is substantially different from all the other curves. Expecting that the difference is due to the piecewise-constant approximation (shown in FIG. 5) to the actual sinusoidal current, the circuit is re-meshed with 17 via blocks, each a 10 micron cube. Only uniform vias are used, one per block, so the result is a much finer piecewise-constant approximation to the actual sinusoidal current. The result of the 17 uniform via blocks is shown as curve 704, a result much closer to the remaining curves.

To estimate the correct answer, the same open stub is rotated by 90 degrees about the horizontal feed line so that the entire open circuited stub is horizontal and the entire circuit can be analyzed using only the previously validated horizontal volume rooftop subsections. This is shown as curve 706. Curve 704 is close but not the same, still bearing some level of inaccuracy.

The lowest two curves 708 and 710 are nearly identical, one on top of the other. One of the curves uses 2.5 via blocks with both uniform and tapered vias. This meshing results in the current on the vertical stub being modeled in a piecewise-linear fashion, similar to FIG. 4B. The other curve shows results using 33 via blocks, each 5 microns long, filled with uniform vias only, which results in a piecewise-constant representation of the current on the stub, similar to FIG. 5.

The analysis results include both the horizontal feedline and the vertical stub. This makes the stub by itself nearly $\frac{1}{8}^{th}$ of a wavelength long at the highest frequency, 175 GHz and 2.5 via blocks per $\frac{1}{8}^{th}$ wavelength gives 20 via blocks per wavelength. Using two via subsections, one uniform via and one tapered via, per block means there are 40 subsections per wavelength for a piecewise-linear representation of the current. Using 33 via blocks with uniform vias only to model the $\frac{1}{8}^{th}$ wavelength stub means 264 via blocks per wavelength are employed, with one uniform via subsection for each via block resulting in a piecewise-constant representation of the current. These two meshings yield nearly the same accuracy. Since both of these results are virtually identical, and both of these results have higher degrees of freedom (i.e., more subsections) than the horizontal version of this stub described above, it is reasonable to conclude that these two results are the most accurate.

Based on these two final results, we conclude that using uniform plus tapered vias allows modelling a vertical circuit with 264/40≅6.6 times fewer subsections. This means that the matrix solve is now about $6.6^3$≅280 times faster for vertical circuits, as described above. This result will scale independent of circuit or structure size. In otherwords, one stub, or a thousand stubs will see about the same factor increase in speed of the main bottleneck in this analysis, the matrix solve.

In conclusion, the tapered via enables a drastic reduction in analysis time and permits computers to solve previously unsolvable vertical current distribution. The use of tapered vias thus improves the functioning of a computer, allowing computers to perform simulations that computers were previously unable to perform within reasonable time constraints.

Actions associated with implementing all or part of the functions can be performed by one or more programmable processors executing one or more computer programs to perform the computer implemented method. Processors suitable for the execution of a computer program include, by way of example, both general and special purpose, and any one or more processors of any kind of digital computer. Generally, a processor will receive instructions and data from a read-only memory or a random-access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The examples and methods described above are better understood in connection with the appendices detailed below.

Appendix 1

Basic Variables

Index i is used for summing over all m, n, TE, TM modes.

Index j goes over all dielectric layers, starting with layer j=0 at the top and increases going down. This index is distinct from $j=\sqrt{-1}$. Which is in use is determined by context. The z coordinate starts at zero at the bottom and increases going up.

Wavenumber $k=2\pi/\lambda=\omega\sqrt{\mu\varepsilon}$ in general. Modal admittances are the ratio of H over E of the standing wave modes, and thus differ by a factor of j from the usual traveling wave modal admittances.

$$k_{iz}^{(j)} = \sqrt{k_j^2 - k_c^2} \qquad (1)$$

$$k_c^2 = \left(\frac{m\pi}{a}\right)^2 + \left(\frac{n\pi}{b}\right)^2 = k_x^2 + k_y^2 \qquad (1a)$$

$$Y_{i,TE}^{(j)} = \frac{k_{iz}^{(j)}}{j\omega\mu_j} \qquad (2)$$

$$Y_{i,TM}^{(j)} = -\frac{j\omega\varepsilon_j}{k_{iz}^{(j)}} \qquad (3)$$

Transverse normalized modal vectors:

$$e_{iTE} = \sqrt{\frac{2}{ab}} \sin(k_y y)u_x \quad m=0, \qquad (4)$$

$$n > 0,$$

$$= -\sqrt{\frac{2}{ab}} \sin(k_x x)u_y \quad m > 0, \qquad (5)$$

$$n = 0,$$

otherwise for $m$ and $n > 0$:

$$= 2\sqrt{\frac{ab}{n^2a^2 + m^2b^2}} \left[\frac{n}{b}\cos(k_x x)\sin(k_y y)u_x - \frac{m}{a}\sin(k_x x)\cos(k_y y)u_y\right]. \qquad (6)$$

$$h_{iTE} = \sqrt{\frac{2}{ab}} \sin(k_y y)u_y \quad m=0, \qquad (7)$$

$$n > 0,$$

$$= \sqrt{\frac{2}{ab}} \sin(k_x x)u_x \quad m > 0, \qquad (8)$$

$$n = 0,$$

otherwise for $m$ and $n > 0$:

$$= 2\sqrt{\frac{ab}{n^2a^2 + m^2b^2}} \left[\frac{m}{a}\sin(k_x x)\cos(k_y y)u_x + \frac{n}{b}\cos(k_x x)\sin(k_y y)u_y\right]. \qquad (9)$$

For the TM modal vectors, both m and n>0:

$$e_{iTM} = 2\sqrt{\frac{ab}{n^2a^2 + m^2b^2}} \left[\frac{m}{a}\cos(k_xx)\sin(k_yy)u_x + \frac{n}{b}\sin(k_xx)\cos(k_yy)u_y\right]. \quad (10)$$

$$= N_2 g_1 u_x + N_1 g_2 u_y \quad (10a)$$

$$h_{iTM} = 2\sqrt{\frac{ab}{n^2a^2 + m^2b^2}} \left[-\frac{n}{b}\sin(k_xx)\cos(k_yy)u_x + \frac{m}{a}\cos(k_xx)\sin(k_yy)u_y\right]. \quad (11)$$

$$= -N_1 g_2 u_x + N_2 g_1 u_y \quad (11a)$$

where $N_1 = \frac{2k_y}{k_c\sqrt{ab}}$, $N_2 = \frac{2k_x}{k_c\sqrt{ab}}$, $\quad (11b)$ $g_1 = \cos(k_xx)\sin(k_yx)$, and $g_2 = \sin(k_xx)\cos(k_yx)$ Transverse fields for the $j^{th}$ layer and the $j^{th}$ (m, n, TE, TM) mode:

$$E_{it}^{(j)} = \{F_i^{(j)}\sin(k_{iz}^{(j)}z) + G_i^{(j)}\cos(k_{iz}^{(j)}z)\}e_i, \quad (12)$$

$$H_{it}^{(j)} = -Y_i^{(j)}\{F_i^{(j)}\cos(k_{iz}^{(j)}z) - G_i^{(j)}\sin(k_{iz}^{(j)}z)\}h_i. \quad (13)$$

F and G are set to match boundary conditions at top and bottom covers. If we change z to c–z, then also change sign of H.

The full TM$^z$ field (from pg. 90 of my first notebook, there is no z-component in the TM Magnetic field, the yellow highlighted portion is the only addition to (12) and (13)):

*i for TM modes ONLY:*

$$E_i^{(j)} = \{F_i^{(j)}\sin(k_{iz}^{(j)}z) + G_i^{(j)}\cos(k_{iz}^{(j)}z)\}e_i - k_{iz}^{(j)}N_3 g_3(x, y)\{F_i^{(j)}\cos(k_{iz}^{(j)}z) - G_i^{(j)}\sin(k_{iz}^{(j)}z)\}u_z, \quad (14)$$

$$H_i^{(j)} = -Y_i^{(j)}\{F_i^{(j)}\cos(k_{iz}^{(j)}z) - G_i^{(j)}\sin(k_{iz}^{(j)}z)\}h_i. \quad (15)$$

where $N_3 = \frac{2k_c}{(k_{iz}^{(j)})^2\sqrt{ab}}$, $g_3 = \sin(k_xx)\sin(k_yy)$ $\quad (16)$ If we change z to (z–c), then also change sign of H and change the sign of the z-component of E (which is highlighted in yellow).

When there is only one layer, or all layers have the same dielectric, the j index is not used, which simplifies the notation.

General Representation of Fields in Layered Shielded Media

In general, we use the following form for the z-dependence of all transverse electric fields in layer $k_{iz}$ when those fields are referenced to the top cover:

$$F_{iT}^{(j)}\sin(k_{iz}^{(j)}(c_j - z)) + G_{iT}^{(j)}\cos(k_{iz}^{(j)}(c_j - z)), \text{ or} \quad (17)$$

$$F_{iT}^{(j)}\{\sin(k_{iz}^{(j)}(c_j - z)) + r_{iT}^{(j)}\cos(k_{iz}^{(j)}(c_j - z))\} \quad (18)$$

-continued where: $r_{iT}^{(j)} = \quad (19)$ $\frac{G_{iT}^{(j)}}{F_{iT}^{(j)}}$ and $c_j$ is the z coordinate of the top of the $j^{th}$ layer.

The z-coordinate of the top cover is $c_0$. The top dielectric layer is Layer 0.

With the above form of the z-dependence used for electric fields, we must use the following form for magnetic fields:

$$F_{iT}^{(j)}\cos(k_{iz}^{(j)}(c_j-z)) - G_{iT}^{(j)}\sin(k_{iz}^{(j)}(c_j-z)), \text{ or} \quad (20)$$

$$F_{iT}^{(j)}\{\cos(k_{iz}^{(j)}(c_j-z)) - r_{iT}^{(j)}\sin(k_{iz}^{(j)}(c_j-z))\} \quad (21)$$

For fields referenced to the bottom cover, we substitute a $(z-c_{j+1})$ dependence, where $c_{j+1}$ is the z-coordinate of the bottom of the $j^{th}$ layer. The notation for the constants changes as follows:

$$F_{iT}^{(j)} \to F_{iB}^{(j)}, G_{iT}^{(j)} \to G_{iB}^{(j)}, r_{iT}^{(j)} \to r_{iB}^{(j)} \quad (22)$$

If there are two layers, N=1, and the layers are numbered 0 and 1. With layer numbers going from 0 (at the top) to N (at the bottom, there are N+1 layers and the z-coordinate of the bottom cover, the bottom of the bottom Layer N is $c_{N+1}=0=$.

To match boundary conditions at the top cover, and to make transverse fields continuous across dielectric boundaries for fields referenced to the top cover, we use the following expressions for F and G (layer 0 is the top-most layer):

$$F_{iT}^{(0)} = 1, \ G_{iT}^{(0)} = r_{iT}^{(0)} \quad (23)$$

$$r_{iT}^{(j)} = \frac{G_{iT}^{(j)}}{F_{iT}^{(j)}} = Y_i^{(j)} R_{iT}^{(j)} \quad (24)$$

$$G_{iT}^{(j+1)} = F_{iT}^{(j)}\sin(k_{iz}^{(j)}h_j) + G_{iT}^{(j)}\cos(k_{iz}^{(j)}h_j) \quad (25)$$

$$F_{iT}^{(j+1)} = \frac{Y_i^{(j)}}{Y_i^{(j+1)}}\left[F_{iT}^{(j)}\cos(k_{iz}^{(j)}h_j) - G_{iT}^{(j)}\sin(k_{iz}^{(j)}h_j)\right] \quad (26)$$

The above quantities are used to represent fields starting at the top (0) layer, and working down. For example, for the first two layers on top, we have:

$$E_t^{(0)} = \Sigma V_{iT}\{\sin(k_{iz}^{(0)}(c_0-z)) + r_{iT}^{(0)}\cos(k_{iz}^{(0)}(c_0-z))\}e_i \quad (27)$$

$$H_t^{(0)} = \Sigma V_{iT}Y_i^{(0)}\{\cos(k_{iz}^{(0)}(c_0-z)) - r_{iT}^{(0)}\sin(k_{iz}^{(0)}(c_0-z))\}h_i \quad (28)$$

$$E_t^{(1)} = \Sigma V_{iT}F_{iT}^{(1)}\{\sin(k_{iz}^{(1)}(c_1-z)) + r_{iT}^{(1)}\cos(k_{iz}^{(1)}(c_1-z))\}e_i \quad (29)$$

$$H_t^{(1)} = \Sigma V_{iT}Y_i^{(1)}\{\cos(k_{iz}^{(1)}(c_1-z)) - r_{iT}^{(1)}\sin(k_{iz}^{(1)}(c_1-z))\}h_i \quad (30)$$

Notice that we meet the impedance boundary condition at the top cover, $$z = c_0, \frac{E_x^{(0)}}{H_y^{(0)}} = -\frac{E_y^{(0)}}{H_x^{(0)}} = R_{iT}^{(0)},$$

and that both electric and magnetic fields are continuous at $z=c_1$.

If the bottom layer is Layer N, then:

$$F_{iB}^{(N)} = 1, \quad G_{iB}^{(N)} = r_{iB}^{(N)} \tag{31}$$

$$r_{iB}^{(N)} = \frac{G_{iT}^{(N)}}{F_{iB}^{(N)}} = Y_i^{(N)} R_{iB}^{(N)} \tag{32}$$

$$G_{iB}^{(j-1)} = F_{iB}^{(j)} \sin(k_{iz}^{(j)} h_j) + G_{iB}^{(j)} \cos(k_{iz}^{(j)} h_j) \tag{33}$$

$$F_{iB}^{(j-1)} = \frac{Y_i^{(j)}}{Y_i^{(j-1)}} [F_{iB}^{(j)} \cos(k_{iz}^{(j)} h_j) - G_{iB}^{(j)} \sin(k_{iz}^{(j)} h_j)] \tag{34}$$

The above quantities are used to represent fields starting at the bottom, layer N and working up. (Reminder: If there are two layers, N=1, and the layers are numbered 0 and 1.) For the first two layers on bottom (the physically higher layer listed first), we have:

$$E_t^{(N-1)} = \Sigma V_{iB} F_{iB}^{(N-1)} \{\sin(k_{iz}^{(N-1)}(z-c_N)) + r_{iB}^{(N-1)} \cos(k_{iz}^{(N-1)}(z-c_N))\} e_i \tag{35}$$

$$H_t^{(N-1)} = -\Sigma V_{iB} Y_i^{(N-1)} F_{iB}^{(N-1)} \{\cos(k_{iz}^{(N-1)}(z-c_N)) - r_{iB}^{(N-1)} \sin(k_{iz}^{(N-1)}(z-c_N))\} h_i \tag{36}$$

$$E_t^{(N)} = \Sigma V_{iB} \{\sin(k_{iz}^{(N)} z) + r_{iB}^{(N)} \cos(k_{iz}^{(N)} z)\} e_i \tag{37}$$

$$H_t^{(N)} = -\Sigma V_{iB} Y_i^{(N)} \{\cos(k_{iz}^{(N)} z) - r_{iB}^{(N)} \sin(k_{iz}^{(N)} z)\} h_i \tag{38}$$

Notice that we meet the impedance boundary condition at the bottom cover $$z = 0, \quad -\frac{E_x^{(N)}}{H_y^{(N)}} = \frac{E_y^{(N)}}{H_x^{(N)}} = R_{iB}^{(N)}$$

and that both electric and magnetic fields are continuous at $z=c_N$.

Layer 0 is at the top, and Layer N is at the bottom of the dielectric stack. The top of Layer j is at $z=c_j$ and is referred to as Level j. The bottom of Layer j is at $z=c_{j+1}$ referred to as Level (j+1). The thickness of Layer j is $h_j=c_j-c_{j+1}$. Thus, the top cover is Level 0, and the next level down is Level 1. The bottom cover is Level N+1 and is located at z=0. If there are two dielectric layers, then N=1 and we have Layers 0 and 1, and Levels 0, 1, and 2. Note: In Sonnet, for historical reasons, level numbers are one less than what is used here. The Layer numbers are the same.

Thus, a level takes the number of the layer directly below it. Often, we represent the fields above a given level, j, with equations of the form of (29) and (30), and the fields below with equations of the form of (35) and (36). In this case, for the fields above Level j we have (39) and (40) with modal coefficients $V_{iT}$, and for the fields below Level j we have (41) and (42) with modal coefficients $V_{iB}$:

$$E_t^{(j-1)} = \Sigma V_{iT} F_{iT}^{(j-1)} \{\sin(k_{iz}^{(j-1)}(c_{j-1}-z)) + r_{iT}^{(j-1)} \cos(k_{iz}^{(j-1)}(c_{j-1}-z))\} e_i \tag{39}$$

$$H_t^{(j-1)} = \Sigma V_{iT} Y_i^{(j-1)} F_{iT}^{(j-1)} \{\cos(k_{iz}^{(j-1)}(c_{j-1}-z)) - r_{iT}^{(j-1)} \sin(k_{ix}^{(j-1)}(c_{j-1}-z))\} h_i \tag{40}$$

$$E_t^{(j)} = \Sigma V_{iB} F_{iB}^{(j)} \{\sin(K_{iz}^{(j)}(z-c_{j+i})) + r_{iB}^{(j)} \cos(k_{iz}^{(j)}(z-c_{j+1}))\} e_i \tag{41}$$

$$H_t^{(j)} = \Sigma V_{iB} Y_i^{(j)} F_{iB}^{(j)} \{\cos(k_{iz}^{(j)}(z-c_{j+1})) - r_{iB}^{(j)} \sin(k_{iz}^{(j)}(z-c_{j+1}))\} h_i \tag{42}$$

For a complete description of the fields in the entire structure, we need to make sure that the electric-fields are continuous across level j, thus we set (39) equal to (41) at $z=c_j$, and then use (25) and (33), yielding:

$$V_{iT} F_{iT}^{(j-1)} \{\sin(k_{iz}^{(j-1)} h_{j-1}) + r_{iT}^{(j-1)} \cos(k_{iz}^{(j-1)} h_{j-1})\} = V_{iB} F_{iB}^{(j-1)} \{\sin(k_{iz}^{(j)} h_j) + r_{iB} \cos(k_{iz}^{(j)} h_j)\} V_{iT} G_{iT}^{(j-1)} = V_{iB} G_{iB}^{(j-1)} \tag{44}$$

We can use the same weighting coefficients, $V_i$, for both summations if we select:

$$V_i = V_{iT} G_{iT}^{(j)} = V_{iB} G_{iB}^{(j-1)} \tag{45}$$

$$V_{iT} = \frac{V_i}{G_{iT}^{(j)}} \text{ and } V_{iB} = \frac{V_i}{G_{iB}^{(j-1)}} \tag{46}$$

This gives us the fields above, Layer (j−1), and below Level j, Layer (j) as:

$$E_t^{(j-1)} = \tag{47}$$
$$\sum \frac{V_i}{G_{iT}^{(j)}} F_{iT}^{(j-1)} \{\sin(k_{iz}^{(j-1)}(c_{j-1}-z)) + r_{iT}^{(j-1)} \cos(k_{iz}^{(j-1)}(c_{j-1}-z))\} e_i$$

$$H_t^{(j-1)} = \sum \frac{V_i}{G_{iT}^{(j)}} Y_i^{(j-1)} F_{iT}^{(j-1)} \tag{48}$$
$$\{\cos(k_{iz}^{(j-1)}(c_{j-1}-z)) - r_{iT}^{(j-1)} \sin(k_{iz}^{(j-1)}(c_{j-1}-z))\} h_i$$

$$E_t^{(j)} = \sum \frac{V_i}{G_{iB}^{(j-1)}} F_{iB}^{(j)} \{\sin(k_{iz}^{(j)}(z-c_{j+1})) + r_{iB}^{(j)} \cos(k_{iz}^{(j)}(z-c_{j+1}))\} e_i \tag{49}$$

$$H_t^{(j)} = \tag{50}$$
$$-\sum \frac{V_i}{G_{iB}^{(j-1)}} Y_i^{(j)} F_{iB}^{(j)} \{\cos(k_{iz}^{(j)}(z-c_{j+1})) - r_{iB}^{(j)} \sin(k_{iz}^{(j)}(z-c_{j+1}))\} h_i$$

Now of interest is the discontinuity in tangential magnetic field at Level j, $z=c_j$, between Layers j−1 and j:

$$[H_t^{(j-1)} - H_t^{(j)}]_{z=c_j} = \tag{51}$$
$$\sum \frac{V_i}{G_{iT}^{(j)}} Y_i^{(j-1)} F_{iT}^{(j-1)} \{\cos(k_{iz}^{(j-1)} h_{j-1}) - r_{iT}^{(j-1)} \sin(k_{iz}^{(j-1)} h_{j-1})\} h_i +$$
$$+ \sum \frac{V_i}{G_{iB}^{(j-1)}} Y_i^{(j)} F_{iB}^{(j)} \{\cos(k_{iz}^{(j)} h_j) - r_{iB}^{(j)} \sin(k_{iz}^{(j)} h_j)\} h_i$$

Using (26) and (34), we can now define $\hat{Y}_i^{(j)}$:

$$[H_t^{(j-1)} - H_t^{(j)}]_{z=c_j} = \sum V_i \left( Y_i^{(j)} \frac{F_{iT}^{(j)}}{G_{iT}^{(j)}} + Y_i^{(j-1)} \frac{F_{iB}^{(j-1)}}{G_{iB}^{(j-1)}} \right) h_i \tag{52}$$

$$= \sum V_i \hat{Y}_i^{(j)} h_i \tag{53}$$

where $\hat{Y}_i^{(j)} = \left( Y_i^{(j)} \frac{F_{iT}^{(j)}}{G_{iT}^{(j)}} + Y_i^{(j-1)} \frac{F_{iB}^{(j-1)}}{G_{iB}^{(j-1)}} \right) = \left( \frac{1}{R_{iT}^{(j)}} + \frac{1}{R_{iB}^{(j-1)}} \right)$ (54)

Physically, $\hat{Y}_i^{(j)}$ is the admittance of the top cover rotated through the layers above Level j to Level j and connected in parallel with the admittance of the bottom cover rotated through the layers below Level j to Level j. Note that while the j in the waveguide characteristic admittance, $\hat{Y}_i^{(j)}$, refers to Layer j, the j in $\hat{Y}_i^{(j)}$ refers to Level j.

For j=0 or N+1 it might appear that values are needed for $Y_i^{(-1)}$ or $Y_i^{(N+1)}$, which are in non-existent layers. However, in all such cases, the non-existent characteristic admittances cancel with the same quantity in $F_{iB}^{(-1)}$, (34), or $F_{iT}^{(N+1)}$ (26). Numerically, those characteristic admittances can be set to any arbitrary value as long as they are not set to zero.

Typically, the discontinuity in tangential magnetic field at Level j (caused by the source current) is set equal to (53) and this determines the $V_i$. Then (39)-(42) determine the fields in all layers.

Fields Surrounding an Original Via in a Three-Layered Medium

Figure 8:
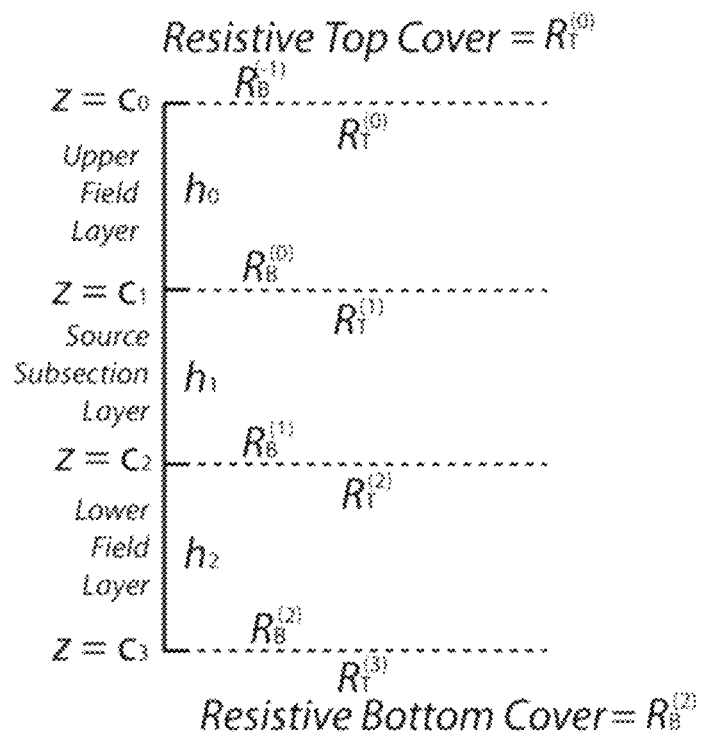
FIG. 8 shows a schematic of the fields surrounding multiple layers, according to an example.

For the new vias, we start with three layers and place a via only on the middle layer, illustrated in FIG. 8. Then we take the limit of the resulting fields as the thickness of the middle layer goes to zero. This is the Green's function for z-directed current in a layered medium. We then use that Green's function to characterize a uniform and a tapered via.

From this point forward, we assume that the dielectric of all three substrates is the same. In other words, $k_{iz}^{(j)} = k_{iz}$ and $Y_i^{(j)} = Y_i$ for all j.

For the R variables, a T subscript means the impedance of the top cover ($R_T^{(0)}$) transformed down the layer stack by the intervening waveguides to the indicated level. The number in the parentheses in the superscript refers to the dielectric layer. The B subscript means that it is the impedance of the bottom cover ($R_B^{(2)}$) transformed up the layer stack to the indicated level.

Because the exciting source is a z-directed current, all fields are TM only, see (29), (30), (37), (38) in the ViasOriginal document. As described in that document, the via fields are represented by two weighted summations. The first summation, weighted by $V_{ia}$, represents fields with a discontinuity in the tangential magnetic field at Level 1. This marks the top end of the via. The second summation, weighted by $V_{ib}$, provides the same discontinuity with opposite sign at Level 2. This marks the bottom end of the via. Adapting (47)-(50) with j=1 for the $V_{ia}$ summation j=2 for the $V_{ib}$ summation, the transverse fields for each layer in the above figure are:

$$E_t^{(0)} = \sum_{TM} \left(\frac{V_{ia}}{G_{iT}^{(1)}} - \frac{V_{ib}}{G_{iT}^{(2)}}\right)\{\sin(k_{iz}(c_0 - z)) + r_{iT}^{(0)}\cos(k_{iz}(c_0 - z))\}e_i \quad (55)$$

$$H_t^{(0)} = \sum_{TM} \left(\frac{V_{ia}}{G_{iT}^{(1)}} - \frac{V_{ib}}{G_{iT}^{(2)}}\right)Y_i\{\cos(k_{iz}(c_0 - z)) - r_{iT}^{(0)}\sin(k_{iz}(c_0 - z))\}h_i \quad (56)$$

$$E_t^{(1)} = \sum_{TM} \left(\frac{V_{ia}}{G_{iB}^{(0)}}F_{iB}^{(1)}\{\sin(k_{iz}(z - c_2)) + r_{iB}^{(1)}\cos(k_{iz}(z - c_2))\} - \frac{V_{ib}}{G_{iT}^{(2)}}F_{iT}^{(1)}\{\sin(k_{iz}(c_1 - z)) + r_{iT}^{(1)}\cos(k_{iz}(c_1 - z))\}\right)e_i \quad (57)$$

$$H_t^{(1)} = \sum_{TM} \begin{pmatrix} F_R(\Delta x)F_R(\Delta y)N_3g_3(x_0, y_0) - \frac{V_{ia}}{G_{iB}^{(0)}}Y_iF_{iB}^{(1)} \\ \{\cos(k_{iz}(z - c_2)) - r_{iB}^{(1)}\sin(k_{iz}(z - c_2))\} \\ -\frac{V_{ib}}{G_{iT}^{(2)}}Y_iF_{iT}^{(1)}\{\cos(k_{iz}(c_1 - z)) - r_{iT}^{(1)}\sin(k_{iz}(c_1 - z))\} \end{pmatrix} h_i \quad (58)$$

$$E_t^{(2)} = \sum_{TM} \left(\frac{V_{ia}}{G_{iB}^{(0)}} - \frac{V_{ib}}{G_{iB}^{(1)}}\right)\{\sin(k_{iz}z) + r_{iB}^{(2)}\cos(k_{iz}z)\}e_i \quad (59)$$

$$H_t^{(2)} = -\sum_{TM} \left(\frac{V_{ia}}{G_{iB}^{(0)}} - \frac{V_{ib}}{G_{iB}^{(1)}}\right)Y_i\{\cos(k_{iz}z) - r_{iB}^{(2)}\sin(k_{iz}z)\}h_i \quad (60)$$

In (58), the minus sign in front of the $V_{ia}$ summation is because of the $(z-c_2)$ dependence. The minus sign in front of the $V_{ib}$ summation is because we are subtracting that summation from the $V_{ia}$ summation. All fields are proportional to the current on the via, assumed above to be unity.

For the above fields, there is a discontinuity in transverse magnetic field in the $V_{ia}$ summation at $z=c_1$ and a discontinuity in the transverse magnetic field in the $V_{ib}$ summation at $z=c_2$. The total transverse magnetic field also includes the transverse magnetic field due to the via current in Layer 1, i.e., the first term of (58), see (27) in the ViasOriginal document. Since the total magnetic field must be continuous across both Level 1 and Level 2, we solve for the $V_{ia}$ that make the field continuous across Level 1 at $z=c_1$ and for the $V_{ib}$ to make the field continuous across Level 2 at $z=c_2$. See, for example (30) in the ViasOriginal document. Using (53):

$$[H_t^{(0)} - H_t^{(1)}]_{z=c_1} = \sum_{TM} \left(V_{ia}\hat{Y}_i^{(1)} - F_R(\Delta x)F_R(\Delta y)N_3g_3(x_0, y_0)\right)h_i = 0 \quad (61)$$

$$V_{ia} = \hat{Z}_i^{(1)}F_R(\Delta x)F_R(\Delta y)N_3g_3(x_0, y_0) \quad (62)$$

$$[H_t^{(1)} - H_t^{(2)}]_{z=c_2} = -\sum_{TM} \left(V_{ib}\hat{Y}_i^{(2)} - F_R(\Delta x)F_R(\Delta y)N_3g_3(x_0, y_0)\right)h_i = 0 \quad (63)$$

$$V_{ib} = \hat{Z}_i^{(2)}F_R(\Delta x)F_R(\Delta y)N_3g_3(x_0, y_0) \quad (64)$$

For determining the system matrix coefficients, we are interested only in the electric field. Substituting (62) and (64) into (55), (57), and (59), we obtain the transverse electric field:

$$E_t^{(0)} = \qquad (65)$$
$$\sum_{TM} F_R(\Delta x)F_R(\Delta y)N_3g_3(x_0, y_0)\left(\frac{\hat{Z}_i^{(1)}}{G_{iT}^{(1)}} - \frac{\hat{Z}_i^{(2)}}{G_{iT}^{(2)}}\right)\{\sin(k_{iz}(c_0 - z)) + r_{iT}^{(0)}\cos(k_{iz}(c_0 - z))\}e_i$$

$$E_t^{(1)} = \sum_{TM} F_R(\Delta x)F_R(\Delta y)N_3g_3(x_0, y_0) \qquad (66)$$
$$\left(\frac{\hat{Z}_i^{(1)}}{G_{iB}^{(0)}}F_{iB}^{(1)}\{\sin(k_{iz}(z - c_2)) + r_{iB}^{(1)}\cos(k_{iz}(z - c_2))\} - \frac{\hat{Z}_i^{(2)}}{G_{iT}^{(2)}}F_{iT}^{(1)}\{\sin(k_{iz}(c_1 - z)) + r_{iT}^{(1)}\cos(k_{iz}(c_1 - z))\}\right)e_i$$

$$E_t^{(2)} = \sum_{TM} F_R(\Delta x)F_R(\Delta y)N_3g_3(x_0, y_0)\left(\frac{\hat{Z}_i^{(1)}}{G_{iB}^{(0)}} - \frac{\hat{Z}_i^{(2)}}{G_{iB}^{(1)}}\right)\{\sin(k_{iz}z) + r_{iB}^{(2)}\cos(k_{iz}z)\}e_i \quad (67)$$

Checking for continuous transverse electric field across both dielectric interfaces, using (25) and (33):

$$[E_t^{(0)}]_{z=c_1} = \qquad (68)$$
$$[E_t^{(1)}]_{z=c_1} = \sum_{TM} F_R(\Delta x)F_R(\Delta y)N_3g_3(x_0, y_0)\left(\hat{Z}_i^{(1)} - \hat{Z}_i^{(2)}\frac{G_{iT}^{(1)}}{G_{iT}^{(2)}}\right)e_i$$

-continued $$[E_t^{(1)}]_{z=c_2} = \quad (69)$$

$$[E_t^{(2)}]_{z=c_2} = \sum_{TM} F_R(\Delta x) F_R(\Delta y) N_3 g_3(x_0, y_0) \left( \hat{Z}_i^{(1)} \frac{G_{iB}^{(1)}}{G_{iB}^{(0)}} - \hat{Z}_i^{(2)} \right) e_i$$

Note that (68) is consistent with (54) in the ViasOriginal document, and that (69) is consistent with (51) in the ViasOriginal document.

We also need the vertical, z-directed, electric fields due to the via. Using (14):

$$E_z^{(0)} = \sum_{TM} F_R(\Delta x) F_R(\Delta y) k_{iz} N_3^2 g_3(x_0, y_0) g_3(x, y) \quad (70)$$

$$\left( \frac{\hat{Z}_i^{(1)}}{G_{iT}^{(1)}} - \frac{\hat{Z}_i^{(2)}}{G_{iT}^{(2)}} \right) \{\cos(k_{iz}(c_0 - z)) - r_{iT}^{(0)} \sin(k_{iz}(c_0 - z))\} u_z$$

$$E_z^{(1)} = -\sum_{TM} F_R(\Delta x) F_R(\Delta y) g_3(x_0, y_0) g_3(x, y) \quad (71)$$

$$\left( k_{iz} N_3^2 \frac{\hat{Z}_i^{(1)}}{G_{iB}^{(0)}} F_{iB}^{(1)} \{\cos(k_{iz}(z - c_2)) - r_{iB}^{(1)} \sin(k_{iz}(z - c_2))\} + \right.$$

$$N_3^2 k_{iz} \frac{\hat{Z}_i^{(2)}}{G_{iT}^{(2)}} F_{iT}^{(1)} \{\cos(k_{iz}(c_1 - z)) - r_{iT}^{(1)} \sin(k_{iz}(c_1 - z))\} -$$

$$\left. \frac{4}{ab} \frac{j\omega\mu}{k_{iz}^2} \right) u_z$$

$$E_z^{(2)} = -\sum_{TM} F_R(\Delta x) F_R(\Delta y) k_{iz} N_3^2 g_3(x_0, y_0) \quad (72)$$

$$g_3(x, y) \left( \frac{\hat{Z}_i^{(1)}}{G_{iB}^{(0)}} - \frac{\hat{Z}_i^{(2)}}{G_{iB}^{(1)}} \right) \{\cos(k_{iz}z) - r_{iB}^{(2)} \sin(k_{iz}z)\} u_z$$

As mentioned in the text following (14), E normally (has a leading negative sign for a (z−c) dependence and a leading positive sign for a (c−z) dependence. In addition, the $\hat{Z}_i^{(2)}$ summation (which causes the via current to stop at Level 2) is subtracted from the $\hat{Z}_i^{(1)}$ summation (which causes the via current to start at Level 1). The combination of these two requirements determines the signs of (70)-(72).

The final term in (71) is from (26) of the ViasOriginal document. This is the z-directed electric field generated by the via itself. It corresponds to the transverse magnetic field of (27) in the ViasOriginal document, which is what generates the discontinuity in the total transverse magnetic field used in (61)-(64), above, to determine the modal amplitudes, $V_{ia}$ and $V_{ib}$.

Following is a list of all the F and G constants used above, written out according to (23)-(26) and (31)-(34). These equations are needed further on in this document.

$$G_{iT}^{(1)} = \sin(k_{iz}h_0) + r_{iT}^{(0)} \cos(k_{iz}h_0) \quad (73)$$

$$F_{iT}^{(1)} = \cos(k_{iz}h_0) - r_{iT}^{(0)} \sin(k_{iz}h_0) \quad (74)$$

$$G_{iT}^{(2)} = F_{iT}^{(1)} \sin(k_{iz}h_1) + G_{iT}^{(1)} \cos(k_{iz}h_1) \quad (75)$$

$$F_{iT}^{(2)} = \cos(k_{iz}h_1) - G_{iT}^{(1)} \sin(k_{iz}h_1) \quad (76)$$

$$G_{iB}^{(1)} = \sin(k_{iz}h_2) + r_{iB}^{(2)} \cos(k_{iz}h_2) \quad (77)$$

$$F_{iB}^{(1)} = \cos(k_{iz}h_2) - r_{iB}^{(2)} \sin(k_{iz}h_2) \quad (78)$$

$$G_{iB}^{(0)} = F_{iB}^{(1)} \sin(k_{iz}h_1) + G_{iB}^{(1)} \cos(k_{iz}h_1) \quad (79)$$

$$F_{iB}^{(0)} = F_{iB}^{(1)} \cos(k_{iz}h_1) - G_{iB}^{(1)} \sin(k_{iz}h_1) \quad (80)$$

In order to determine if the via creates a discontinuity in the z-directed electric field, we need to evaluate the electric field, (70)-(72), on each side of Level 1 and Level 2. (73)-(80) are used to simplify the expressions.

$$[E_z^{(0)}]_{z=c_1} = \quad (81)$$

$$\sum_{TM} F_R(\Delta x) F_R(\Delta y) k_{iz} N_3^2 g_3(x_0, y_0) g_3(x, y) \left( \frac{\hat{Z}_i^{(1)}}{G_{iT}^{(1)}} - \frac{\hat{Z}_i^{(2)}}{G_{iT}^{(2)}} \right) F_{iT}^{(1)} u_z$$

$$[E_z^{(1)}]_{z=c_1} = -\sum_{TM} F_R(\Delta x) F_R(\Delta y) g_3(x_0, y_0) \quad (82)$$

$$g_3(x, y) \left( k_{iz} N_3^2 \frac{\hat{Z}_i^{(1)}}{G_{iB}^{(0)}} F_{iB}^{(0)} + k_{iz} N_3^2 \frac{\hat{Z}_i^{(2)}}{G_{iT}^{(2)}} F_{iT}^{(1)} - \frac{4}{ab} \frac{j\omega\mu}{k_{iz}^2} \right) u_z$$

$$[E_z^{(1)}]_{z=c_2} = -\sum_{TM} F_R(\Delta x) F_R(\Delta y) g_3(x_0, y_0) \quad (83)$$

$$g_3(x, y) \left( k_{iz} N_3^2 \frac{\hat{Z}_i^{(1)}}{G_{iB}^{(0)}} F_{iB}^{(1)} + k_{iz} N_3^2 \frac{\hat{Z}_i^{(2)}}{G_{iT}^{(2)}} F_{iT}^{(2)} - \frac{4}{ab} \frac{j\omega\mu}{k_{iz}^2} \right) u_z$$

$$[E_z^{(2)}]_{z=c_2} = \quad (84)$$

$$-\sum_{TM} F_R(\Delta x) F_R(\Delta y) k_{iz} N_3^2 g_3(x_0, y_0) g_3(x, y) \left( \frac{\hat{Z}_i^{(1)}}{G_{iB}^{(0)}} - \frac{\hat{Z}_i^{(2)}}{G_{iB}^{(1)}} \right) F_{iB}^{(1)} u_z$$

Evaluating the discontinuity in z-directed electric field across Level 1 and then applying (54):

$$[E_z^{(0)} - E_z^{(1)}]_{z=c_1} = \sum_{TM} F_R(\Delta x) F_R(\Delta y) g_3(x_0, y_0) g_3(x, y) \quad (85)$$

$$\left\{ k_{iz} N_3^2 \hat{Z}_i^{(1)} \left( \frac{F_{iT}^{(1)}}{G_{iT}^{(1)}} + \frac{F_{iB}^{(0)}}{G_{iB}^{(0)}} \right) - \frac{4}{ab} \frac{j\omega\mu}{k_{iz}^2} \right\} u_z$$

$$= \sum_{TM} F_R(\Delta x) F_R(\Delta y) g_3(x_0, y_0) g_3(x, y) \quad (86)$$

$$\left\{ \frac{k_{iz} N_3^2}{Y_i} - \frac{4}{ab} \frac{j\omega\mu}{k_{iz}^2} \right\} u_z$$

$$= \sum_{TM} \frac{F_R(\Delta x) F_R(\Delta y) k_{iz} N_3^2 g_3(x_0, y_0) g_3(x, y)}{Y_i} \quad (86a)$$

$$\left\{ 1 - \frac{j\omega\mu k_{iz} Y_i}{k_c^2} \right\} u_z$$

Evaluating the discontinuity in z-directed electric field across Level 2 and then applying (54):

$$[E_z^{(1)} - E_z^{(2)}]_{z=c_2} = \sum_{TM} F_R(\Delta x) F_R(\Delta y) g_3(x_0, y_0) g_3(x, y) \quad (87)$$

$$\left\{ -k_{iz} N_3^2 \hat{Z}_i^{(2)} \left( \frac{F_{iT}^{(2)}}{G_{iT}^{(2)}} + \frac{F_{iB}^{(1)}}{G_{iB}^{(1)}} \right) + \frac{4}{ab} \frac{j\omega\mu}{k_{iz}^2} \right\} u_z$$

$$= \sum_{TM} F_R(\Delta x) F_R(\Delta y) g_3(x_0, y_0) g_3(x, y) \quad (88)$$

$$\left\{ -\frac{k_{iz} N_3^2}{Y_i} + \frac{4}{ab} \frac{j\omega\mu}{k_{iz}^2} \right\} u_z$$

$$\sum_{TM} \frac{g_3(x_0, y_0)g_3(x, y)}{Y_i} \frac{F_R(\Delta x)F_R(\Delta y)k_{iz}N_3^2}{} \quad (88a)$$

$$\left\{\frac{j\omega\mu k_{iz}Y_i}{k_c^2} - 1\right\}u_z$$

(86a) and (88a) are an alternative way to write (86) and (88) and are obtained by using (16) and noting that:

$$\left(\frac{4}{ab}\frac{j\omega\mu}{k_{iz}^2}\right)\left(\frac{Y_i}{k_{iz}N_3^2}\right) = \left(\frac{4}{ab}\frac{j\omega\mu}{k_{iz}^2}\right)\left(\frac{Y_i}{k_{iz}}\right)\left(\frac{k_{iz}^4 ab}{4k_c^2}\right) = \frac{j\omega\mu k_{iz}Y_i}{k_c^2} \quad (88b)$$

Note that the discontinuity in the electric field at both levels is independent of the via layer thickness. Also, if we take the limit as $h_1$ goes to zero of (81) and (84), we find that both $$[E_z^{(0)}]_{z=c_1} \text{ and } [E_z^{(2)}]_{z=c_2}$$

go to zero linearly with $h_1$, see (100) and (112), below. This means that z-directed electric field in the via layer, Layer 1, is equal to (88) when the via layer is infinitesimally thin. When we complete the Green's function, with an infinitesimally thin via layer, the effect of this z-directed electric field is included as an impulse of electric field at the level of the source current, $z=z'$, (122).

To evaluate the electric fields in the layer above the via, (65) and (70), per via length, as the length of the via, $h_1$, goes to zero, we need to evaluate:

$$\lim_{h_1 \to 0} \frac{1}{h_1}\left(\frac{\hat{Z}_i^{(1)}}{G_{iT}^{(1)}} - \frac{\hat{Z}_i^{(2)}}{G_{iT}^{(2)}}\right) \quad (89)$$

Evaluating the inverse of the first term of (89) in the parentheses using (54), (79), and (80):

$$\hat{Y}_i^{(1)} G_{iT}^{(1)} = Y_i\left(\frac{F_{iT}^{(1)}}{G_{iT}^{(1)}} + \frac{F_{iB}^{(0)}}{G_{iB}^{(0)}}\right)G_{iT}^{(1)} \quad (90)$$

$$= Y_i\left(F_{iT}^{(1)} + \frac{F_{iB}^{(0)} G_{iT}^{(1)}}{G_{iB}^{(0)}}\right) \quad (91)$$

$$= Y_i\left(F_{iT}^{(1)} + \frac{[F_{iB}^{(1)}\cos(k_{iz}h_1) - G_{iB}^{(1)}\sin(k_{iz}h_1)]}{F_{iB}^{(1)}\sin(k_{iz}h_1) + G_{iB}^{(1)}\cos(k_{iz}h_1)}G_{iT}^{(1)}\right) \quad (92)$$

Substituting one term of the Taylor series for each sine and cosine in (92), we have:

$$\hat{Y}_i^{(1)} G_{iT}^{(1)} \cong Y_i\left(F_{iT}^{(1)} + \frac{F_{iB}^{(1)} - G_{iB}^{(1)}k_{iz}h_1}{F_{iB}^{(1)}k_{iz}h_1 + G_{iB}^{(1)}}G_{iT}^{(1)}\right) \quad (93)$$

Evaluating the inverse of the second term of (89) using (54), (75), and (76):

$$\hat{Y}_i^{(2)} G_{iT}^{(2)} = Y_i\left(\frac{F_{iT}^{(2)}}{G_{iT}^{(2)}} + \frac{F_{iB}^{(1)}}{G_{iB}^{(1)}}\right)G_{iT}^{(2)} \quad (94)$$

$$= Y_i\left(F_{iT}^{(2)} + \frac{F_{iB}^{(1)} G_{iT}^{(2)}}{G_{iB}^{(1)}}\right) \quad (95)$$

$$= Y_i(F_{iT}^{(1)}\cos(k_{iz}h_1) - G_{iT}^{(1)}\sin(k_{iz}h_1) + \frac{F_{iB}^{(1)}}{G_{iB}^{(1)}}[F_{iT}^{(1)}\sin(k_{iz}h_1) + G_{iT}^{(1)}\cos(k_{iz}h_1)]) \quad (96)$$

Substituting one term of the Taylor series for each sine and cosine in (96), we have:

$$\hat{Y}_i^{(2)} G_{iT}^{(2)} \cong Y_i\left(F_{iT}^{(1)} - G_{iT}^{(1)}k_{iz}h_1 + \frac{F_{iB}^{(1)}}{G_{iB}^{(1)}}[F_{iT}^{(1)}k_{iz}h_1 + G_{iT}^{(1)}]\right) \quad (97)$$

Inverting (93) and (97) and then subtracting:

$$\frac{1}{h_1}\left(\frac{\hat{Z}_i^{(1)}}{G_{iT}^{(1)}} - \frac{\hat{Z}_i^{(2)}}{G_{iT}^{(2)}}\right) \cong \frac{1}{h_1 Y_i}\left(\frac{1}{F_{iT}^{(1)} + \frac{F_{iB}^{(1)} - G_{iB}^{(1)}k_{iz}h_1}{F_{iB}^{(1)}k_{iz}h_1 + G_{iB}^{(1)}}G_{iT}^{(1)}} - \frac{1}{F_{iT}^{(1)} - G_{iT}^{(1)}k_{iz}h_1 + \frac{F_{iB}^{(1)}}{G_{iB}^{(1)}}[F_{iT}^{(1)}k_{iz}h_1 + G_{iT}^{(1)}]}\right) \quad (98)$$

$$\cong \frac{1}{h_1 Y_i}\left(\frac{F_{iB}^{(1)}k_{iz}h_1 + G_{iB}^{(1)}}{(F_{iB}^{(1)}k_{iz}h_1 + G_{iB}^{(1)})F_{iT}^{(1)} + \left(F_{iB}^{(1)} - \frac{G_{iB}^{(1)}}{G_{iB}^{(1)}k_{iz}h_1}\right)G_{iT}^{(1)}} - \frac{G_{iB}^{(1)}}{G_{iB}^{(1)}F_{iT}^{(1)} - G_{iB}^{(1)}G_{iT}^{(1)}k_{iz}h_1 + F_{iB}^{(1)}(F_{iT}^{(1)}k_{iz}h_1 + G_{iT}^{(1)})}\right) \quad (99)$$

Noting that the denominators of both fractions are equal, we can easily subtract them, and then take the appropriate limit, yielding:

$$\lim_{h_1 \to 0} \frac{1}{h_1}\left(\frac{\hat{Z}_i^{(1)}}{G_{iT}^{(1)}} - \frac{\hat{Z}_i^{(2)}}{G_{iT}^{(2)}}\right) = \frac{1}{Y_i}\left(\frac{F_{iB}^{(1)}k_{iz}}{G_{iB}^{(1)}F_{iT}^{(1)} + G_{iT}^{(1)}F_{iB}^{(1)}}\right) \quad (100)$$

Now, in a manner very similar to (89)-(100) for the fields above the via, we evaluate the electric fields in the layer below the via, (67) and (72), per via length, as the length of the via, $h_1$, goes to zero, we need to evaluate:

$$\lim_{h_1 \to 0} \frac{1}{h_1}\left(\frac{\hat{Z}_i^{(1)}}{G_{iB}^{(0)}} - \frac{\hat{Z}_i^{(2)}}{G_{iB}^{(1)}}\right) \qquad (101)$$

Evaluating the inverse of the first term in the parentheses of (101) using (54), (79), and (80) and assuming the $V_1$ are the same for each of the dielectric layers (i.e., all three dielectric layers have the same dielectric):

$$\hat{Y}_i^{(1)} G_{iB}^{(0)} = Y_i\left(\frac{F_{iT}^{(1)}}{G_{iT}^{(1)}} + \frac{F_{iB}^{(0)}}{G_{iB}^{(0)}}\right) G_{iB}^{(0)} \qquad (102)$$

$$= Y_i\left(\frac{F_{iT}^{(1)} G_{iB}^{(0)}}{G_{iT}^{(1)}} + F_{iB}^{(0)}\right) \qquad (103)$$

$$= Y_i\left((F_{iB}^{(1)}\sin(k_{iz}h_1) + G_{iB}^{(1)}\cos(k_{iz}h_1))\frac{F_{iT}^{(1)}}{G_{iT}^{(1)}} + F_{iB}^{(1)}\cos(k_{iz}h_1) - G_{iB}^{(1)}\sin(k_{iz}h_1)\right) \qquad (104)$$

Substituting one term of the Taylor series for each sine and cosine in (104), we have:

$$\hat{Y}_i^{(1)} G_{iB}^{(0)} \cong Y_i\left((F_{iB}^{(1)}k_{iz}h_1 + G_{iB}^{(1)})\frac{F_{iT}^{(1)}}{G_{iT}^{(1)}} + F_{iB}^{(1)} - G_{iB}^{(1)}k_{iz}h_1\right) \qquad (105)$$

Evaluating the inverse of the second term in parentheses of (101) using (54), (75), and (76) and assuming all the $Y_1$ are equal (i.e., all three dielectric layers have the same dielectric):

$$\hat{Y}_i^{(2)} G_{iB}^{(1)} = Y_i\left(\frac{F_{iT}^{(2)}}{G_{iT}^{(2)}} + \frac{F_{iB}^{(1)}}{G_{iB}^{(1)}}\right) G_{iB}^{(1)} \qquad (106)$$

$$= Y_i\left(\frac{F_{iT}^{(2)} G_{iB}^{(1)}}{G_{iT}^{(2)}} + F_{iB}^{(1)}\right) \qquad (107)$$

$$= Y_i\left(\frac{\left[\begin{array}{c}F_{iT}^{(1)}\cos(k_{iz}h_1) - \\ G_{iT}^{(1)}\sin(k_{iz}h_1)\end{array}\right]G_{iB}^{(1)}}{F_{iT}^{(1)}\sin(k_{iz}h_1) + G_{iT}^{(1)}\cos(k_{iz}h_1)} + F_{iB}^{(1)}\right) \qquad (108)$$

Substituting one term of the Taylor series for each sine and cosine in (108), we have:

$$\hat{Y}_i^{(2)} G_{iB}^{(1)} \cong Y_i\left(\frac{[F_{iT}^{(1)} - G_{iT}^{(1)}k_{z,i}^{(1)}h_1]G_{iB}^{(1)}}{F_{iT}^{(1)}k_{iz}h_1 + G_{iT}^{(1)}} + F_{iB}^{(1)}\right) \qquad (109)$$

Inverting (105) and (109) and then subtracting:

$$\frac{1}{h_1}\left(\frac{\hat{Z}_i^{(1)}}{G_{iB}^{(0)}} - \frac{\hat{Z}_i^{(2)}}{G_{iB}^{(1)}}\right) \cong \frac{1}{h_1 Y_i}\left(\frac{1}{\left(\begin{array}{c}F_{iB}^{(1)}k_{iz}h_1 + \\ G_{iB}^{(1)}\end{array}\right)\frac{F_{iT}^{(1)}}{G_{iT}^{(1)}} + F_{iB}^{(1)} - G_{iB}^{(1)}k_{iz}h_1} - \frac{1}{\left[\begin{array}{c}F_{iT}^{(1)} - \\ G_{iT}^{(1)}k_{iz}h_1\end{array}\right]G_{iB}^{(1)}}{F_{iT}^{(1)}k_{iz}h_1 + G_{iT}^{(1)}} + F_{iB}^{(1)}}\right) \qquad (110)$$

$$\cong \frac{1}{h_1 Y_i}\left(\frac{G_{iT}^{(1)}}{\left(\begin{array}{c}F_{iB}^{(1)}k_{iz}h_1 + \\ G_{iB}^{(1)}\end{array}\right)} - \frac{F_{iT}^{(1)}k_{iz}h_1 + G_{iT}^{(1)}}{\left[\begin{array}{c}F_{iT}^{(1)} - \\ G_{iT}^{(1)}k_{iz}h_1\end{array}\right]G_{iB}^{(1)} + F_{iB}^{(1)}\left(\begin{array}{c}F_{iT}^{(1)}k_{iz}h_1 + \\ G_{iT}^{(1)}\end{array}\right)}\right) \qquad (111)$$

Noting that the denominators of both fractions are equal, we can easily subtract them, and then take the appropriate limit, yielding:

$$\lim_{h_1 \to 0} \frac{1}{h_1}\left(\frac{\hat{Z}_i^{(1)}}{G_{iB}^{(0)}} - \frac{\hat{Z}_i^{(2)}}{G_{iB}^{(1)}}\right) = -\frac{1}{Y_i}\left(\frac{F_{iT}^{(1)} k_{z,i}^{(1)}}{G_{iB}^{(1)} F_{iT}^{(1)} + G_{iT}^{(1)} F_{iB}^{(1)}}\right) \qquad (112)$$

The denominator of both (100) and (112) are the same and must be expanded before we arrive at the desired Green's function. Using (77), (74), (73), and (78) in that order:

$$G_{iB}^{(1)} F_{iT}^{(1)} + G_{iT}^{(1)} F_{iB}^{(1)} = = (\sin(k_{iz}h_2) + r_{iB}^{(2)}\cos(k_{iz}h_2)) \qquad (113)$$

$$(\cos(k_{iz}h_0) - r_{iT}^{(0)}\sin(k_{iz}h_0)) +$$

$$(\sin(k_{iz}h_0) + r_{iT}^{(0)}\cos(k_{iz}h_0))$$

$$(\cos(k_{iz}h_2) - r_{iB}^{(2)}\sin(k_{iz}h_2))$$

$$= \sin(k_{iz}h_2)\cos(k_{iz}h_0) - \qquad (114)$$

$$r_{iT}^{(0)}\sin(k_{iz}h_2)\sin(k_{iz}h_0) +$$

$$r_{iB}^{(2)}\cos(k_{iz}h_2)\cos(k_{iz}h_0) -$$

$$r_{iB}^{(2)}r_{iT}^{(0)}\cos(k_{iz}h_2)\sin(k_{iz}h_0) +$$

$$\sin(k_{iz}h_0)\cos(k_{iz}h_2) -$$

$$r_{iB}^{(2)}\sin(k_{iz}h_0)\sin(k_{iz}h_2) +$$

$$r_{iT}^{(0)}\cos(k_{iz}h_0)\cos(k_{iz}h_2) -$$

$$r_{iB}^{(2)}r_{iT}^{(0)}\cos(k_{iz}h_0)\sin(k_{iz}h_2)$$

This simplifies considerably if we apply the equations for the sine and cosine of the sum of two angles (ID-1) and (ID-2) in the UsefulIdentities document and let $h=h_0+h_2$.

$$G_{iB}^{(1)} F_{iT}^{(1)} + G_{iT}^{(1)} F_{iB}^{(1)} = \sin(k_{iz}h) + r_{iT}^{(0)}\cos(k_{iz}h) + r_{iB}^{(2)}\cos(k_{iz}h) - \qquad (115)$$

$$r_{iB}^{(2)} r_{iT}^{(0)}\sin(k_{iz}h)$$

$$= (1 - r_{iB}^{(2)} r_{iT}^{(0)})\sin(k_{iz}h) + \qquad (116)$$

$$(r_{iT}^{(0)} + r_{iB}^{(2)})\cos(k_{iz}h)$$

We now define two impedances, one for Top ($Z_T$) and a second for Bottom ($Z_B$) electric fields. Note that the same impedance is used for both transverse fields and for z-directed fields. We will also define the z-coordinate of the, now infinitesimally thin Layer 1, the via layer, to be z', which makes $h_0 = h - z'$ and $h_2 = z'$. Substituting (116) into (100) and into (112) and expanding the numerator using (78) and (74) we have:

$$Z_T(z') = \frac{k_{iz}}{Y_i} \frac{\cos(k_{iz}z') - r_{iB}^{(2)}\sin(k_{iz}z')}{(1 - r_{iB}^{(2)}r_{iT}^{(0)})\sin(k_{iz}h) + (r_{iT}^{(0)} + r_{iB}^{(2)})\cos(k_{iz}h)} \quad (117)$$

$$Z_B(z') = -\frac{k_{iz}}{Y_i} \frac{\cos(k_{iz}(h-z')) - r_{iT}^{(0)}\sin(k_{iz}(h-z'))}{(1 - r_{iB}^{(2)}r_{iT}^{(0)})\sin(k_{iz}h) + (r_{iT}^{(0)} + r_{iB}^{(2)})\cos(k_{iz}h)} \quad (118)$$

Substituting (117) into (65) and (118) into (67), we have the transverse electric field for an infinitesimally short z-directed rectangular $2\Delta x \times 2\Delta y$ cylinder of current located at z=z' and centered at ($x_0$, $y_0$):

$$E_{tT} = \sum_{TM} F_R(\Delta x)F_R(\Delta y)N_3 g_3(x_0, y_0) \quad (119)$$
$$Z_T(z')\{\sin(k_{iz}(h-z)) + r_{iT}^{(0)}\cos(k_{iz}(h-z))\}e_i,$$
$$z \geq z'$$

$$E_{tB} = \sum_{TM} F_R(\Delta x)F_R(\Delta y)N_3 g_3(x_0, y_0) \quad (120)$$
$$Z_B(z')\{\sin(k_{iz}z) + r_{iB}^{(2)}\cos(k_{iz}z)\}e_i,$$
$$z \leq z'$$

Both the transverse electric and magnetic fields are continuous across the original Level 1 and Level 2 boundaries, and thus, there is no discontinuity or singularity at z=z'.

Substituting (117) into (70) and (118) into (72), we have the z-directed electric field for an infinitesimally short z-directed rectangular $2\Delta x \times 2\Delta y$ cylinder of current located at z=z' and centered at ($x_0$, $y_0$):

$$E_{zT} = \sum_{TM} F_R(\Delta x)F_R(\Delta y)k_{iz}N_3^2 g_3(x_0, y_0)g_3(x, y) \quad (121)$$
$$Z_T(z')\{\cos(k_{iz}(h-z)) - r_{iT}^{(0)}\sin(k_{iz}(h-z))\}u_z,$$
$$z > z'$$

$$E_{zV} = -\sum_{TM} \frac{F_R(\Delta x)F_R(\Delta y)k_{iz}N_3^2}{Y_i} g_3(x_0, y_0)g_3(x, y) \left\{1 - \frac{j\omega\mu k_{iz}^2 Y_i}{k_c^2}\right\}u_z, z = z' \quad (122)$$

$$E_{zB} = -\sum_{TM} F_R(\Delta x)F_R(\Delta y)k_{iz}N_3^2 g_3(x_0, y_0) \quad (123)$$
$$g_3(x, y)Z_B(z')\{\cos(k_{iz}z) - r_{iB}^{(2)}\sin(k_{iz}z)\}u_z,$$
$$z < z'$$

(122) is taken from (88a), it could also have been taken from (88), and represents an impulse, or singularity, of the electric field at the level of the infinitesimally short via.

For the remainder of this work, we eliminate the layer-indicating superscripts for the normalized cover resistances. We are concerned henceforth only with $r_{iT}^{(0)}$ and $r_{iB}^{(2)}$ which are below referred to simply as $r_{iT}$ and $r_{iB}$.

For the work below, we need to concentrate on the z-dependence of the above equations, which may be rewritten with all the constants and extraneous dependencies combined into a single variable (the subscript G=Green's function, T=Top, B=Bottom, t=transverse, z=z):

$$T_{it} = \frac{k_{iz}}{Y_i} \frac{F_R(\Delta x)F_R(\Delta y)N_3 g_3(x_0, y_0)}{(1 - r_{iT}r_{iB})\sin(k_{iz}h) + (r_{iT} + r_{iB})\cos(k_{iz}h)} \quad (124)$$

$$T_{iz} = \frac{k_{iz}^2}{Y_i} \frac{F_R(\Delta x)F_R(\Delta y)N_3^2 g_3(x_0, y_0)g_3(x, y)}{(1 - r_{iT}r_{iB})\sin(k_{iz}h) +} \quad (125)$$
$$(r_{iT} + r_{iB})\cos(k_{iz}h)$$

$$= T_{it} k_{iz} N_3 g_3(x, y)$$

$$= \frac{T_{iv} k_{iz}}{(1 - r_{iT}r_{iB})\sin(k_{iz}h) + (r_{iT} + r_{iB})\cos(k_{iz}h)} \quad (125a)$$

$$T_{iv} = k_{iz}\frac{F_R(\Delta x)F_R(\Delta y)N_3^2 g_3(x_0, y_0)g_3(x, y)}{Y_i} \quad (125b)$$

$$E_{GtT} = \sum_{TM} T_{it}(\cos(k_{iz}z') - r_{iB}\sin(k_{iz}z'))(\sin(k_{iz}(h-z)) + \quad (126)$$
$$r_{iT}\cos(k_{iz}(h-z)))e_i, z \geq z'$$

$$E_{GtB} = -\sum_{TM} T_{it}(\cos(k_{iz}(h-z')) - \quad (127)$$
$$r_{iT}\sin(k_{iz}(h-z')))(\sin(k_{iz}z) +$$
$$r_{iB}\cos(k_{iz}z))e_i, z \leq z'$$

$$E_{GzT} = \sum_{TM} T_{iz}(\cos(k_{iz}z') - r_{iB}\sin(k_{iz}z'))(\cos(k_{iz}(h-z)) - \quad (128)$$
$$r_{iT}\sin(k_{iz}(h-z)))u_z, z > z'$$

$$E_{GzV} = -\sum_{TM} T_{iv}\left\{1 - \frac{j\omega\mu k_{iz}Y_i}{k_c^2}\right\}u_z, z = z' \quad (129)$$

$$E_{GzB} = \sum_{TM} T_{iz}(\cos(k_{iz}(h-z')) - r_{iT}\sin(k_{iz}(h-z'))) \quad (130)$$
$$(\cos(k_{iz}z) - r_{iB}\sin(k_{iz}z))u_z, z < z'$$

Note that the change of sign for (127) and (130) is due to the minus sign in (118). All fields (125)-(130), except (129), actually go to zero as the via length goes to zero. That is why we present the fields in terms of per via length as the via length goes to zero. Thus, they represent the derivative of the electric field with respect to the via length as the via length goes to zero. See, for example, (100) and (112). It is interesting that (128) and (130) are equal when evaluated at z=z' while (126) and (127) are not. This suggests that the presence of an x-y sheet of z-directed current forces a discontinuity in the derivative with respect to z of the transverse electric field.

Transverse Fields of the New Uniform Via

For the transverse fields of the new uniform via at a given level, z, due to current flowing in the via below the level z, we integrate (126) from z'=0 to z. This gives us the total field at z that is due to current on the via that is below z. Integrating the $i^{th}$ term and letting $E_t e_i$, $=E_1$:

$$\int_{z'=0}^{z} E_{iGtT}dz' = T_{it}(\sin(k_{iz}(h-z)) + r_{iT}\cos(k_{iz}(h-z))) \quad (131)$$

$$\int_{z'=0}^{z} (\cos(k_{iz}z') - r_{iB}\sin(k_{iz}z'))dz' =$$

$$= \frac{T_{it}}{k_{iz}}(\sin(k_{iz}(h-z)) + r_{iT}\cos(k_{iz}(h-z))) \quad (132)$$

$$[\sin(k_{iz}z') + r_{iB}\cos(k_{iz}z')]_{z'=0}^{z} =$$

-continued $$= \frac{T_{it}}{k_{iz}}(\sin(k_{iz}(h-z)) + r_{iT}\cos(k_{iz}(h-z))) \quad (133)$$

$$(\sin(k_{iz}z) + r_{iB}\cos(k_{iz}z) - r_{iB}^{(2)})$$

Multiplying out the last line, above, and moving the $$\frac{T_{it}}{k_{iz}}$$

term to the LHS tor now tor convenience, we must be careful to remember to move it back for the final result):

$$\frac{k_{iz}}{T_{it}}\int_{z'=0}^{z} E_{iGtT}dz' = \quad (134)$$

$$\sin(k_{iz}(h-z))\sin(k_{iz}z) + r_{iB}\sin(k_{iz}(h-z))\cos(k_{iz}z) -$$

$$r_{iB}\sin(k_{iz}(h-z)) + r_{iT}\cos(k_{iz}(h-z))\sin(k_{iz}z) +$$

$$r_{iB}r_{iT}\cos(k_{iz}(h-z))\cos(k_{iz}z) - r_{iB}r_{iT}\cos(k_{iz}(h-z))$$

For the transverse fields of the new uniform via at a given level, z, due to current flowing in the via above the level z, we integrate (127) from z'=z to h. This gives us the total field at z that is due to current on the via that is above z.

$$\int_{z'=z}^{h} E_{iGtB}dz' = T_{it}(\sin(k_{iz}z) + r_{iB}\cos(k_{iz}z)) \quad (135)$$

$$\int_{z'=z}^{h}(\cos(k_{iz}(h-z')) -$$

$$r_{iT}\sin(k_{iz}(h-z')))dz' =$$

$$= \frac{T_{it}}{k_{iz}}(\sin(k_{iz}z) + r_{iB}\cos(k_{iz}z)) \quad (136)$$

$$[-\sin(k_{iz}(h-z')) - r_{iT}\cos(k_{iz}(h-z'))]_{z'=z}^{h} =$$

$$= \frac{T_{it}}{k_{iz}}(\sin(k_{iz}z) + r_{iB}\cos(k_{iz}z)) \quad (137)$$

$$(\sin(k_{iz}(h-z)) - r_{iT} + r_{iT}\cos(k_{iz}(h-z)))$$

Multiplying out the last line, above and moving the $$\frac{T_{it}}{k_{iz}}$$

term to the LHS tor now (tor convenience, we must be careful to remember to move it back for the final result):

$$\frac{k_{iz}}{T_{it}}\int_{z'=z}^{h} E_{iGtB}dz' = \sin(k_{iz}z)\sin(k_{iz}(h-z)) - r_{iT}\sin(k_{iz}z) + \quad (138)$$

$$r_{iT}\sin(k_{iz}z)\cos(k_{iz}(h-z)) + +r_{iB}\cos(k_{iz}z)\sin(k_{iz}(h-z)) -$$

$$r_{iB}r_{iT}\cos(k_{iz}z) + r_{iB}r_{iT}^{(0)}\cos(k_{iz}z)\cos(k_{iz}(h-z))$$

The total transverse field at a given level, z, is the sum of the field due to via current from below level z added to the via current from above level z. In other words, we subtract (138) (because of the minus sign leading (127)) from (134) and noting that most terms cancel, what we have left is:

$$\frac{k_{iz}}{T_{it}}E_{itUV} = r_{iT}\sin(k_{iz}z) - r_{iB}\sin(k_{iz}(h-z)) + \quad (139)$$

$$r_{iB}r_{iT}\cos(k_{iz}z) - r_{iB}r_{iT}\cos(k_{iz}(h-z))$$

$$\frac{k_{iz}}{T_{tr}}E_{itUV} = r_{iT}\sin(k_{iz}z) - \quad (140)$$

$$r_{iB}\sin(k_{iz}(h-z)) + r_{iB}r_{iT}(\cos(k_{iz}z) - \cos(k_{iz}(h-z)))$$

$$E_{tUV} = \sum_{TM}\frac{T_{it}}{k_{iz}}\{r_{iT}\sin(k_{iz}z) - \quad (141)$$

$$r_{iB}\sin(k_{iz}(h-z)) + r_{iB}r_{iT}(\cos(k_{iz}z) - \cos(k_{iz}(h-z)))\}e_i$$

Reorganizing terms, we note a similarity with the transverse fields for a tapered via, (189a):

$$E_{tUV} = \sum_{TM}\frac{T_{it}}{k_{iz}}\{-r_{iB}(\sin(k_{iz}(h-z)) + r_{iT}\cos(k_{iz}(h-z))) + \quad (141a)$$

$$r_{iT}(\sin(k_{iz}z) + r_{iB}\cos(k_{iz}z))\}e_i$$

Coupling Between the New Uniform Via and Surface Rooftops

For coupling between the new Uniform Via centered at $(x_0, y_0)$ and x-directed surface rooftops centered at $(x_1, y_i, z)$, we must use (141) to evaluate:

$$S_{UVtoRFX}=\int E_{tUV}(z)\cdot J_{RFX}dxdy \quad (142)$$

For coupling to rooftops located at the bottom of the uniform via, we evaluate $E_{tUV}$ at z=0:

$$[E_{tUV}]_{z=0} = \sum_{TM}\frac{T_{it}}{k_{iz}}(-r_{iB}\sin(k_{iz}h) - r_{iT}r_{iB}(\cos(k_{iz}h) - 1))e_i \quad (142a)$$

$$S_{UVtoRFXbot} = \sum_{TM} F_T(\Delta x)F_R(\Delta y)\frac{T_{it}}{k_{iz}} \quad (143)$$

$$(-r_{iB}\sin(k_{iz}h) - r_{iT}r_{iB}(\cos(k_{iz}h) - 1))[e_{TM}(x_0, y_0)\cdot u_x]$$

$$S_{UVtoRFXbot} =$$

$$\sum_{TM}\frac{F_T(\Delta x)F_R(\Delta y)N_2g_1(x_1, y_1)}{Y_i}\begin{pmatrix}F_R(\Delta x)F_R(\Delta y)N_3g_3(x_0, y_0) \\ (-r_{iB}\sin(k_{iz}h) - r_{iT}r_{iB}(\cos(k_{iz}h) - 1)) \\ (1 - r_{iT}r_{iB})\sin(k_{iz}h) + (r_{iT} + r_{iB})\cos(k_{iz}h)\end{pmatrix}$$

This result is exactly identical to the result for the old uniform via. In the ViasOriginal document, see Appendix 2.

Likewise, coupling between a New Uniform Via and a y-directed surface rooftop subsection located at the lower end of the via is (changes from (144) noted in yellow):

$$S_{UVtoRFYbot} =$$

$$\sum_{TM}\frac{F_R(\Delta x)F_T(\Delta y)N_1g_2(x_1, y_1)}{Y_i}\begin{pmatrix}F_R(\Delta x)F_R(\Delta y)N_3g_3(x_0, y_0) \\ (-r_{iB}\sin(k_{iz}h) - r_{iT}r_{iB}(\cos(k_{iz}h) - 1)) \\ (1 - r_{iT}r_{iB})\sin(k_{iz}h) + (r_{iT} + r_{iB})\cos(k_{iz}h)\end{pmatrix}$$

For coupling between the new uniform via centered at $(x_0, y_0)$ and surface rooftops centered at $(x_1, y_i)$ on the upper end of the via, we evaluate (141) at z=h.

$$[E_{tUV}]_{z=h} = \sum_{TM} \frac{T_{iz}}{k_{iz}}(r_{iT}^{(2)}\sin(k_{iz}h) + r_{iB}^{(2)}r_{iT}^{(0)}(\cos(k_{iz}h) - 1))e_i \quad (147)$$

$$S_{UVtoRFXtop} = \sum_{TM} F_T(\Delta x)F_R(\Delta y)\frac{T_{it}}{k_{iz}}(r_{iT}^{(2)}\sin(k_{iz}h) + r_{iB}^{(2)}r_{iT}^{(0)}$$
$$(\cos(k_{iz}h) - 1))[e_{TM}(x_0, y_0) \cdot u_x] \quad (148)$$

$$S_{UVtoRFXtop} = \sum_{TM} \frac{N_2 F_T(\Delta x) F_R(\Delta y) g_1(x_1, y_1)}{Y_i}$$
$$\left(\frac{F_R(\Delta x)F_R(\Delta y)N_3g_3(x_0, y_0)(r_{iT}\sin(k_{iz}h) + r_{iT}r_{iB}(\cos(k_{iz}h) - 1))}{(1 - r_{iT}r_{iB})\sin(k_{iz}h) + (r_{iT} + r_{iB})\cos(k_{iz}h)}\right)$$

Likewise, coupling between a New Uniform Via and a y-directed surface rooftop subsection located at the upper end of the via is:

$$S_{UVtoRFYtop} = \sum_{TM} \frac{N_1 F_R(\Delta x) F_T(\Delta y) g_2(x_1, y_1)}{Y_i}$$
$$\left(\frac{F_R(\Delta x)F_R(\Delta y)N_3g_3(x_0, y_0)(r_{iT}\sin(k_{iz}h) + r_{iT}r_{iB}(\cos(k_{iz}h) - 1))}{(1 - r_{iT}r_{iB})\sin(k_{iz}h) + (r_{iT} + r_{iB})\cos(k_{iz}h)}\right)$$

Coupling Between the New Uniform Via and Volume Rooftops

For coupling to the volume vias, we must integrate (141) over the length of the via. Extracting the z-dependent portion for integration:

$$\int_0^h (r_{iT}\sin(k_{iz}z) - r_{iB}\sin(k_{iz}(h - z)) + \quad (151)$$
$$r_{iT}r_{iB}(\cos(k_{iz}z) - \cos(k_{iz}(h - z))))dz$$

$$= \frac{1}{k_{iz}}[-r_{iT}\cos(k_{iz}z) - r_{iB}\cos(k_{iz}(h - z)) + r_{iT}r_{iB}(\sin(k_{iz}z) + \quad (152)$$
$$\sin(k_{iz}(h - z)))]_{z=0}^h$$

$$= \frac{1}{k_{iz}}(-r_{iT}\cos(k_{iz}h) + r_{iT} - r_{iB} + \quad (153)$$
$$r_{iB}^{(2)}\cos(k_{iz}h) + r_{iT}r_{iB}(\sin(k_{iz}h) - \sin(k_{iz}h)))$$

$$= \frac{1}{k_{iz}}(r_{iT} - r_{iB})(1 - \cos(k_{iz}h)) \quad (154)$$

Substituting (154) into the curly braced portion of (141) and expanding $T_{it}$, we have the tangential electric field integrated vertically over the length of the substrate:

$$\int_0^h E_{tUV} dz = \sum_{TM} \frac{T_{it}}{k_{iz}^2}(r_{iT} - r_{iB})(1 - \cos(k_{iz}h))e_i \quad (155)$$

$$S_{VRFXtoUV} = \quad (156)$$
$$\sum_{TM} F_T(\Delta x)F_R(\Delta y)\frac{T_{it}}{k_{iz}^2}(r_{iT} - r_{iB})(1 - \cos(k_{iz}h))[e_{TM}(x_0, y_0) \cdot u_x]$$

-continued $$S_{UVtoVRFX} = \quad (157)$$
$$\sum_{TM} \frac{F_T(\Delta x)F_R(\Delta y)N_2 g_1(x_1, y_1)F_R(\Delta x)F_R(\Delta y)N_3 g_3(x_0, y_0)}{Y_i k_{iz}}$$
$$\left(\frac{(r_{iT} - r_{iB})(1 - \cos(k_{iz}h))}{(1 - r_{iT}r_{iB})\sin(k_{iz}h) + (r_{iT} + r_{iB})\cos(k_{iz}h)}\right)$$

Note that this result for the new uniform via is identical to the result for the original uniform via as is shown in (A2-4) through (A2-6) in Appendix 2 of the OriginalVia documents.

Note that (88) in the VolumeRooftops document, with (90), (27) and (10a) of the same document substituted in, is identical to (157), above. This means that the coupling from a new Uniform Via (UV) to a Volume RFX (VRFX) is the same as the coupling from a VRFX to a UV. This indicates that reciprocity holds, a good reality check on the correctness of both derivations.

The UV to VRFY follows with minor changes (highlighted) to (157):

$$S_{UVtoVRFY} = \sum_{TM} \frac{F_R(\Delta x)F_T(\Delta y)N_1 g_2(x_1, y_1)F_R(\Delta x)F_R(\Delta y)N_3 g_3(x_0, y_0)}{Y_i k_{iz}}$$
$$\left(\frac{(r_{iT} - r_{iB})(1 - \cos(k_{iz}h))}{(1 - r_{iT}r_{iB})\sin(k_{iz}h) + (r_{iT} + r_{iB})\cos(k_{iz}h)}\right)$$

This result is equivalent to (88) in the VolumeRooftops document. In that document, note that the $k_{iz}^2$ in the first denominator becomes $k_{iz}$ when it cancels with the $k_{ix}$ in $C_i(x_1, y_1)$, (90), thus matching this result.

Normal (z-Directed) Fields of the New Uniform Via

For the normal fields of the new uniform via at a given level, z, due to current flowing in the via below the level z, we integrate (128) from z'=0 to z. This gives us the total field at z that is due to current on the via that is below z. Integrating the $i^{th}$ term and letting $E_i u_z = E_i$:

$$\int_{z'=0}^z E_{iGzT} dz' = T_{iz}(\cos(k_{iz}(h - z)) - r_{iT}\sin(k_{iz}(h - z))) \quad (159)$$
$$\int_{z'=0}^z (\cos(k_{iz}z') - r_{iB}\sin(k_{iz}z'))dz'$$

$$= \frac{T_{iz}}{k_{iz}}(\cos(k_{iz}(h - z)) - r_{iT}\sin(k_{iz}(h - z)))[\sin(k_{iz}z') + \quad (160)$$
$$r_{iB}\cos(k_{iz}z')]_{z'=0}^z$$

$$= \quad (161)$$
$$\frac{T_{iz}}{k_{iz}}(\cos(k_{iz}(h - z)) - r_{iT}\sin(k_{iz}(h - z)))(\sin(k_{iz}z) + r_{iB}\cos(k_{iz}z) - r_{iB}^{(2)})$$

Multiplying out the last line, above, and moving the $$\frac{T_{iz}}{k_{iz}}$$

term to the LHS for now (for convenience, we must be careful to remember to move it back for the final result):

$$\frac{k_{iz}}{T_{iz}} \int_{z'=0}^{z} E_{iGzT} dz' = \tag{162}$$
$$\cos(k_{iz}(h-z))\sin(k_{iz}z) + r_{iB}\cos(k_{iz}(h-z))\cos(k_{iz}z) -$$
$$r_{iB}\cos(k_{iz}(h-z)) - r_{iT}\sin(k_{iz}(h-z))\sin(k_{iz}z) -$$
$$r_{iT}r_{iB}\sin(k_{iz}(h-z))\cos(k_{iz}z) + r_{iT}r_{iB}\sin(k_{iz}(h-z))$$

For the normal fields of the new uniform via at a given level, z, due to current flowing in the via above the level z, we integrate (130) from z'=z to h. This gives us the total field at z that is due to current on the via that is above z.

$$\int_{z'=z}^{h} E_{iGzB} dz' = T_{iz}(\cos(k_{iz}z) - r_{iB}\sin(k_{iz}z)) \tag{163}$$
$$\int_{z'=z}^{h} (\cos(k_{iz}(h-z')) - r_{iT}\sin(k_{iz}(h-z'))) dz' =$$
$$= \frac{T_{iz}}{k_{iz}} \tag{164}$$
$$(\cos(k_{iz}z) - r_{iB}\sin(k_{iz}z))[-\sin(k_{iz}(h-z')) - r_{iT}\cos(k_{iz}(h-z'))]_{z'=z}^{h}$$
$$= \frac{T_{iz}}{k_{iz}}(\cos(k_{iz}z) - r_{iB}\sin(k_{iz}z))(\sin(k_{iz}(h-z)) - r_{iT} + r_{iT}\cos(k_{iz}(h-z))) \tag{165}$$

Multiplying out the last line, above and moving the $$\frac{T_{iz}}{k_{iz}}$$

term to the LHS for now (for convenience, we must be careful to remember to move it back for the final result):

$$\frac{k_{iz}}{T_{iz}} \int_{z'=z}^{h} E_{iGzB} dz' = \cos(k_{iz}z)\sin(k_{iz}(h-z)) - r_{iT}\cos(k_{iz}z) + \tag{166}$$
$$r_{iT}\cos(k_{iz}z)\cos(k_{iz}(h-z)) - r_{iB}\sin(k_{iz}z)\sin(k_{iz}(h-z)) +$$
$$r_{iT}r_{iB}\sin(k_{iz}z) - r_{iT}r_{iB}\sin(k_{iz}z)\cos(k_{iz}(h-z))$$

The total normal field at a given level, z, is (129) added to the field due to via current from below level z added to the via current from above level z. We start by adding (162) and (166) and make use of the sum of two angles identities, ID-1 and ID-2:

$$\frac{k_{iz}}{T_{iz}}\left(\int_{z'=0}^{z} E_{iGzT} dz' + \int_{z'=z}^{h} E_{iGzB} dz'\right) = \tag{167}$$
$$(1 - r_{iT}r_{iB})\sin(k_{iz}h) + (r_{iB}^{(2)} + r_{iT}^{(0)})\cos(k_{iz}h) + Z_1(z)$$

where $$Z_1(z) = r_{iT}r_{iB}\sin(k_{iz}(h-z)) + \tag{168}$$
$$r_{iT}r_{iB}\sin(k_{iz}z) - r_{iB}\cos(k_{iz}(h-z)) - r_{iT}\cos(k_{iz}z)$$

Or, reorganizing terms of (168) in a manner similar to (141a), we also have:

$$Z_1(z) = r_{iB}(r_{iT}\sin(k_{iz}(h-z)) - \cos(k_{iz}(h-z))) + r_{iT}(r_{iB}\sin(k_{iz}z) - \cos(k_{iz}z)) \tag{168a}$$

Reforming the summation over all TM modes of (128)-(130), and including (129), we have the z-directed field for the new uniform via:

$$E_{zUV} = \sum_{TM} \left\{ T_{iz} \frac{\begin{array}{c}(1 - r_{iT}r_{iB})\sin(k_{iz}h) + \\ (r_{iB} + r_{iT})\cos(k_{iz}h) + \\ Z_1(z)\end{array}}{k_{iz}} - T_{iv}\left(1 - \frac{j\omega\mu k_{iz} Y_i}{k_c^2}\right)\right\} u_z \tag{169}$$

Substituting in (125a), which puts $T_{iz}$ in terms of $T_{iv}$, and noting the similarity between the denominator of (125) and the numerator of the first fraction in (169), we have:

$$E_{zUV} = \sum_{TM} T_{iv} \left\{1 + \frac{Z_1(z)}{(1 - r_{iT}r_{iB})\sin(k_{iz}h) + (r_{iT} + r_{iB})\cos(k_{iz}h)} - 1 + \frac{j\omega\mu k_{iz} Y_i}{k_c^2}\right\} u_z \tag{169a}$$

Noting that two terms cancel, we substitute in (125b) for $T_{iv}$:

$$E_{zUV} = \tag{169b}$$
$$\sum_{TM} k_{iz} \frac{F_R(\Delta x) F_R(\Delta y) N_3^2}{Y_i} g_3(x_0, y_0) g_3(x, y) \left\{\frac{Z_1(z)}{(1 - r_{iT}r_{iB})\sin(k_{iz}h) + (r_{iB} + r_{iT})\cos(k_{iz}h)} + \frac{j\omega\mu k_{iz} Y_i}{k_c^2}\right\} u_z$$

New Uniform Via Self-Coupling

For this, we must integrate (169b) over the thickness of the substrate. Starting with the $Z_1(z)$ portion:

$$\int_0^h Z_1(z) dz = \int_0^h r_{iT}r_{iB}\sin(k_{iz}(h-z)) + r_{iT}r_{iB}\sin(k_{iz}z) - \tag{170}$$
$$r_{iB}\cos(k_{iz}(h-z)) - r_{iT}\cos(k_{iz}z) dz$$
$$= \frac{1}{k_{iz}}[r_{iT}r_{iB}\cos(k_{iz}(h-z)) - r_{iT}r_{iB}\cos(k_{iz}z) + \tag{171}$$
$$r_{iB}\sin(k_{iz}(h-z)) - r_{iT}\sin(k_{iz}z)]_{z=0}^{h}$$
$$= \frac{1}{k_{iz}}(r_{iT}r_{iB}(1 - \cos(k_{iz}h)) - r_{iT}r_{iB} \tag{172}$$
$$(\cos(k_{iz}h) - 1) - r_{iB}\sin(k_{iz}h) - r_{iT}\sin(k_{iz}h))$$
$$= \frac{1}{k_{iz}}(2r_{iT}r_{iB}(1 - \cos(k_{iz}h)) - (r_{iT} + r_{iB})\sin(k_{iz}h)) \tag{173}$$

Integrating (169b):

$$\int_0^h E_{zUV} \cdot u_z dz = \sum_{TM} k_{iz} \frac{F_R(\Delta x) F_R(\Delta y) k_{iz} N_3^2}{Y_i} g_3(x_0, y_0) g_3(x, y) \tag{173a}$$

$$\left(\frac{\int_0^h Z_1(z)dz}{(1-r_{iT}r_{iB})\sin(k_{iz}h) + (r_{iT}+r_{iB})\cos(k_{iz}h)} + \frac{j\omega\mu k_{iz}Y_i}{k_c^2}h\right) \quad (5)$$

Performing the $Z_1(z)$ integration by using (173), and bringing the $k_{iz}$ term inside the parentheses, and evaluating at the center of the field via subsection at $(x_1, y_1)$ and multiplying by the Fourier coefficients of the field via subsection, we have the new Uniform Via to new Uniform Via system matrix element:

$$S_{UVtoUV} = \tag{174}$$

$$\sum_{TM} \frac{F_R^2(\Delta x)F_R^2(\Delta y)N_3^2}{Y_i} g_3(x_0, y_0)g_3(x_1, y_1) \left(\frac{2r_{iT}r_{iB}(1-\cos(k_{iz}h)) - (r_{iT}+r_{iB})\sin(k_{iz}h)}{(1-r_{iT}r_{iB})\sin(k_{iz}h) + (r_{iT}+r_{iB})\cos(k_{iz}h)} + \frac{j\omega\mu k_{iz}^2 Y_i}{k_c^2}h\right)$$

Note that this is identical to (60) with (A3-4) substituted in, in the ViasOriginal document. Reference (88b), in this document, to see how the final term matches with the final term in (60) in the ViasOriginal documents. Thus, the original uniform via couples to other original uniform vias in exactly the same way as the new uniform via couples to new uniform vias. Since this is the same conclusion as was reached for coupling to both surface and volume subsections, we conclude that the original uniform via and the new uniform via are identical.

Transverse Fields for the Tapered Via

The current on the Tapered Via (TV) basis function has maximum current at the top end of the via and tapers down to zero at the bottom end of the via:

$$J_{zTV} = \frac{z}{h} \tag{175}$$

As with the new Uniform Via transverse field derivation, above, we must integrate (126) from $z'=0$ to $z$ in order to get the field at a given $z$ due to current below $z$. Only now, (126) is multiplied by (175). $E_{iGtT}$ is the $i^{th}$ term of the summation representing the Green's function. For convenience, we let $E_{iGtT}=E_{wGtT}e_i$, and we work with $E_{iGtT}$ in what follows.

$$\frac{1}{T_{it}} \int_0^z E_{iGtT} dz' = \tag{176}$$

$$\frac{r_{iT}\cos(k_{iz}(h-z))}{h} \int_0^z z'\cos(k_{iz}z') - r_{iB}z'\sin(k_{iz}z')dz'$$

Using identities ID-8a and ID-9a in the UsefullIdentities documents:

$$\sin(k_{iz}(h-z)) + \\ = \frac{r_{iT}\cos(k_{iz}(h-z))}{h}\left[\frac{z'}{k_{iz}}\sin(k_{iz}z') + \frac{1}{k_{iz}^2}\cos(k_{iz}z') + \right. \tag{177}$$

$$\left.\frac{r_{iB}z'}{k_{iz}}\cos(k_{iz}z') - \frac{r_{iB}}{k_{iz}^2}\sin(k_{iz}z')\right]_0^z$$

$$\sin(k_{iz}(h-z)) + \\ = \frac{r_{iT}\cos(k_{iz}(h-z))}{k_{iz}h}\left(z\sin(k_{iz}z) + \frac{1}{k_{iz}}\cos(k_{iz}z) - \frac{1}{k_{iz}} + \right. \tag{178}$$

$$\left.r_{iB}z\cos(k_{iz}z) - \frac{r_{iB}}{k_{iz}}\sin(k_{iz}z)\right)$$

Bringing the leading RHS denominator over to the LHS and then multiplying (178) out, term by term:

$$\frac{k_{iz}h}{T_{it}} \int_0^z E_{iGtT} dz' = \tag{179}$$

$$z\sin(k_{iz}(h-z))\sin(k_{iz}z) + \frac{1}{k_{iz}}\sin(k_{iz}(h-z))\cos(k_{iz}z) -$$

$$\frac{1}{k_{iz}}\sin(k_{iz}(h-z)) + r_{iB}z\sin(k_{iz}(h-z))\cos(k_{iz}z) -$$

$$\frac{r_{iB}}{k_{iz}}\sin(k_{iz}(h-z))\sin(k_{iz}z) + r_{iT}z\cos(k_{iz}(h-z))\sin(k_{iz}z) +$$

$$\frac{r_{iT}}{k_{iz}}\cos(k_{iz}(h-z))\cos(k_{iz}z) - \frac{r_{iT}}{k_{iz}}\cos(k_{iz}(h-z)) +$$

$$r_{iT}r_{iB}z\cos(k_{iz}(h-z))\cos(k_{iz}z) - \frac{r_{iT}r_{iB}}{k_{iz}}\cos(k_{iz}(h-z))\sin(k_{iz}z)$$

We must also calculate the field at $z$ due to via current above $z'$. For this, we integrate (127) from $z'=z$ to $h$ in order to get the field at $z$ due to current above $z$. As above, (127) is multiplied by (175). The minus sign on the LHS of (180) is where we are storing the minus sign leading the RHS of (127).

$$-\frac{1}{T_{it}}\int_z^h E_{iGtB} dz' = \tag{180}$$

$$\sin(k_{iz}z) + \\ \frac{r_{iB}\cos(k_{iz}z)}{h}\int_z^h z'\cos(k_{iz}(h-z')) - r_{iT}z'\sin(k_{iz}(h-z'))dz'$$

Once more, using ID-8a and ID-9a in the UsefullIdentities documents:

$$\sin(k_{iz}z) + \\ = \frac{r_{iB}\cos(k_{iz}z)}{h}\left[-\frac{z'}{k_{iz}}\sin(k_{iz}(h-z')) + \frac{1}{k_{iz}^2}\cos(k_{iz}(h-z')) - \right. \tag{181}$$

$$\left.\frac{r_{iT}z'}{k_{iz}}\cos(k_{iz}(h-z')) - \frac{r_{iT}}{k_{iz}^2}\sin(k_{iz}(h-z'))\right]_z^h$$

$$\sin(k_{iz}z) + \\ = \frac{r_{iB}\cos(k_{iz}z)}{k_{iz}h}\left(z\sin(k_{iz}(h-z)) + \frac{1}{k_{iz}} - \frac{1}{k_{iz}}\cos(k_{iz}(h-z)) - \right. \tag{182}$$

$$\left.r_{iT}h + r_{iT}z\cos(k_{iz}(h-z)) + \frac{r_{iT}}{k_{iz}}\sin(k_{iz}(h-z))\right)$$

Bringing the leading RHS denominator over to the LHS and then multiplying (182) out, term by term:

$$\frac{k_{iz}h}{T_{iL}}\int_0^z E_{iGtB}dz' = \tag{183}$$

$$z\sin(k_{iz}z)\sin(k_{iz}(h-z)) + \frac{1}{k_{iz}}\sin(k_{iz}z) - \frac{1}{k_{iz}}\sin(k_{iz}z)\cos(k_{iz}(h-z)) -$$

$$r_{iT}h\sin(k_{iz}z) + r_{iT}z\sin(k_{iz}z)\cos(k_{iz}(h-z)) +$$

$$\frac{r_{iT}}{k_{iz}}\sin(k_{iz}z)\sin(k_{iz}(h-z)) + r_{iB}z\cos(k_{iz}z)\sin(k_{iz}(h-z)) +$$

$$\frac{r_{iB}}{k_{iz}}\cos(k_{iz}z) - \frac{r_{iB}}{k_{iz}}\cos(k_{iz}z)\cos(k_{iz}(h-z)) - r_{iT}r_{iB}h\cos(k_{iz}z) +$$

$$r_{iT}r_{iB}z\cos(k_{iz}z)\cos(k_{iz}(h-z)) + \frac{r_{iT}r_{iB}}{k_{iz}}\cos(k_{iz}z)\sin(k_{iz}(h-z))$$

We need to add the field due to current below z to the field due to current above z. This means we must subtract (183) from (179), recall the minus sign leading the LHS of (180). The first terms (for all but the last two lines) come from (179) and the second terms come from (183). The next to last line comes from (179) and the last line comes from (183). For notational purposes, we also define $Z_2$ (z) in (184), for convenience of notation.

$$\frac{k_{iz}h}{T_{it}}\left(\int_0^z E_{iGtT}dz' + \int_z^h E_{iGtB}dz'\right) = Z_2(z) \tag{184}$$

$$\left(\int_0^z E_{iGtT}dz' + \int_z^h E_{iGtB}dz'\right) = \frac{T_{it}}{k_{iz}h}Z_2(z) \tag{185}$$

$$Z_2(z) = z\sin(k_{iz}(h-z))\sin(k_{iz}z) - z\sin(k_{iz}z)\sin(k_{iz}(h-z)) +$$

$$\frac{1}{k_{iz}}\sin(k_{iz}(h-z))\cos(k_{iz}z) + \frac{1}{k_{iz}}\sin(k_{iz}z)\cos(k_{iz}(h-z)) +$$

$$r_{iT}z\cos(k_{iz}(h-z))\sin(k_{iz}z) - r_{iT}z\sin(k_{iz}z)\cos(k_{iz}(h-z)) +$$

$$\frac{r_{iT}}{k_{iz}}\cos(k_{iz}(h-z))\cos(k_{iz}z) - \frac{r_{iT}}{k_{iz}}\sin(k_{iz}z)\sin(k_{iz}(h-z)) +$$

$$r_{iB}z\sin(k_{iz}(h-z))\cos(k_{iz}z) - r_{iB}z\cos(k_{iz}z)\sin(k_{iz}(h-z)) -$$

$$\frac{r_{iB}}{k_{iz}}\sin(k_{iz}(h-z))\sin(k_{iz}z) + \frac{r_{iB}}{k_{iz}}\cos(k_{iz}z)\cos(k_{iz}(h-z)) +$$

$$r_{iT}r_{iB}z\cos(k_{iz}(h-z))\cos(k_{iz}z) - r_{iT}r_{iB}z\cos(k_{iz}z)\cos(k_{iz}(h-z)) -$$

$$\frac{r_{iT}r_{iB}}{k_{iz}}\cos(k_{iz}(h-z))\sin(k_{iz}z) - \frac{r_{iT}r_{iB}}{k_{iz}}\cos(k_{iz}z)\sin(k_{iz}(h-z)) -$$

$$\frac{1}{k_{iz}}\sin(k_{iz}(h-z)) - \frac{r_{iT}}{k_{iz}}\cos(k_{iz}(h-z))$$

$$-\frac{1}{k_{iz}}\sin(k_{iz}z) + r_{iT}h\sin(k_{iz}z) - \frac{r_{iB}}{k_{iz}}\cos(k_{iz}z) + r_{iT}r_{iB}h\cos(k_{iz}z) \tag{186}$$

Noting that some terms cancel and we can apply ID-1 and ID-2 to other terms:

$$Z_2(z) = \tag{187}$$

$$\frac{1}{k_{iz}}\{(1 - r_{iT}r_{iB})\sin(k_{iz}h) + (r_{iT} + r_{iB})\cos(k_{iz}h) - \sin(k_{iz}(h-z)) -$$

$$r_{iT}\cos(k_{iz}(h-z)) + (r_{iT}k_{iz}h - 1)(\sin(k_{iz}z) + r_{iB}\cos(k_{iz}z))\}$$

Using (185) we integrate the Green's function, (126) and (127), to obtain the transverse fields around a New Tapered Via. Then we substitute in (124) for $T_{it}$:

$$E_{itTVIA} = \left(\int_0^z E_{iGtT}dz' + \int_z^h E_{iGtB}dz'\right)e_i = \frac{T_{it}}{k_{iz}h}Z_2(z)e_i \tag{188}$$

$$E_{tTV} = \sum_{TM}\frac{F_R(\Delta x)F_R(\Delta y)N_3g_3(x_0, y_0)}{Y_ih} \tag{189}$$

$$\left(\frac{Z_2(z)}{(1-r_{iT}r_{iB})\sin(k_{iz}h) + (r_{iT}+r_{iB})\cos(k_{iz}h)}\right)e_i$$

Substituting (187) for $Z_2$ (z), we have:

$$E_{tTV} = \sum_{TM}\frac{F_R(\Delta x)F_R(\Delta y)N_3g_3(x_0, y_0)}{Y_ik_{iz}h} \tag{190}$$

$$\left(1 - \frac{\sin(k_{iz}(h-z)) + r_{iT}\cos(k_{iz}(h-z)) +}{(1-r_{iT}k_{iz}h)(\sin(k_{iz}z) + r_{iB}\cos(k_{iz}z))}\right)e_i$$

Given that a large portion of $Z_2$ (z) cancelled with the denominator, for notational convenience going forward, we now define $Z_3$ (z), which contains all of the z variation of E $$Z_3(z) = \sin(k_{iz}(h-z)) + r_{iT}\cos(k_{iz}(h-z)) + \tag{191}$$

$$(1 - r_{iT}k_{iz}h)(\sin(k_{iz}z) + r_{iB}\cos(k_{iz}z))$$

$$E_{tTV} = \sum_{TM}\frac{F_R(\Delta x)F_R(\Delta y)N_3g_3(x_0, y_0)}{Y_ik_{iz}h} \tag{192}$$

$$\left(1 - \frac{Z_3(z)}{(1-r_{iT}r_{iB})\sin(k_{iz}h) + (r_{iT}+r_{iB})\cos(k_{iz}h)}\right)e_i$$

Coupling Between the Tapered Via and Surface Rooftops

The coupling to an x-directed rooftop located at $(x_1, y_i, z)$ due to a Tapered Via centered at $(x_0, y_0)$ follows from (192):

$$S_{TVtoRFX} = \int E_{tTV}(z) \cdot J_{RFX}dxdy \tag{193}$$

$$S_{TVtoRFX} = \tag{194}$$

$$\sum_{TM}F_T(\Delta x)F_R(\Delta y)N_2g_1(x_1, y_1)\frac{F_R(\Delta x)F_R(\Delta y)N_3g_3(x_0, y_0)}{Y_ik_{iz}h}$$

$$\left(1 - \frac{Z_3(z)}{(1-r_{iT}r_{iB})\sin(k_{iz}h) + (r_{iT}+r_{iB})\cos(k_{iz}h)}\right)$$

Similarly, coupling to a y-directed rooftop is (changes from (194) noted in yellow):−+

$$S_{TVtoRFY} = \tag{195}$$

$$\sum_{TM}F_R(\Delta x)F_T(\Delta y)N_1g_2(x_1, y_1)\frac{F_R(\Delta x)F_R(\Delta y)N_3g_3(x_0, y_0)}{Y_ik_{iz}h}$$

$$\left(1 - \frac{Z_3(z)}{(1-r_{iT}r_{iB})\sin(k_{iz}h) + (r_{iT}+r_{iB})\cos(k_{iz}h)}\right)$$

For coupling to surface rooftops located at the bottom (zero current) end of the tapered via, we evaluate (189b), $Z_3$ (Z), at z=0:

$$Z_3(0) = \sin(k_{iz}h) + r_{iT}\cos(k_{iz}h)) + r_{iB} - r_{iT}r_{iB}k_{iz}h \tag{196}$$

For coupling to surface rooftops located at the top (maximum current) end of the tapered via, we evaluate (191), $Z_3$ (Z), at z=h:

$$Z_3(h) = r_{iT} + (1-r_{iT}k_{iz}h)(\sin(k_{iz}h) + r_{iB}\cos(k_{iz}h)) \tag{196a}$$

It is interesting to note that:

$$\lim_{h \to 0} Z_3(0) = \lim_{h \to 0} Z_3(h) = r_{iT} + r_{iB} \quad (196b)$$

However, (194) and (195) both still go to zero as h goes to zero. It may be of interest to explore $$\frac{1}{h} \lim_{h \to 0} Z_3(z)$$

if we wish to obtain non-zero matrix elements for zero substrate thickness.

Coupling Between the Tapered Via and Volume Rooftops

For this problem, we must obtain the volume voltage by integrating the transverse electric fields, (192), due to a tapered via over the length of the via. Thus we need to integrate $Z_3$ (z), (191), over z from 0 to h:

$$\int_0^h Z_3(z)dz = \int_0^h \{\sin(k_{iz}(h-z)) + r_{iT}\cos(k_{iz}(h-z)) + \quad (197)$$
$$(1 - r_{iT}k_{iz}h)(\sin(k_{iz}z) + r_{iB}\cos(k_{iz}z))\}dz$$

$$= \frac{1}{k_{iz}} \left[ \begin{array}{c} \cos(k_{iz}(h-z)) - r_{iT}\sin(k_{iz}(h-z)) + \\ (1 - r_{iT}k_{iz}h)(-\cos(k_{iz}z) + r_{iB}\sin(k_{iz}z)) \end{array} \right]_{z=0}^{h} \quad (198)$$

$$k_{iz}\int_0^h Z_3(z)dz = 1 - \cos(k_{iz}h) + \quad (199)$$
$$r_{iT}\sin(k_{iz}h) + (1 - r_{iT}k_{iz}h)(1 - \cos(k_{iz}h) + r_{iB}\sin(k_{iz}h))$$

$$k_{iz}\int_0^h Z_3(z)dz = \quad (200)$$
$$(2 - r_{iT}k_{iz}h)(1 - \cos(k_{iz}h)) + (r_{iT} + r_{iB} - r_{iT}r_{iB}k_{iz}h)\sin(k_{iz}h)$$

Note that, in the limit as h goes to zero, as long as we divide by h, we have the same results as for surface rooftops, (196b):

$$\lim_{h \to 0} \frac{1}{h} \int_0^h Z_3(z)dz = r_{iT} + r_{iB} \quad (201)$$

The coupling to an x-directed volume rooftop, VRFX, located at $(x_1, y_1)$ due to a Tapered Via, TV, centered at $(x_0, y_0)$ follows from (192) and (200). We must not forget to integrate the constant, 1, that leads the quantity in the large parentheses of (192) over the thickness of the substrate. The integration (202) is accomplished, as usual, by simply multiplying by the Fourier coefficients:

$$S_{TVtoVRFX} = \int E_{tTV}(z) \cdot J_{RFX} dxdy \quad (202)$$

$$S_{TVtoVRFX} = \quad (203)$$
$$\sum_{TM} \frac{F_T(\Delta x)F_R(\Delta y)N_2 g_1(x_1, y_1)}{Y_i k_{iz}^2 h} F_R(\Delta x)F_R(\Delta y)N_3 g_3(x_0, y_0)$$
$$\left( k_{iz}h - \frac{(2 - r_{iT}k_{iz}h)(1 - \cos(k_{iz}h)) +}{(1 - r_{iT}r_{iB})\sin(k_{iz}h) + (r_{iT} + r_{iB})\cos(k_{iz}h)} \right)$$

Similarly, coupling to a y-directed volume rooftop is (changes from (203) are highlighted):

$$S_{TVtoVRFY} = \quad (204)$$
$$\sum_{TM} \frac{F_R(\Delta x)F_T(\Delta y)N_1 g_2(x_1, y_1)}{Y_i k_{iz}^2 h} F_R(\Delta x)F_R(\Delta y)N_3 g_3(x_0, y_0)$$
$$\left( k_{iz}h - \frac{(2 - r_{iT}k_{iz}h)(1 - \cos(k_{iz}h)) +}{(1 - r_{iT}r_{iB})\sin(k_{iz}h) + (r_{iT} + r_{iB})\cos(k_{iz}h)} \right)$$

Unfortunately, even if (203) and (204) are divided by the substrate thickness, h, then they both still go to zero as h goes to zero, in spite of (201). It will likely be productive to explore dividing by the square of the substrate thickness.

This result is equivalent to (98) in the VolumeRooftops document. In that document, note that the $k_{iz}^3$ in the first denominator becomes of $k_{iz}^2$ when it cancels with the $k_{iz}$ in $C_i(x_1, y_1)$, (90), thus matching the result above.

Normal (z-Directed) Fields of the Tapered Via

The current on the Tapered Via (TV) basis function has maximum current at the top end of the via and tapers down to zero at the bottom end of the via, (175), repeated here:

$$J_{zTV} = \frac{z}{h} \quad (205)$$

In a manner similar to the Tapered Via transverse field derivation, above, we must integrate (128) from z'=0 to z in order to get the field at a given z due to current below z, with (128) multiplied by (205). $E_{iGzT}$ is the $i^{th}$ term of the summation representing the Green's function. For convenience, we let $E_{iGzT} = E_{iGzT} u_z$, and we work with $E_{iGzT}$ $$\frac{1}{T_{iz}} \int_0^z E_{iGzT} dz' = \quad (206)$$
$$\frac{\cos(k_{iz}(h-z)) - r_{iT}\sin(k_{iz}(h-z))}{h} \int_0^z z'\cos(k_{iz}z') - r_{iB}z'\sin(k_{iz}z')dz'$$

Using identities ID-8a and ID-9a in the UsefullIdentities document:

$$\frac{1}{T_{iz}} \int_0^z E_{iGzT} dz' = \frac{\cos(k_{iz}(h-z)) - r_{iT}\sin(k_{iz}(h-z))}{k_{iz}h} \left[ z'\sin(k_{iz}z') + \quad (207) \right.$$
$$\left. \frac{1}{k_{iz}}\cos(k_{iz}z') + r_{iB}z'\cos(k_{iz}z') - \frac{r_{iB}}{k_{iz}}\sin(k_{iz}z') \right]_0^z$$

$$\frac{k_{iz}h}{T_{iz}} \int_0^z E_{iGzT} dz' = (\cos(k_{iz}(h-z)) - r_{iT}\sin(k_{iz}(h-z))) \tag{208}$$

$$\left(z\sin(k_{iz}z) + \frac{1}{k_{iz}}\cos(k_{iz}z) - \frac{1}{k_{iz}} + r_{iB}z\cos(k_{iz}z) - \frac{r_{iB}}{k_{iz}}\sin(k_{iz}z)\right)$$

Multiplying (208) out, term by term:

$$\frac{k_{iz}h}{T_{iz}} \int_0^z E_{iGzT} dz' = \tag{209}$$

$$z\cos(k_{iz}(h-z))\sin(k_{iz}z) + \frac{1}{k_{iz}}\cos(k_{iz}(h-z))\cos(k_{iz}z) -$$

$$\frac{1}{k_{iz}}\cos(k_{iz}(h-z)) + r_{iB}z\cos(k_{iz}(h-z))\cos(k_{iz}z) -$$

$$\frac{r_{iB}}{k_{iz}}\cos(k_{iz}(h-z))\sin(k_{iz}z) - r_{iT}z\sin(k_{iz}(h-z))\sin(k_{iz}z) -$$

$$\frac{r_{iT}}{k_{iz}}\sin(k_{iz}(h-z))\cos(k_{iz}z) + \frac{r_{iT}}{k_{iz}}\sin(k_{iz}(h-z)) -$$

$$r_{iT}r_{iB}z\sin(k_{iz}(h-z))\cos(k_{iz}z) + \frac{r_{iT}r_{iB}}{k_{iz}}\sin(k_{iz}(h-z))\sin(k_{iz}z)$$

We must also calculate the field at z due to via current above z. For this, we integrate (130) from $z'=z$ to $h$ in order to get the field at z due to current above z. As above, (130) is multiplied by (205) and we work with the magnitude of the $i^{th}$ term.

$$\frac{1}{T_{iz}} \int_z^h E_{iGzB} dz' = \frac{\cos(k_{iz}z) - r_{iB}\sin(k_{iz}z)}{h} \int_z^h z'\cos(k_{iz}(h-z')) - \tag{210}$$

$$r_{iT}z'\sin(k_{iz}(h-z'))dz'$$

Using ID-8b and ID-9b in the UsefulIdentities documents:

$$\frac{1}{T_{iz}} \int_z^h E_{iGzB} dz' = \tag{211}$$

$$\frac{\cos(k_{iz}z) - r_{iB}\sin(k_{iz}z)}{k_{iz}h} \left[-z'\sin(k_{iz}(h-z')) + \frac{1}{k_{iz}}(h-z')\right] +$$

$$\frac{1}{k_{iz}}\cos(k_{iz}(h-z')) - r_{iT}z'\cos(k_{iz}(h-z')) -$$

$$\left.\frac{r_{iT}}{k_{iz}}\sin(k_{iz}(h-z'))\right]_z^h$$

$$\frac{k_{iz}h}{T_{iz}} \int_z^h E_{iGzB} dz' = \cos(k_{iz}z) - r_{iB}\sin(k_{iz}z)) \tag{212}$$

$$\left(z\sin(k_{iz}(h-z)) + \frac{1}{k_{iz}} - \frac{1}{k_{iz}}\cos(k_{iz}(h-z)) -\right.$$

$$\left.r_{iT}h + r_{iT}z\cos(k_{iz}(h-z)) + \frac{r_{iT}}{k_{iz}}\sin(k_{iz}(h-z))\right)$$

Multiplying (212) out, term by term:

$$= z\cos(k_{iz}z)\sin(k_{iz}(h-z)) + \frac{1}{k_{iz}}\cos(k_{iz}z) - \tag{213}$$

$$\frac{1}{k_{iz}}\cos(k_{iz}z)\cos(k_{iz}(h-z)) - r_{iT}h\cos(k_{iz}z) +$$

$$r_{iT}z\cos(k_{iz}z)\cos(k_{iz}(h-z)) + \frac{r_{iT}}{k_{iz}}\cos(k_{iz}z)\sin(k_{iz}(h-z)) -$$

$$r_{iB}z\sin(k_{iz}z)\sin(k_{iz}(h-z)) - \frac{r_{iB}}{k_{iz}}\sin(k_{iz}z) +$$

$$\frac{r_{iB}}{k_{iz}}\sin(k_{iz}z)\cos(k_{iz}(h-z)) + r_{iT}r_{iB}h\sin(k_{iz}z) -$$

$$r_{iT}r_{iB}z\sin(k_{iz}z)\cos(k_{iz}(h-z)) - \frac{r_{iT}r_{iB}}{k_{iz}}\sin(k_{iz}z)\sin(k_{iz}(h-z))$$

We need to add the field due to current below z to the field due to current above z. This means we must add (209) to (213). The first terms (for all but the last two lines) come from (209) and the second terms come from (213). The next to last line comes from (209) and the last line comes from (213). For notational purposes, we also define $Z_4(z)$ in (214), for convenience of notation.

$$Z_4(z) = \frac{k_{iz}h}{T_{iz}}\left(\int_0^z E_{iGzT} dz' + \int_z^h E_{iGzB} dz'\right) = \tag{214}$$

$$z\cos(k_{iz}(h-z))\sin(k_{iz}z) + z\cos(k_{iz}z)\sin(k_{iz}(h-z)) +$$

$$\frac{1}{k_{iz}}\cos(k_{iz}(h-z))\cos(k_{iz}z) - \frac{1}{k_{iz}}\cos(k_{iz}z)\cos(k_{iz}(h-z)) -$$

$$r_{iT}z\sin(k_{iz}(h-z))\sin(k_{iz}z) + r_{iT}z\cos(k_{iz}z)\cos(k_{iz}(h-z)) -$$

$$\frac{r_{iT}}{k_{iz}}\sin(k_{iz}(h-z))\cos(k_{iz}z) + \frac{r_{iT}}{k_{iz}}\cos(k_{iz}z)\sin(k_{iz}(h-z)) +$$

$$r_{iB}z\cos(k_{iz}(h-z))\cos(k_{iz}z) - r_{iB}z\sin(k_{iz}z)\sin(k_{iz}(h-z)) -$$

$$\frac{r_{iB}}{k_{iz}}\cos(k_{iz}(h-z))\sin(k_{iz}z) + \frac{r_{iB}}{k_{iz}}\sin(k_{iz}z)\cos(k_{iz}(h-z)) -$$

$$r_{iT}r_{iB}z\sin(k_{iz}(h-z))\cos(k_{iz}z) - r_{iT}r_{iB}z\sin(k_{iz}z)\cos(k_{iz}(h-z)) +$$

$$\frac{r_{iT}r_{iB}}{k_{iz}}\sin(k_{iz}(h-z))\sin(k_{iz}z) - \frac{r_{iT}r_{iB}}{k_{iz}}\sin(k_{iz}z)\sin(k_{iz}(h-z)) -$$

$$\frac{1}{k_{iz}}\cos(k_{iz}(h-z)) + \frac{r_{iT}}{k_{iz}}\sin(k_{iz}(h-z))$$

$$+\frac{1}{k_{iz}}\cos(k_{iz}z) - r_{iT}h\cos(k_{iz}z) - \frac{r_{iT}}{k_{iz}}\sin(k_{iz}z) + r_{iT}r_{iB}h\sin(k_{iz}z) \tag{215}$$

Noting that some terms cancel and others combine by applying ID-1 and ID-2:

$$Z_4(z) = z(1 - r_{iT}r_{iB})\sin(k_{iz}h) + z(r_{iT} + r_{iB})\cos(k_{iz}h) - \tag{216}$$

$$\frac{1}{k_{iz}}\cos(k_{iz}(h-z)) + \frac{r_{iT}}{k_{iz}}\sin(k_{iz}(h-z)) + \frac{1}{k_{iz}}\cos(k_{iz}z) -$$

$$r_{iT}h\cos(k_{iz}z) - \frac{r_{iB}}{k_{iz}}\sin(k_{iz}z) + r_{iT}r_{iB}h\sin(k_{iz}z)$$

For convenience in what follows, we reform (216) and define $Z_5(z)$:

$$Z_4(z) = \frac{k_{iz}h}{T_{iz}}\left(\int_0^z E_{iGzT} dz' + \int_z^h E_{iGzB} dz'\right) = \tag{217}$$

$$z\{(1-r_{iT}r_{iB})\sin(k_{iz}h) + (r_{iT} + r_{iB})\cos(k_{iz}h)\} + \frac{1}{k_{iz}}Z_5(z)$$

$$Z_5(z) = r_{iT}\sin(k_{iz}(h-z)) - \tag{218}$$

$$\cos(k_{iz}(h-z)) + (1 - r_{iT}k_{iz}h)(\cos(k_{iz}z) - r_{iB}\sin(k_{iz}z))$$

The total normal field at a given level, z, is (129) added to the field due to via current from both below and above z. We start with (217):

$$\left(\int_0^z E_{iGzT}dz' + \int_z^h E_{iGzB}dz'\right) = \quad (223)$$

$$\frac{T_{iz}}{k_{iz}}\frac{z}{h}\{(1-r_{iT}r_{iB})\sin(k_{iz}h) + (r_{iT}+r_{iB})\cos(k_{iz}h)\} + \frac{T_{iz}}{k_{iz}^2 h}Z_5(z)$$

Reforming the summation over all TM modes of the Green's function, combining (128)-(130) including (129) multiplied by (205), the integration result of (217) gives us the z-directed field for the new uniform via:

$$E_{zTV} = \quad (224)$$

$$\sum_{TM}\left\{T_{iz}\frac{z}{h}\frac{(1-r_{iT}r_{iB})\sin(k_{iz}h) + (r_{iT}+r_{iB})\cos(k_{iz}h)}{k_{iz}} + T_{iz}\frac{Z_5(z)}{k_{iz}^2 h} - T_{iv}\frac{z}{h}\left(1 - \frac{j\omega\mu k_{iz}Y_i}{k_c^2}\right)\right\}u_z$$

Substituting in (125a), which puts $T_{iz}$ in terms of $T_{iv}$:

$$E_{zTV} = \sum_{TM}T_{iv}\left\{\frac{z}{h} + \frac{1}{k_{iz}h}\frac{Z_5(z)}{(1-r_{iT}r_{iB})\sin(k_{iz}h) + (r_{iT}+r_{iB})\cos(k_{iz}h)} \right. \quad (225)$$

$$\left. -\frac{z}{h}\left(1 - \frac{j\omega\mu k_{iz}Y_i}{k_c^2}\right)\right\}u_z$$

Noting that two z/h terms cancel and substituting in (125b) for $T_{iv}$:

$$E_{zTV} = \sum_{TM}\frac{F_R(\Delta x)F_R(\Delta y)N_3^2 g_3(x_0, y_0)g_3(x,y)}{Y_i h} \quad (226)$$

$$\left(\frac{Z_5(z)}{(1-r_{iT}r_{iB})\sin(k_{iz}h) + (r_{iT}+r_{iB})\cos(k_{iz}h)} + k_{iz}z\frac{j\omega\mu k_{iz}Y_i}{k_c^2}\right)u_z$$

Coupling Between the Tapered Via and the Uniform Via

For this, we must integrate (226), the normal electric field due to the tapered via, over the thickness of the substrate. We start by integrating $Z_5(z)$, given in (218):

$$\int_0^h Z_5(z)dz = \int_0^h r_{iT}^{(0)}\sin(k_{iz}(h-z)) - \quad (227)$$

$$\cos(k_{iz}(h-z)) + (1-r_{iT}k_{iz}h)(\cos(k_{iz}z) - r_{iB}\sin(k_{iz}z))dz =$$

$$\frac{1}{k_{iz}}[r_{iT}\cos(k_{iz}(h-z)) + \sin(k_{iz}(h-z)) +$$

$$(1-r_{iT}k_{iz}h)(\sin(k_{iz}z) + r_{iB}\cos(k_{iz}z))]_0^h$$

$$k_{iz}\int_0^h Z_5(z)dz = r_{iT}(1-\cos(k_{iz}h)) - \quad (228)$$

$$\sin(k_{iz}h) + (1-r_{iT}k_{iz}h)(\sin(k_{iz}h) - r_{iB}(1-\cos(k_{iz}h)))$$

Gathering terms:

$$k_{iz}\int_0^h Z_5(z)dz = (r_{iT}-r_{iB}+r_{iT}r_{iB}k_{iz}h)(1-\cos(k_{iz}h)) - r_{iT}k_{iz}h\sin(k_{iz}h) \quad (229)$$

We will use (229) to integrate (226), but we also need to integrate the last term of (226):

$$\int_0^h k_{iz}z\frac{j\omega\mu k_{iz}Y_i}{k_c^2}dz = \frac{k_{iz}h^2}{2}\frac{j\omega\mu k_{iz}Y_i}{k_c^2} \quad (230)$$

Now, using (229) and (230), we integrate (226):

$$\int_0^h E_{zTV}\cdot u_z dz = \sum_{TM}\frac{F_R(\Delta x)F_R(\Delta y)N_3^2 g_3(x_0, y_0)g_3(x,y)}{Y_i k_{iz}h} \quad (231)$$

$$\left(\frac{(r_{iT}-r_{iB}+r_{iT}r_{iB}k_{iz}h)(1-\cos(k_{iz}h)) -}{(1-r_{iT}r_{iB})\sin(k_{iz}h) + (r_{iT}+r_{iB})\cos(k_{iz}h)} + \frac{k_{iz}^2 h^2}{2}\frac{j\omega\mu k_{iz}Y_i}{k_c^2}\right)$$

Moving the $k_{iz}h$ in the denominator of the first fraction to inside the large parentheses, and integrating over x and y, we obtain the desired coupling between a Tapered Via centered at $(x_0, y_0)$ and a Uniform Via centered at $(x_1, y_i)$:

$$S_{TVtoUV} = \sum_{TM}\frac{F_R^2(\Delta y)F_R^2(\Delta y)N_3^2 g_3(x_0, y_0)g_3(x_1, y_1)}{Y_i} \quad (232)$$

$$\left(\frac{\left(\frac{r_{iT}-r_{iB}}{k_{iz}h} + r_{iT}r_{iB}\right)(1-\cos(k_{iz}h)) - r_{iT}\sin(k_{iz}h)}{(1-r_{iT}r_{iB})\sin(k_{iz}h) + (r_{iB}+r_{iT})\cos(k_{iz}h)} + \frac{j\omega\mu k_{iz}^2 Y_i}{2k_c^2}h\right)$$

Self-Coupling of the Tapered Via

For this, we must multiply (226), the normal electric field due to the tapered via, by z/h (from (175), (205)) and then integrate over the thickness of the substrate. Starting by integrating the first term inside the curly braces of (226), we must integrate z/h times $Z_5$ (z), (218). Integrating each term and using ID-8a,b and ID-9a,b in the UsefulIdenties document:

$$\int_0^h \frac{z}{h}Z_5(z)dz = \frac{1}{h}\int_0^h r_{iT}z\sin(k_{iz}(h-z)) - \quad (233)$$

$$z\cos(k_{iz}(h-z)) + (1-r_{iT}k_{iz}h)(z\cos(k_{iz}z) - r_{iB}z\sin(k_{iz}z))dz$$

$$dz = \frac{1}{k_{iz}h}\left[r_{iT}z\cos(k_{iz}(h-z)) + \frac{r_{iT}}{k_{iz}}\sin(k_{iz}(h-z)) + \right. \quad (234)$$

$$z\sin(k_{iz}(h-z)) - \frac{1}{k_{iz}}\cos(k_{iz}(h-z)) + (1-r_{iT}k_{iz}h)$$

$$\left.\left(z\sin(k_{iz}z) + \frac{1}{k_{iz}}\cos(k_{iz}z) + r_{iB}z\cos(k_{iz}z) - \frac{r_{iB}}{k_{iz}}\sin(k_{iz}z)\right)\right]_0^h$$

$$k_{iz}h\int_0^h \frac{z}{h}Z_5(z)dz = \quad (235)$$

$$r_{iT}h - \frac{r_{iT}}{k_{iz}}\sin(k_{iz}h) - \frac{1}{k_{iz}}(1-\cos(k_{iz}h)) + (1-r_{iT}k_{iz}h)$$

$$\left(h\sin(k_{iz}h) - \frac{1}{k_{iz}}(1-\cos(k_{iz}h)) + r_{iB}h\cos(k_{iz}h) - \frac{r_{iB}}{k_{iz}}\sin(k_{iz}h)\right)$$

Gathering terms and simplifying:

$$k_{iz}h \int_0^h \frac{z}{h} Z_5(z)dz = \qquad (236)$$
$$2r_{iT}h - \frac{2}{k_{iz}} + \left(-\frac{r_{iT}}{k_{iz}} + h - r_{iT}k_{iz}h^2 - \frac{r_{iB}}{k_{iz}} + r_{iT}r_{iB}h\right)\sin(k_{iz}h) +$$
$$\left(\frac{2}{k_{iz}} - r_{iT}h + r_{iB}h - r_{iT}r_{iB}k_{iz}h^2\right)\cos(k_{iz}h)$$

$$= \frac{2}{k_{iz}}(r_{iT}k_{iz}h - 1) + \qquad (237)$$
$$\frac{1}{k_{iz}}(-r_{iT} + k_{iz}h - r_{iT}k_{iz}^2h^2 - r_{iB} + r_{iT}r_{iB}k_{iz}h)\sin(k_{iz}h) +$$
$$\frac{1}{k_{iz}}(2 - r_{iT}k_{iz}h + r_{iB}k_{iz}h - r_{iT}r_{iB}k_{iz}^2h^2)\cos(k_{iz}h)$$

$$k_{iz}^2 h \int_0^h \frac{z}{h} Z_5(z)dz = \qquad (238)$$
$$2(r_{iT}k_{iz}h - 1) + \{(r_{iT}r_{iB} + 1)k_{iz}h - r_{iT}k_{iz}^2h^2 - r_{iT} - r_{iB}\}\sin(k_{iz}h) +$$
$$\{2 - (r_{iT} - r_{iB})k_{iz}h - r_{iT}r_{iB}k_{iz}^2h^2\}\cos(k_{iz}h)$$

For notational convenience, we define:

$$Z_6(h) = \frac{1}{h}\int_0^h \frac{z}{h} Z_5(z)dz = \frac{1}{k_{iz}^2 h^2}[ \qquad (239)$$
$$2(r_{iT}k_{iz}h - 1) + \{(r_{iT}r_{iB} + 1)k_{iz}h - r_{iT}k_{iz}^2h^2 - r_{iT} - r_{iB}\}\sin(k_{iz}h) +$$
$$\{2 - (r_{iT} - r_{iB})k_{iz}h - r_{iT}r_{iB}k_{iz}^2h^2\}\cos(k_{iz}h)]$$

$$= \frac{1}{k_{iz}^2 h^2}[(r_{iT} + r_{iB} - r_{iT}r_{iB}k_{iz}h)k_{iz}h + \qquad (240)$$
$$\{(r_{iT}r_{iB} + 1)k_{iz}h - r_{iT} - r_{iB}\}\sin(k_{iz}h) +$$
$$\{2 - (r_{iT} - r_{iB})k_{iz}h - r_{iT}r_{iB}k_{iz}^2h^2\}(\cos(k_{iz}h) - 1)]$$

Note that defining $Z_6(h)$ with the leading $1/h$ makes $Z_6(h)$ dimensionless. The only difference between the above two equations is in the first constant in the expression inside the square brackets and the $\cos(k_{iz}h)$ factor being changed to $(\cos(k_{iz}h)-1)$, which are highlighted in yellow.

We must also integrate the second term in the large parentheses of (226), after multiplying it by $z/h$:

$$\int_0^h \frac{k_{iz}z^2}{h} \frac{j\omega\mu j_{iz}Y_i}{k_c^2} dz = \frac{k_{iz}h^2}{3}\frac{j\omega\mu k_{iz}Y_i}{k_c^2} = \frac{j\omega\mu k_{iz}^2 Y_i}{3k_c^2}h^2 \qquad (241)$$

Integrating the magnitude of the $i^{th}$ term of (226) multiplied by $z/h$, we have:

$$\int_0^h \frac{z}{h} E_{izTV} dz = \frac{F_R(\Delta x)F_R(\Delta y)N_3^2 g_3(x_0, y_0)g_3(x, y)}{Y_i h} \qquad (242)$$
$$\left( \frac{h\left(\frac{1}{h}\int_0^h \frac{z}{h} Z_5(z)dz\right)}{(1 - r_{iT}r_{iB})\sin(k_{iz}h) + (r_{iT} + r_{iB})\cos(k_{iz}h)} + \int_0^h \frac{k_{iz}z^2}{h}\frac{j\omega\mu k_{iz}Y_i}{k_c^2}dz \right)$$

Substituting in either (239) or (240), and (241), and also bringing the h that is in denominator of the leading fraction inside the large parentheses, we have:

$$\int_0^h \frac{z}{h} E_{izTV} dz = \frac{F_R(\Delta x)F_R(\Delta y)N_3^2 g_3(x_0, y_0)g_3(x, y)}{Y_i} \qquad (243)$$
$$\left( \frac{Z_6 h}{(1 - r_{iT}r_{iB})\sin(k_{iz}h) + (r_{iT} + r_{iB})\cos(k_{iz}h)} + \frac{j\omega\mu k_{iz}^2 Y_i}{3k_c^2}h \right)$$

To obtain the self-coupling matrix element values, we perform the desired integration over the horizontal surface of the substrate by multiplying by the usual Fourier coefficients:

$$S_{TVtoTV} = \sum_{TM} \frac{F_R^2(\Delta x)F_R^2(\Delta y)N_3^2 g_3(x_0, y_0)g_3(x_1, y_1)}{Y_i} \qquad (244)$$
$$\left( \frac{Z_6(h)}{(1 - r_{iT}r_{iB})\sin(k_{iz}h) + (r_{iT} + r_{iB})\cos(k_{iz}h)} + \frac{j\omega\mu k_{iz}^2 Y_i}{3k_c^2}h \right)$$

Appendix 2

Subsection Constants

Useful Identities $\sin(A + B) = \sin(A)\cos(B) + \cos(A)\sin(B)$     ID-1

$\cos(A + B) = \cos(A)\cos(B) - \sin(A)\sin(B)$     ID-2

$\tan\left(\frac{A}{2}\right) = \frac{1 - \cos(A)}{\sin(A)}$     ID-3

$\tan\left(\frac{A}{2}\right) = \frac{\sin(A)}{1 + \cos(A)}$     ID-4

$\sin(A)\sin(B) = \frac{1}{2}[\cos(A - B) - \cos(A + B)]$     ID-5

$\cos(A)\cos(B) = \frac{1}{2}[\cos(A - B) + \cos(A + B)]$     ID-6

$\sin(A)\cos(B) = \frac{1}{2}[\sin(A + B) + \sin(A - B)]$     ID-7

$\cos(A)\sin(B) = \frac{1}{2}[\sin(A + B) - \sin(A - B)]$     ID-7a $\int \sin(ax)dx = -\frac{1}{a}\cos(ax) + C$     ID-8

$\int x\sin(ax)dx = -\frac{x}{a}\cos(ax) + \frac{1}{a^2}\sin(ax) + C$     ID-8a $\int \cos(ax)dx = \frac{1}{a}\sin(ax) + C$     ID-9

$\int x\cos(ax)dx = \frac{x}{a}\sin(ax) + \frac{1}{a^2}\cos(ax) + C$     ID-9a $\nabla \times A = \begin{vmatrix} u_\chi & u_y & u_z \\ \partial/\partial x & \partial/\partial y & \partial/\partial z \\ A_x & A_y & A_z \end{vmatrix}$     ID-10

$\nabla \times H = j\omega\epsilon E + J$     ID-11

$\nabla \times E = -j\omega\mu H$     ID-12

Basic Variables

Index i is used for summing over all m, n, TE, TM modes.

Index j goes over all dielectric layers, starting with layer j=0 at the top and increases going down. The z coordinate starts at zero at the bottom and increases going up.

Wavenumber $k=2\pi/\lambda=\omega\sqrt{\mu\epsilon}$ in general. Modal admittances are the ratio of H over E of the standing wave modes, and thus differ by a factor of j from the usual traveling wave modal admittances.

$$k_{z,i}^{(j)} = \sqrt{k_j^2 - k_c^2} \tag{1}$$

$$k_c^2 = \left(\frac{m\pi}{a}\right)^2 + \left(\frac{n\pi}{b}\right)^2 = k_x^2 + k_y^2 \tag{1a}$$

$$y_{i,TE}^{(j)} = \frac{k_{z,i}^{(j)}}{j\omega\mu_j} \tag{2}$$

$$Y_{i,TM}^{(j)} = -\frac{j\omega\epsilon_j}{k_{z,i}^{(j)}} \tag{3}$$

Transverse normalized modal vectors:

$$e_{i,TE} = \sqrt{\frac{2}{ab}} \sin(k_y y)u_x \quad m=0, n>0, \tag{4}$$

$$= -\sqrt{\frac{2}{ab}} \sin(k_x x)u_y \quad m>0, n=0, \tag{5}$$

otherwise for $m$ and $n > 0$:

$$= 2\sqrt{\frac{ab}{n^2a^2+m^2b^2}} \left[\frac{n}{b}\cos(k_x x)\sin(k_y y)u_x - \frac{m}{a}\sin(k_x x)\cos(k_y y)u_y\right]. \tag{6}$$

$$h_{i,TE} = \sqrt{\frac{2}{ab}} \sin(k_y y)u_y \quad m=0, n>0, \tag{7}$$

$$= \sqrt{\frac{2}{ab}} \sin(k_x x)u_x \quad m>0, n=0, \tag{8}$$

otherwise for $m$ and $n > 0$:

$$= 2\sqrt{\frac{ab}{n^2a^2+m^2b^2}} \left[\frac{m}{a}\sin(k_x x)\cos(k_y y)u_x + \frac{n}{b}\cos(k_x x)\sin(k_y y)u_y\right]. \tag{9}$$

For the TM modal vectors, both m and n>0:

$$e_{i,TM} = \tag{10}$$

$$2\sqrt{\frac{ab}{n^2a^2+m^2b^2}} \left[\frac{m}{a}\cos(k_x x)\sin(k_y y)u_x + \frac{n}{b}\sin(k_x x)\cos(k_y y)u_y\right].$$

$$= N_2 g_1 u_x + N_1 g_2 u_y \tag{10a}$$

$$h_{i,TM} = \tag{11}$$

$$2\sqrt{\frac{ab}{n^2a^2+m^2b^2}} \left[-\frac{n}{b}\sin(k_x x)\cos(k_y y)u_x + \frac{m}{a}\cos(k_x x)\sin(k_y y)u_y\right].$$

$$= -N_1 g_2 u_x + N_2 g_1 u_y \tag{11a}$$

where $N_1 = \frac{2k_y}{k_c\sqrt{ab}}, N_2 = \frac{2k_x}{k_c\sqrt{ab}},$ \tag{11b}

$g_1 = \cos(k_x x)\sin(k_y x)$, and $g_2 = \sin(k_x x)\cos(k_y x)$

Transverse fields for the $j^{th}$ layer and the $i^{th}$ (m, n, TE, TM) mode:

$$E_{t,i}^{(j)} = \{F_i^{(j)}\sin(k_{z,i}^{(j)}z) + G_i^{(j)}\cos(k_{z,i}^{(j)}z)\}e_i, \tag{12}$$

$$H_{t,i}^{(j)} = -Y_i^{(j)}\{F_i^{(j)}\cos(k_{z,i}^{(j)}z) - G_i^{(j)}\sin(k_{z,i}^{(j)}z)\}h_i. \tag{13}$$

F and G are set to match boundary conditions at top and bottom covers. If we change z to (c−z), then also change sign of H.

Important Integrals and Functions

Rectangle Function:

$$R(x, x_0, \Delta x) = \begin{cases} 1, & x_0 - \Delta x < x < x_0 + \Delta x \\ 0, & \text{Otherwise} \end{cases} \tag{14}$$

Sine Rectangle Integral:

$$S_R(x_0, \Delta x) = \int_{x=x_0-\Delta x}^{x=x_0+\Delta x} \sin(k_x x)dx \tag{15}$$

$$= -\frac{1}{k_x}[\cos(k_x x)]_{x=x_0-\Delta x}^{x=x_0+\Delta x} \quad \text{(by } ID\text{-}8) \tag{16}$$

$$= -\frac{1}{k_x}(\cos(k_x(x_0+\Delta x)) - \cos(k_x(x_0-\Delta x))) \tag{17}$$

(next, apply $ID$-2 twice)

$$= \frac{2}{k_x}\sin(k_x\Delta x)\sin(k_x x_0) \tag{18}$$

Cosine Rectangle Integral:

$$C_R(x_0, \Delta x) = \int_{x=x_0-\Delta x}^{x=x_0+\Delta x} \cos(k_x x)dx \tag{19}$$

$$= \frac{1}{k_x}[\sin(k_x x)]_{x=x_0-\Delta x}^{x=x_0+\Delta x} \tag{20}$$

(by $ID$-9)

$$= \frac{1}{k_x}(\sin(k_x(x_0+\Delta x)) - \sin(k_x(x_0-\Delta x))) \tag{21}$$

(next, apply $ID$-7a)

$$= \frac{2}{k_x}\sin(k_x\Delta x)\cos(k_x x_0) \tag{23}$$

Rectangle Fourier Coefficient:

$$F_R(\Delta x) = \begin{cases} \frac{2}{k_x}\sin(k_x\Delta x), & k_x \neq 0 \\ \Delta x, & k_x = 0 \end{cases} \tag{24}$$

Triangle Function:

$$T(x, x_0, \Delta x) = \begin{cases} \frac{x}{2\Delta x} + \left(1 - \frac{x_0}{2\Delta x}\right), & x_0 - 2\Delta x < x < x_0 \\ -\frac{x}{2\Delta x} + \left(1 + \frac{x_0}{2\Delta x}\right), & x_0 < x < x_0 + 2\Delta x \\ 0, & \text{Otherwise} \end{cases} \tag{25}$$

Sine Triangle Integral (note, all cos terms cancel in (28)):

$$S_T(x_0, \Delta x) = \int_{x_0-2\Delta x}^{x=x_0} \frac{x}{2\Delta x}\sin(k_x x)dx + \int_{x_0-2\Delta x}^{x=x_0}\left(1 - \frac{x_0}{2\Delta x}\right)\sin(k_x x)dx + \int_{x=x_0}^{x_0+2\Delta x}\left(-\frac{x}{2\Delta x}\sin(k_x x)\right)dx + \qquad (26)$$

$$\int_{x=x_0}^{x_0+2\Delta x}\left(1 + \frac{x_0}{2\Delta x}\right)\sin(k_x x)dx$$

$$= \frac{1}{2\Delta x k_x}\left[-x\cos(k_x x) + \frac{1}{k_x}\sin(k_x x) - (2\Delta x - x_0)\cos(k_x x)\right]_{x=x_0-2\Delta x}^{x=x_0} + \frac{1}{2\Delta x k_x}\left[x\cos(k_x x) - \frac{1}{k_x}\right. \qquad (27)$$

$$\left.\sin(k_x x) - (2\Delta x + x_0)\cos(k_x x)\right]_{x=x_0}^{x=x_0+2\Delta x}$$

$$= \frac{1}{2\Delta x k_x}\left\{\begin{array}{c} -x_0\cos(k_x x_0) + \frac{1}{k_x}\sin(k_x x_0) - (2\Delta x - x_0)\cos(k_x x_0) + \ldots + \\ (x_0 - 2\Delta x)\cos(k_x(x_0 - 2\Delta x)) - \frac{1}{k_x}\sin(k_x(x_0 - 2\Delta x)) + (2\Delta x - x_0)\cos(k_x(x_0 - 2\Delta x)) + \ldots + \\ (x_0 + 2\Delta x)\cos(k_x(x_0 + 2\Delta x)) - \frac{1}{k_x}\sin(k_x(x_0 + 2\Delta x)) - (2\Delta x + x_0)\cos(k_x(x_0 + 2\Delta x)) + \ldots + \\ -x_0\cos(k_x x_0) + \frac{1}{k_x}\sin(k_x x_0) + (2\Delta x + x_0)\cos(k_x x_0) \end{array}\right\} \qquad (28)$$

$$= \frac{1}{\Delta x k_x^2}(1 - \cos(k_x\Delta x))\sin(k_x x_0) \qquad (29)$$

Cosine Triangle Integral (note, all sin terms cancel in (32)):

$$C_T(x_0, \Delta x) = \int_{x_0-2\Delta x}^{x=x_0} \frac{x}{2\Delta x}\cos(k_x x)dx + \int_{x_0-2\Delta x}^{x=x_0}\left(1 - \frac{x_0}{2\Delta x}\right)\cos(k_x x)dx + \int_{x=x_0}^{x_0+2\Delta x}\left(-\frac{x}{2\Delta x}\cos(k_x x)\right)dx + \qquad (30)$$

$$\int_{x=x_0}^{x_0+2\Delta x}\left(1 + \frac{x_0}{2\Delta x}\right)\cos(k_x x)dx$$

$$= \frac{1}{2\Delta x k_x}\left[x\sin(k_x x) + \frac{1}{k_x}\cos(k_x x) + (2\Delta x - x_0)\sin(k_x x)\right]_{x=x_0-2\Delta x}^{x=x_0} + \frac{1}{2\Delta x k_x}\left[-x\sin(k_x x) - \frac{1}{k_x}\right. \qquad (31)$$

$$\left.\cos(k_x x) + (2\Delta x + x_0)\sin(k_x x)\right]_{x=x_0}^{x=x_0+2\Delta x}$$

$$= \frac{1}{2\Delta x k_x}\left\{\begin{array}{c} x_0\sin(k_x x_0) + \frac{1}{k_x}\cos(k_x x_0) + (2\Delta x - x_0)\sin(k_x x_0) + \ldots - \\ (x_0 - 2\Delta x)\sin(k_x(x_0 - 2\Delta x)) - \frac{1}{k_x}\cos(k_x(x_0 - 2\Delta x)) - (2\Delta x - x_0)\sin(k_x(x_0 - 2\Delta x)) + \ldots - \\ (x_0 + 2\Delta x)\sin(k_x(x_0 + 2\Delta x)) - \frac{1}{k_x}\cos(k_x(x_0 + 2\Delta x)) + (2\Delta x + x_0)\sin(k_x(x_0 + 2\Delta x)) + \ldots + \\ x_0\sin(k_x x_0) + \frac{1}{k_x}\cos(k_x x_0) - (2\Delta x + x_0)\sin(k_x x_0) \end{array}\right\} \qquad (32)$$

$$= \frac{1}{\Delta x k_x^2}(1 - \cos(k_x\Delta x))\cos(k_x x_0) \qquad (33)$$

Triangle Fourier Coefficient:

$$F_T(\Delta x) = \begin{array}{ll} \frac{1}{\Delta x k_x^2}(1 - \cos(k_x\Delta x)), & k_x \neq 0 \\ 2\Delta x, & k_x = 0 \end{array} \qquad (34)$$

Appendix 3

Appendix 3: Multi-Layer Coupling

For an overview of the field description used below, see the first section of the Appendix 1.

We assume a Source Subsection (i.e., a subsection with current on it) in layer 1, which has a thickness of $h_1$. Given the fields in Layer 1, we determine the fields in Layer 0. Layer 0 contains the Upper Field Subsection, the subsection to which we wish to determine the coupling from the source subsection. After completing that, we also determine the coupling to the Lower Field Subsection, in Layer 2. See the Figure below.

To determine the fields in Layer 0 due to the Source Subsection, we need only the transverse electric field due to the source at the surface $z=c_1$. This is assumed to be known (as specified in Appendix 1) and of the form:

$$[E_t^{(1)}]_{z=c_1} = \sum_i V_{iU}^{(1)} e_i \qquad (1)$$

The transverse fields for the top layer are:

$$E_t^{(0)} = \sum_i V_i^{(0)}\{\sin(k_{iz}^{(0)}(c_0 - z)) + r_{iT}^{(0)}\cos(k_{iz}^{(0)}(c_0 - z))\}e_i \quad (2)$$

$$H_t^{(0)} = \sum_i V_i^{(0)}Y_i^{(0)}\{\cos(k_{iz}^{(0)}(c_0 - z)) - r_{iT}^{(0)}\sin(k_{iz}^{(0)}(c_0 - z))\}h_i \quad (3)$$

The top cover surface impedance, i.e., the ratio of electric to magnetic field at the top cover, Level 0, $z=c_0$, is assumed to be known. The top cover impedance is normalized to the waveguide modal impedance as $r_{iT}^{(0)}=Y_i^{(0)}R_{iT}^{(0)}$. Note that $r_{iT}^0$ is indeed the result if we take the ratio of (2) over (3), multiply by the modal impedance and evaluate at $z=c_0$. The $r_{iT}^{(0)}$ impedance then determines all the lower (higher index) $r_{iT}^{(j)}$ boundary impedances, which are $r_{iT}^{(0)}$ transformed by the rectangular waveguide transmission line formed by the sidewalls. For example, $r_{iT}^{(1)}$ is determined by taking the ratio of (2) over (3), multiplying by $Y_i^{(1)}$ and evaluating at $z=c_1$ yielding:

$$r_{iT}^{(1)} = Y_i^{(1)}R_{iT}^{(1)} = \frac{Y_i^{(1)}}{Y_i^{(0)}}\frac{\sin(k_{iz}^{(0)}h_0) + r_{iT}^{(0)}\cos(k_{iz}^{(0)}h_0)}{\cos(k_{iz}^{(0)}h_0) - r_{iT}^{(j-1)}\sin(k_{iz}^{(j-1)}h_0)} \quad (4a)$$

Lower (higher index) surface impedances are determined recursively as:

$$r_{iT}^{(j)} = Y_i^{(j)}R_{iT}^{(j)} = \frac{Y_i^{(j)}}{Y_i^{(j-1)}}\frac{\sin(k_{iz}^{(j-1)}h_{j-1}) + r_{iT}^{(j-1)}\cos(k_{iz}^{(j-1)}h_{j-1})}{\cos(k_{iz}^{(j-1)}h_{j-1}) - r_{iT}^{(j-1)}\sin(k_{iz}^{(j-1)}h_{j-1})} \quad (4b)$$

The analogous impedance of the bottom cover transformed up through the dielectric stack is also determined recursively:

$$r_{iB}^{(j)} = Y_i^{(j)}R_{iB}^{(j)} = \frac{Y_i^{(j)}}{Y_i^{(j+1)}}\frac{\sin(k_{iz}^{(j+1)}h_{j+1}) + r_{iB}^{(j+1)}\cos(k_{iz}^{(j+1)}h_{j+1})}{\cos(k_{iz}^{(j+1)}h_{j+1}) - r_{iB}^{(j+1)}\sin(k_{iz}^{(j+1)}h_{j+1})} \quad (5)$$

Our task is to determine the $V_i^{(0)}$ in terms of the known $V_{iU}^{(1)}$. Evaluating the fields in both regions using (1) and (2) at Level 1 and setting them equal:

$$[E_t^{(0)}]_{z=c_1} = [E_t^{(1)}]_{z=c_1} \quad (6)$$

$$V_i^{(0)}\{\sin(k_{iz}^{(0)}h_0) + r_{iT}^{(0)}\cos(k_{iz}^{(0)}h_0)\} = V_{iU}^{(1)} \quad (7)$$

$$V_i^{(0)} = \frac{V_{iU}^{(1)}}{\sin(k_{iz}^{(0)}h_0) + r_{iT}^{(0)}\cos(k_{iz}^{(0)}h_0)} \quad (8)$$

Substituting (8) into (2) we have the transverse fields. We also list the corresponding z-directed field, from (14) and (16) in Appendix 1:

$$E_t^{(0)} = \sum_i \frac{V_{iU}^{(1)}}{\sin(k_{iz}^{(0)}h_0) + r_{iT}^{(0)}\cos(k_{iz}^{(0)}h_0)}\{\sin(k_{iz}^{(0)}(c_0 - z)) + r_{iT}^{(0)}\cos(k_{iz}^{(0)}(c_0 - z))\}e_i \quad (9)$$

-continued $$E_z^{(0)} = \sum_{TM} \frac{V_{iU}^{(1)}k_{iz}^{(0)}N_3}{\sin(k_{iz}^{(0)}h_0) + r_{iT}^{(0)}\cos(k_{iz}^{(0)}h_0)}\{\cos(k_{iz}^{(0)}(c_0 - z)) - r_{iT}^{(0)}\sin(k_{iz}^{(0)}(c_0 - z))\}g_3(x, y)u_z \quad (10)$$

Since we have a $c_0-z$ dependence, (10) is of opposite sign as compared to (14) in Appendix 1, as noted there. Analogously, we can find the fields in Layer 2, below the Source Layer. This layer contains the Lower Field Subsection. All we need is the transverse fields from the Source Subsection evaluated at Level 2, the bottom side of the Source Layer, in order to determine all three field components in Layer 2:

$$[E_t^{(1)}]_{z=c_2} = \sum_i V_{iL}^{(1)}e_i \quad (11)$$

$$E_t^{(2)} = \sum_i \frac{V_{iL}^{(1)}}{\sin(k_{iz}^{(2)}h_2) + r_{iB}^{(2)}\cos(k_{iz}^{(2)}h_2)}\{\sin(k_{iz}^{(2)}(z - c_3)) + r_{iB}^{(2)}\cos(k_{iz}^{(2)}(z - c_3))\}e_i \quad (12)$$

$$E_z^{(2)} = -\sum_{TM} \frac{V_{iL}^{(1)}k_{iz}^{(2)}N_3}{\sin(k_{iz}^{(2)}h_2) + r_{iB}^{(2)}\cos(k_{iz}^{(2)}h_2)}\{\cos(k_{iz}^{(2)}(z - c_3)) - r_{iB}^{(2)}\sin(k_{iz}^{(2)}(z - c_3))\}g_3(x, y)u_z \quad (13)$$

Summations over i indicate summation over all TE and TM rectangular waveguide modes. Note that the TE modes have no z-directed electric field, so (10) and (13) are summed only over the TM modes. This situation arises only when we must deal with a via (Tapered Via or TV, or a Uniform Via, UV) as either the field or source subsection.

Note that in this document, $(x_0, y_0)$ is always the center of the source subsection and $y_i$ is the center of the field subsection.

Calculating the Coupling to Field Subsections in Non-Source Layers

With a source subsection A and a field subsection B, the System Matrix coupling value is:

$$S_{AtoB} = \int_V E_A \cdot J_B dV \quad (14)$$

where $E_A$ is the electric field due to the Source Subsection and $J_B$ is the unit magnitude current distribution on the Field Subsection, i.e., the basis function. The integration is taken over the volume of the Field Subsection. If the Field Subsection is a surface current instead of a volume current, the integration is over the area of the Field Subsection.

Applying (14) to (9), (10), (12), and (13), we have:

$$S_{AtoRFXU} = \sum_i \frac{V_{iU}^{(1)}}{\sin(k_{iz}^{(0)}h_0) + r_{iT}^{(0)}\cos(k_{iz}^{(0)}h_0)} \int_V \{\sin(k_{iz}^{(0)}(c_0 - z)) + r_{iT}^{(0)}\cos(k_{iz}^{(0)}(c_0 - z))\}J_{XYU} \cdot e_i dV \quad (15)$$

-continued $$S_{AtoZU} = \sum_{TM} \frac{V_{iU}^{(1)} k_{iz}^{(0)} N_3}{\sin(k_{iz}^{(0)} h_0) + r_{iT}^{(0)} \cos(k_{iz}^{(0)} h_0)} \tag{16}$$

$$\int_V \{\cos(k_{iz}^{(0)}(c_0 - z)) - r_{iT}^{(0)} \sin(k_{iz}^{(0)}(c_0 - z))\} g_3 J_{ZU} \cdot u_z dV$$

$$S_{AtoXYL} = \sum_i \frac{V_{iL}^{(1)}}{\sin(k_{iz}^{(2)} h_2) + r_{iT}^{(2)} \cos(k_{iz}^{(2)} h_2)} \tag{17}$$

$$\int_V \{\sin(k_{iz}^{(2)}(z - c_3)) + r_{iB}^{(2)} \cos(k_{iz}^{(2)}(z - c_3))\} J_{XYL} \cdot e_i dV$$

$$S_{AtoZL} = \sum_{TM} \frac{V_{iL}^{(1)} k_{iz}^{(2)} N_3}{\sin(k_{iz}^{(2)} h_2) + r_{iB}^{(2)} \cos(k_{iz}^{(2)} h_2)} \tag{18}$$

$$\int_V \{\cos(k_{iz}^{(2)}(z - c_3)) - r_{iB}^{(2)} \sin(k_{iz}^{(2)}(z - c_3))\} g_3(x, y) J_{ZL} \cdot u_z dV$$

where subscripts XY refer to a Field Subsection with transverse current only, Z refers to a Field Subsection with vertical current only, U refers to the Upper Field Subsection, and L refers to a Lower Field Subsection.

Coupling to Surface Rooftop Field Subsections

We evaluate the System Matrix coupling value by evaluating the integral portions of (15)-(18). For a RFX surface rooftop at the top of the Upper Field Layer, above the Source Layer, at $z=c_0$, we work with (15):

$$S_{AtoRFXU} = \sum_i \frac{V_{iU}^{(1)} r_{iT}^{(0)}}{\sin(k_{iz}^{(0)} h_0) + r_{iT}^{(0)} \cos(k_{iz}^{(0)} h_0)} \tag{19}$$

$$\int\int_{x,y} \{T(x, x_0, \Delta x) R(y, y_0, \Delta y) u_x\} \cdot e_i(x, y) dxdy$$

$$S_{AtoRFXU} = \tag{20}$$

$$\sum_i \frac{V_{iU}^{(1)} r_{iT}^{(0)}}{\sin(k_{iz}^{(0)} h_0) + r_{iT}^{(0)} \cos(k_{iz}^{(0)} h_0)} F_T(\Delta x) F_R(\Delta y) [e_i(x_1, y_1) \cdot u_x]$$

See the (1) and (2) in the main paper for the definitions of the basis function, formed from triangle pulse functions, $T(x, x_0, \Delta x)$ and rectangle pulse functions, $R(y, y_0, \Delta y)$, and the Fourier coefficients, $F_T(\Delta x)$ and $F_R(\Delta y)$.

In an analogous manner, the System Matrix value for coupling to a RFY Field Subsection above the Source Section is:

$$S_{AtoRFYU} = \tag{21}$$

$$\sum_i \frac{V_{iU}^{(1)} r_{iT}^{(0)}}{\sin(k_{iz}^{(0)} h_0) + r_{iT}^{(0)} \cos(k_{iz}^{(0)} h_0)} F_R(\Delta x) F_T(\Delta y) [e_i(x_1, y_1) \cdot u_y]$$

The differences from (20) are yellow highlighted in (21).

For coupling to a RFX or a RFY subsection at the bottom of the Lower Field Layer, below the Source Layer, at $z=c_3$, we work with (17):

$$S_{AtoRFXL} = \tag{22}$$

$$\sum_i \frac{V_{iL}^{(1)} r_{iB}^{(2)}}{\sin(k_{iz}^{(2)} h_2) + r_{iB}^{(2)} \cos(k_{iz}^{(2)} h_2)} F_T(\Delta x) F_R(\Delta y) [e_i(x_1, y_1) \cdot u_x]$$

$$S_{AtoRFYL} = \tag{23}$$

$$\sum_i \frac{V_{iL}^{(1)} r_{iB}^{(2)}}{\sin(k_{iz}^{(2)} h_2) + r_{iB}^{(2)} \cos(k_{iz}^{(2)} h_2)} F_R(\Delta x) F_T(\Delta y) [e_i(x_1, y_1) \cdot u_y]$$

Coupling to Volume Rooftop Field Subsections

For a VRFX Volume Rooftop at the top of the Upper Field Layer, above the Source Layer, from $z=c_1$ to $c_0$, we work with (15). The z-portion of the required integral is:

$$\int_{z=c_1}^{c_0} \{\sin(k_{iz}^{(0)}(c_0 - z)) + r_{iT}^{(0)} \cos(k_{iz}^{(0)}(c_0 - z))\} dz \tag{24}$$

$$= \frac{1}{k_{iz}^{(0)}} [\cos(k_{iz}^{(0)}(c_0 - z)) - r_{iT}^{(0)} \sin(k_{iz}^{(0)}(c_0 - z))]_{z=c_1}^{c_0} \tag{25}$$

$$= \frac{1}{k_{iz}^{(0)}} (1 - \cos(k_{iz}^{(0)} h_0) + r_{iT}^{(0)} \sin(k_{iz}^{(0)} h_0)) \tag{26}$$

This gives us:

$$S_{AtoVRFXU} = \sum_i \frac{V_{iU}^{(1)}}{k_{iz}^{(0)}} \tag{27}$$

$$\frac{1 - \cos(k_{iz}^{(0)} h_0) + r_{iT}^{(0)} \sin(k_{iz}^{(0)} h_0)}{\sin(k_{iz}^{(0)} h_0) + r_{iT}^{(0)} \cos(k_{iz}^{(0)} h_0)} F_T(\Delta x) F_R(\Delta y) [e_i(x_1, y_1) \cdot u_x]$$

In an analogous manner, the System Matrix value for coupling to a VRFY Field Subsection above the Source Subsection is:

$$S_{AtoVRFYU} = \sum_i \frac{V_{iU}^{(1)}}{k_{iz}^{(0)}} \tag{28}$$

$$\frac{1 - \cos(k_{iz}^{(0)} h_0) + r_{iT}^{(0)} \sin(k_{iz}^{(0)} h_0)}{\sin(k_{iz}^{(0)} h_0) + r_{iT}^{(0)} \cos(k_{iz}^{(0)} h_0)} F_R(\Delta x) F_T(\Delta y) [e_i(x_1, y_1) \cdot u_y]$$

For coupling to a VRFX subsection at the bottom of the Lower Field Layer, below the Source Layer, from $z=c_3$ to $c_2$, we work with (17). The z-portion of the required integral is:

$$\int_{z=c_3}^{c_2} \{\sin(k_{iz}^{(2)}(z - c_3)) + r_{iB}^{(2)} \cos(k_{iz}^{(2)}(z - c_3))\} dz \tag{29}$$

$$= \frac{1}{k_{iz}^{(2)}} [\cos(k_{iz}^{(2)}(z - c_3)) - r_{iB}^{(2)} \sin(k_{iz}^{(2)}(z - c_3))]_{z=c_3}^{c_2} \tag{30}$$

$$= \frac{1}{k_{iz}^{(2)}} (1 - \cos(k_{iz}^{(2)} h_2) + r_{iB}^{(2)} \sin(k_{iz}^{(2)} h_2)) \tag{31}$$

This gives us:

$$S_{AtoVRFXL} = \sum_i \frac{V_{iL}^{(1)}}{k_{iz}^{(2)}} \frac{1 - \cos(k_{iz}^{(2)}h_2) + r_{iB}^{(2)}\sin(k_{iz}^{(2)}h_2)}{\sin(k_{iz}^{(2)}h_2) + r_{iB}^{(2)}\cos(k_{iz}^{(2)}h_2)} F_T(\Delta x)F_R(\Delta y)[e_i(x_1, y_1) \cdot u_x] \quad (32)$$

$$S_{AtoVRFYL} = \sum_i \frac{V_{iL}^{(1)}}{k_{iz}^{(2)}} \frac{1 - \cos(k_{iz}^{(2)}h_2) + r_{iB}^{(2)}\sin(k_{iz}^{(2)}h_2)}{\sin(k_{iz}^{(2)}h_2) + r_{iB}^{(2)}\cos(k_{iz}^{(2)}h_2)} F_R(\Delta x)F_T(\Delta y)[e_i(x_1, y_1) \cdot u_y] \quad (33)$$

Coupling to Uniform Via Field Subsections

For a UV, Uniform Via, in the Upper Field Layer, above the Source Layer, from $z=c_1$ to $c_0$, we work with (16). The z-portion of the required integral is:

$$\int_{z=c_1}^{c_0} \{\cos(k_{iz}^{(0)}(c_0 - z)) + r_{iT}^{(0)}\sin(k_{iz}^{(0)}(c_0 - z))\}dz \quad (34)$$

$$= \frac{1}{k_{iz}^{(0)}}[-\sin(k_{iz}^{(0)}(c_0 - z)) - r_{iT}^{(0)}\cos(k_{iz}^{(0)}(c_0 - z))]_{z=c_1}^{c_0} \quad (35)$$

$$= \frac{1}{k_{iz}^{(0)}}(\sin(k_{iz}^{(0)}h_0) + r_{iT}^{(0)}(\cos(k_{iz}^{(0)}h_0) - 1)) \quad (36)$$

Completing the entire volume integral gives us:

$$S_{AtoUVU} = \sum_{TM} V_{iU}^{(1)} N_3 \frac{\sin(k_{iz}^{(0)}h_0) + r_{iT}^{(0)}(\cos(k_{iz}^{(0)}h_0) - 1)}{\sin(k_{iz}^{(0)}h_0) + r_{iT}^{(0)}\cos(k_{iz}^{(0)}h_0)} F_R(\Delta x)F_R(\Delta y)g_3(x_1, y_1) \quad (37)$$

For coupling to a UV subsection at the bottom of the Lower Field Layer, below the Source Layer, from $z=c_3$ to $c_2$, we work with (18). The z-portion of the required integral is:

$$\int_{z=c_3}^{c_2} \{\cos(k_{iz}^{(2)}(z - c_3)) - r_{iB}^{(2)}\sin(k_{iz}^{(2)}(z - c_3))\}dz \quad (38)$$

$$= \frac{1}{k_{iz}^{(2)}}[\sin(k_{iz}^{(2)}(z - c_3)) - r_{iB}^{(2)}\cos(k_{iz}^{(2)}(z - c_3))]_{z=c_3}^{c_2} \quad (39)$$

$$= \frac{1}{k_{iz}^{(2)}}(\sin(k_{iz}^{(2)}h_2) + r_{iB}^{(2)}(\cos(k_{iz}^{(2)}h_2) - 1)) \quad (40)$$

This gives us:

$$S_{AtoUVL} = -\sum_{TM} V_{iL}^{(1)} N_3 \quad (41)$$

$$\frac{\sin(k_{iz}^{(2)}h_2) + r_{iB}^{(2)}(\cos(k_{iz}^{(2)}h_2) - 1)}{\sin(k_{iz}^{(2)}h_2) + r_{iB}^{(2)}\cos(k_{iz}^{(2)}h_2)} F_R(\Delta x)F_R(\Delta y)g_3(x_1, y_1)$$

Coupling to Tapered Via Field Subsections

For a TV, Tapered Via, at the top of the Upper Field Layer, above the Source Layer, from $z=c_1$ to $c_0$, we work with (16). The z-portion of the basis function, $J_{ZU}$, in (16) is $(z-c_1)/h_0$. ID-8b and ID-9b in Appendix 2 are helpful in evaluating the z-portion of the required integral:

$$\frac{1}{h_0}\int_{z=c_1}^{c_0} \{(z - c_1)\cos(k_{iz}^{(0)}(c_0 - z)) - r_{iT}^{(0)}(z - c_1)\sin(k_{iz}^{(0)}(c_0 - z))\}dz \quad (42)$$

$$\text{let: } u = z - c_1 \quad (43)$$

$$= \frac{1}{h_0}\int_{u=0}^{h_0} \{u\cos(k_{iz}^{(0)}(h_0 - u)) - r_{iT}^{(0)}u\sin(k_{iz}^{(0)}(h_0 - u))\}du = \quad (44)$$

$$\frac{1}{k_{iz}^{(0)}h_0}\left[-u\sin(k_{iz}^{(0)}(h_0 - u)) + \frac{1}{k_{iz}^{(0)}}\cos(k_{iz}^{(0)}(h_0 - u))\right.$$

$$\left.-r_{iT}^{(0)}u\cos(k_{iz}^{(0)}(h_0 - u)) - \frac{r_{iT}^{(0)}}{k_{iz}^{(0)}}\sin(k_{iz}^{(0)}(h_0 - u))\right]_{u=0}^{h_0} \quad (45)$$

$$= \frac{1}{k_{iz}^{(0)}h_0}\left(\frac{1}{k_{iz}^{(0)}}(1 - \cos(k_{iz}^{(0)}h_0)) - r_{iT}^{(0)}h_0 + \frac{r_{iT}^{(0)}}{k_{iz}^{(0)}}\sin(k_{iz}^{(0)}h_0)\right) \quad (46)$$

$$= \frac{1 - \cos(k_{iz}^{(0)}h_0) + r_{iT}^{(0)}(\sin(k_{iz}^{(0)}h_0) - k_{iz}^{(0)}h_0)}{k_{iz}^{(0)2}h_0} \quad (47)$$

Completing the entire volume integral gives us:

$$S_{AtoTVU} = \sum_{TM} \frac{V_{iU}^{(1)}N_3}{k_{iz}^{(0)}h_2} \frac{1 - \cos(k_{iz}^{(0)}h_0) + r_{iT}^{(0)}(\sin(k_{iz}^{(0)}h_0) - k_{iz}^{(0)}h_0)}{\sin(k_{iz}^{(0)}h_0) + r_{iT}^{(0)}\cos(k_{iz}^{(0)}h_0)} \quad (48)$$

$$F_R(\Delta x)F_R(\Delta y)g_3(x_1, y_1)$$

For a TV, Tapered Via, at the bottom of the Lower Field Layer, below the Source Layer, from $z=c_3$ to $c_2$, we work with (18). The z-portion of the basis function, $J_{ZU}$, in (16) is $(z-c_3)/h_2$. ID-8a and ID-9a in Appendix 2 are helpful in evaluating the z-portion of the required integral:

$$\frac{1}{h_2}\int_{z=c_3}^{c_2} \{(z - c_3)\cos(k_{iz}^{(2)}(z - c_3)) - r_{iB}^{(2)}(z - c_3)\sin(k_{iz}^{(2)}(z - c_3))\}dz \quad (49)$$

$$\text{let: } u = z - c_3 \quad (50)$$

$$= \int_{u=0}^{h_2} \{u\cos(k_{iz}^{(2)}u) - r_{iB}^{(2)}u\sin(k_{iz}^{(2)}u)\}du \quad (51)$$

$$= \left(\frac{1}{k_{iz}^{(2)}h_2}\left[u\sin(k_{iz}^{(2)}u) + \frac{1}{k_{iz}^{(0)}}\cos(k_{iz}^{(2)}u) + \right.\right. \quad (52)$$

$$\left.\left. r_{iB}^{(2)}u\cos(k_{iz}^{(2)}u) - \frac{r_{iB}^{(2)}}{k_{iz}^{(0)}}\sin(k_{iz}^{(2)}u)\right]_{u=0}^{h_2}\right.$$

-continued $$-\frac{r_{iB}^{(2)}}{k_{iz}^{(0)}}\sin(k_{iz}^{(2)}h_2)\Bigg) \quad (53)$$

$$=\frac{(1+r_{iB}^{(2)}k_{iz}^{(2)}h_2)\cos(k_{iz}^{(2)}h_2)-}{k_{iz}^{(2)2}h_2} \quad (54)$$

Completing the entire volume integral gives us:

$$S_{AtoTVL} = \quad (55)$$

$$-\sum_{TM}\frac{V_{iL}^{(1)}N_3}{k_{iz}^{(2)}h_2}\frac{(1+r_{iB}^{(2)}k_{iz}^{(2)}h_2)\cos(k_{iz}^{(2)}h_2)-}{\sin(k_{iz}^{(2)}h_2)+r_{iB}^{(2)}\cos(k_{iz}^{(2)}h_2)}F_R(\Delta x)F_R(\Delta y)g_3(x_1,y_1)$$

Coupling from Volume Rooftop Source Subsections

To determine coupling from the Source Subsection, we must determine the $V_{iU}^{(1)}$ for coupling to Field Subsections above the Source Layer, and the $V_{iL}^{(1)}$ for coupling to Field Subsections below the Source Layer. We provide these results in this section and the next two sections.

The transverse fields from an x-directed volume rooftop, VRFX, and a y-directed volume rooftop, VRFY, are given in (60) in the VolumeRooftops document, repeated here with Layer indices added. The $C_i$ come from (27) and (29) in the VolumeRooftops document:

$$E_{tVRF} = \sum_i \frac{C_i(x_0, y_0)}{Y_i^{(1)}k_{iz}^{(1)}} \quad (56)$$

$$\left(1 - \frac{\sin(k_{iz}^{(1)}(c_1-z)) + r_{iT}^{(1)}\cos(k_{iz}^{(1)}(c_1-z))\sin(k_{iz}^{(1)}(z-c_2)) + r_{iB}^{(1)}\cos(k_{iz}^{(1)}(z-c_2))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)e_i$$

where $$C_i(x_0,y_0)=F_T(\Delta x)F_R(\Delta y)[e_i(x_0,y_0)\cdot u_x] \quad (57) \text{ for VRFX, and}$$

$$C_i(x_0,y_0)=F_R(\Delta x)F_T(\Delta y)[e_i(x_0,y_0)\cdot u_y] \quad (58) \text{ for VRFY}$$

By applying (1) to (56), we evaluate the transverse fields on the upper, $z=c_1$, surface of the Source Layer:

$$V_{iVRFU}^{(1)} = \quad (59)$$

$$\frac{C_{is}(x_0,y_0)}{Y_i^{(1)}k_{iz}^{(1)}}\left(1 - \frac{r_{iT}^{(1)}+\sin(k_{iz}^{(1)}h_1)+r_{iB}^{(1)}\cos(k_{iz}^{(1)}h_1)}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

$$V_{iVRFU}^{(1)} = \frac{C_{is}(x_0,y_0)}{Y_i^{(1)}k_{iz}^{(1)}}\frac{\cos(k_{iz}^{(1)}h_1)-r_{iT}^{(1)}-\sin(k_{iz}^{(1)}h_1)-r_{iB}^{(1)}\cos(k_{iz}^{(1)}h_1)}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)} \quad (60)$$

$$V_{iVRFU}^{(1)} = \frac{C_{is}(x_0,y_0)}{Y_i^{(1)}k_{iz}^{(1)}}\frac{r_{iT}^{(1)}(\cos(k_{iz}^{(1)}h_1)-1-r_{iB}^{(1)}\sin(k_{iz}^{(1)}h_1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)} \quad (61)$$

Either (59) or (61) can be used, depending on which is most convenient.

Next we apply (11) to (56), we evaluate the transverse fields on the lower, $z=c_2$, surface of the Source Layer:

$$V_{iVRFU}^{(1)} = \quad (62)$$

$$\frac{C_{is}(x_0,y_0)}{Y_i^{(1)}k_{iz}^{(1)}}\left(1 - \frac{\sin(k_{iz}^{(1)}h_1)+r_{iT}^{(1)}\cos(k_{iz}^{(1)}h_1)+r_{iB}^{(1)}}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

$$V_{iVRFU}^{(1)} = \frac{C_{is}(x_0,y_0)}{Y_i^{(1)}k_{iz}^{(1)}}\left(\frac{(1-r_{iB}^{(1)}r_{iT}^{(1)})\sin(k_{iz}^{(1)}h_1)+(r_{iT}^{(1)}+r_{iB}^{(1)})}{\cos(k_{iz}^{(1)}h_1)-\sin(k_{iz}^{(1)}h_1)-r_{iT}^{(1)}\cos(k_{iz}^{(1)}h_1)-r_{iB}^{(1)}} \middle/ (1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)\right) \quad (63)$$

$$V_{iVRFU}^{(1)} = \frac{C_{is}(x_0,y_0)}{Y_i^{(1)}k_{iz}^{(1)}}\left(\frac{r_{iB}^{(1)}(\cos(k_{iz}^{(1)}h_1)-1-r_{iT}^{(1)}\sin(k_{iz}^{(1)}h_1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right) \quad (64)$$

Either (62) or (64) can be used, depending on which is most convenient.

Coupling from Uniform Via Source Subsections

The transverse fields from a Uniform Via, UV, are given in (141a) and (124) in the ViasNew document, and repeated here with Layer indices added:

$$E_{tUV} = \sum_{TM}\frac{T_{it}}{k_{iz}^{(1)}}\{-r_{iB}^{(1)}(\sin(k_{iz}^{(1)}(c_1-z))+r_{iT}^{(1)}\cos(k_{iz}^{(1)}(c_1-z)))+ \quad (65)$$

$$r_{iT}^{(1)}(\sin(k_{iz}^{(1)}(z-c_2))+r_{iB}^{(1)}\cos(k_{iz}^{(1)}(z-c_2)))\}e_i$$

$$T_{it} = \frac{k_{iz}^{(1)}}{Y_i^{(1)}}\frac{F_R(\Delta x)F_R(\Delta y)N_3g_3(x_0,y_0)}{(1-r_{iT}^{(1)}r_{iB}^{(1)})\sin(k_{iz}^{(1)}h_1)+(r_{iT}^{(1)}+r_{iB}^{(1)})\cos(k_{iz}^{(1)}h_1)} \quad (66)$$

By applying (1) to (65), we evaluate the transverse fields on the upper, $z=c_1$, surface of the Source Layer:

$$V_{iUVU}^{(1)} = \frac{F_R(\Delta x)F_R(\Delta y)N_3g_3(x_0,y_0)}{Y_i^{(1)}} \quad (67)$$

$$\left(\frac{r_{iT}^{(1)}(\sin(k_{iz}^{(1)}h_1)+r_{iB}^{(1)}(\cos(k_{iz}^{(1)}h_1)-1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

By applying (11) to (65), we evaluate the transverse fields on the lower, $z=c_2$, surface of the Source Layer:

$$V_{iUVU}^{(1)} = \frac{F_R(\Delta x)F_R(\Delta y)N_3g_3(x_0,y_0)}{Y_i^{(1)}} \quad (67)$$

$$\left(\frac{r_{iB}^{(1)}(\sin(k_{iz}^{(1)}h_1)+r_{iT}^{(1)}(\cos(k_{iz}^{(1)}h_1)-1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

Coupling from Tapered Via Source Subsections

The transverse fields from a Tapered Via, TV, are given in (190) in Appendix 1, and repeated here with Layer indices added:

$$E_{tTV} = \sum_{TM}\frac{F_R(\Delta x)F_R(\Delta y)N_3g_3(x_0,y_0)}{Y_i^{(1)}k_{iz}^{(1)}h_1} \quad (68)$$

-continued $$\left\{\begin{array}{c}1-\sin(k_{iz}^{(1)}(c_1-z))+r_{iT}^{(1)}\cos(k_{iz}^{(1)}(c_1-z))+\\ \frac{(1-r_{iT}^{(1)}k_{iz}^{(1)}h_1)(\sin(k_{iz}^{(1)}(z-c_2))+r_{iB}^{(1)}\cos(k_{iz}^{(1)}(z-c_2)))}{(1-r_{iT}^{(1)}r_{iB}^{(1)})\sin(k_{iz}^{(1)}h_1)+(r_{iT}^{(1)}+r_{iB}^{(1)})\cos(k_{iz}^{(1)}h_1)}\end{array}\right\}e_i$$

By applying (1) to (68), we evaluate the transverse fields on the upper, $z=c_1$, surface of the Source Layer:

$$V_{iTVU}^{(1)} = \frac{F_R(\Delta x)F_R(\Delta y)N_3 g_3(x_0, y_0)}{Y_i^{(1)} k_{iz}^{(1)} h_1} \tag{69a}$$

$$\left(1 - \frac{r_{iT}^{(1)} + (1-r_{iT}^{(1)}k_{iz}^{(1)}h_1)(\sin(k_{iz}^{(1)}h_1)+r_{iB}^{(1)}\cos(k_{iz}^{(1)}h_1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

$$V_{iTVU}^{(1)} = \frac{F_R(\Delta x)F_R(\Delta y)N_3 g_3(x_0, y_0)}{Y_i^{(1)} k_{iz}^{(1)} h_1} \tag{69b}$$

$$\left(\frac{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)-}{r_{iT}^{(1)}-(1-r_{iT}^{(1)}k_{iz}^{(1)}h_1)(\sin(k_{iz}^{(1)}h_1)+r_{iB}^{(1)}\cos(k_{iz}^{(1)}h_1))}\right)$$

$$V_{iTVU}^{(1)} = \frac{F_R(\Delta x)F_R(\Delta y)N_3 g_3(x_0, y_0)}{Y_i^{(1)} k_{iz}^{(1)} h_1} \tag{69c}$$

$$\left(r_{iT}^{(1)} \frac{\cos(k_{iz}^{(1)}h_1)-1-r_{iB}^{(1)}\sin(k_{iz}^{(1)}h_1)+}{k_{iz}^{(1)}h_1(\sin(k_{iz}^{(1)}h_1)+r_{iB}^{(1)}\cos(k_{iz}^{(1)}h_1))} \right)$$

Use either (69a) or (69c), whichever is most convenient.

By applying (11) to (68), we evaluate the transverse fields on the lower, $z=c_2$, surface of the Source Layer:

$$V_{iTVL}^{(1)} = \frac{F_R(\Delta x)F_R(\Delta y)N_3 g_3(x_0, y_0)}{Y_i^{(1)} k_{iz}^{(1)} h_1} \tag{70}$$

$$\left(1 - \frac{\sin(k_{iz}^{(1)}h_1)+r_{iT}^{(1)}\cos(k_{iz}^{(1)}h_1)+r_{iB}^{(1)}(1-r_{iT}^{(1)}(k_{iz}^{(1)}h_1))}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

$$V_{iTVL}^{(1)} = \frac{F_R(\Delta x)F_R(\Delta y)N_3 g_3(x_0, y_0)}{Y_i^{(1)} k_{iz}^{(1)} h_1} \tag{71}$$

$$\left(\frac{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)-}{\sin(k_{iz}^{(1)}h_1)-r_{iT}^{(1)}\cos(k_{iz}^{(1)}h_1)-r_{iB}^{(1)}(1-r_{iT}^{(1)}k_{iz}^{(1)}h_1)}\right)$$

$$V_{iTVL}^{(1)} = \frac{F_R(\Delta x)F_R(\Delta y)N_3 g_3(x_0, y_0)}{Y_i^{(1)} k_{iz}^{(1)} h_1} \tag{72}$$

$$\left(\frac{r_{iB}^{(1)}(\cos(k_{iz}^{(1)}h_1)-1-r_{iT}^{(1)}\sin(k_{iz}^{(1)}h_1)+r_{iT}^{(1)}k_{iz}^{(1)}h_1)}{(1-r_{iB}^{(1)}r_{iT}^{(1)})\sin(k_{iz}^{(1)}h_1)+(r_{iT}^{(1)}+r_{iB}^{(1)})\cos(k_{iz}^{(1)}h_1)}\right)$$

Either (70) or (72) can be used, depending on which is most convenient.

Calculating Coupling Across Multiple Layers

To calculate coupling to a Field Subsection that is in a layer immediately above or below the Source Subsection, select the desired 'Coupling From' and 'Coupling To' subsection type. Then select the appropriate 'Coupling To' section and 'Coupling From' section. Then, in the 'Coupling From' section, evaluate $V_{iU}^{(1)}$ (for the layer above, i.e., smaller index), or $V_{iL}^{(1)}$ (for the layer below, or larger index). Use the selected expression in the appropriate equation in the "Coupling To" sections.

The $V_{iU}^{(1)}$ correspond to the tangential electric fields on the top surface of the Source Layer. If the Field Layer is higher still, use (8) to determine the source fields in Field Layer, then treat those fields as the new source fields and determine the $V_i$ for the next layer up. Evaluate the tangential fields at the top of that layer and repeat until the desired Field Layer is reached. This recursive procedure is summarized next.

1) Determine the desired $V_{iU}^{(1)}$ for the desired Source Subsection.
2) If the Field Subsection is in the layer immediately above, use that $V_{iU}^{(1)}$ in the appropriate Coupling To equation.
3) Otherwise, transform the $V_{iU}^{(1)}$ to the next layer up (i.e., smaller index, here it is 0) using:

$$V_{iU}^{(0)} = \frac{V_{iU}^{(1)} r_{iT}^{(0)}}{\sin(k_{iz}^{(0)} h_0) + r_{iT}^{(0)} \cos(k_{iz}^{(0)} h_0)} \tag{73}$$

4) Use the $V_{iU}^{(0)}$ calculated above as the new $V_{iU}^{(1)}$ and proceed to step 2.

If the Field Subsection Layer is below the Source Subsection Layer, proceed in an analogous manner, using $$V_{iL}^{(2)} = \frac{V_{iL}^{(1)} r_{iT}^{(2)}}{\sin(k_{iz}^{(2)} h_2) + r_{iT}^{(2)} \cos(k_{iz}^{(2)} h_2)} \tag{74}$$

Appendix 4

Appendix 4: Volume Current Ohmic Loss

Current on each subsection is represented in terms of a unit amplitude current distribution known as a basis function. For the following, subsection A is the source subsection with basis function $J_A$, and subsection B is the field subsection with basis function $J_B$. The moment matrix element for coupling from subsection A to subsection B is $$S_{AtoB} = \int_V E_A \cdot J_B dV \tag{1}$$

where $E_A$ is the electric field generated by the source subsection. Weighting the electric field by the field basis function, $J_B$, gives us a Galerkin implementation of the method of moments, which is used in Sonnet. Due to reciprocity, the Galerkin technique yields a symmetric matrix. To calculate Ohmic loss in a conductor, we evaluate only the electric field generated by the Ohmic loss. Thus, we assume the A subsection is a conductor with a bulk conductivity of a that obeys the following relationship:

$$E_A = \frac{J_A}{\sigma} \tag{2}$$

In general, a may be complex, for example, to model kinetic inductance in superconductors. Substituting (2) into (1):

$$S_{AtoB} = \int_V \frac{J_B \cdot J_A}{\sigma} dV \tag{3}$$

The above integral has a non-zero value only when the A and B subsections are one and the same or when they are physically overlapping. Even if overlapping, the integral is still zero if the current on each subsection is orthogonal to the current on the other. If both subsections support only surface current, rather than volume current, then the integral reduces to a surface integral and the bulk conductivity, $\sigma$, becomes a surface conductivity.

Care should be taken to make sure a surface current subsection does not represent exactly the same volume of conductor that a volume current subsection represents. For example, if a surface subsection is placed directly on top of a volume subsection with both representing current flowing in the same direction, but the intent is for the surface subsection to represent a volume of conductor above the volume subsection, there should be no problem. However, if the intent of the surface subsection is to represent the same volume of conductor as the volume subsection immediately below it, the total effective conductivity would then be double the desired conductivity as the two subsections would be connected in parallel.

If a subsection supports only surface current and it overlaps a volume current subsection, the Ohmic coupling in the overlapping region should be treated exactly the same for both subsections within the region of overlap. For example, the overlapping region could be treated as a volume current for both with bulk conductivity a. Alternatively, both could be treated as a surface current subsection with a specified surface conductivity. The important thing is that reciprocity hold. In other words, the Ohmic coupling from A to B should be exactly equal to the Ohmic coupling from B to A. This keeps the system matrix symmetric.

Rooftop Ohmic Self-Coupling

The (symmetric) volume rooftop basis function for x-directed current, with its base centered at $(x_0, y_0, z_0)=(0,0,0)$ is:

$$J_{VRFX}(0,0,0) = 1 - \frac{x}{2\Delta x}, \; 0 \le x \le 2\Delta x, \; -\Delta y \le y \le \Delta y, \; 0 \le z \le h \tag{4a}$$

$$= 1 + \frac{x}{2\Delta x}, \; -2\Delta x \le x \le 0, \; -\Delta y \le y \le \Delta y, \; 0 \le z \le h \tag{4b}$$

$$= 0, \text{ otherwise} \tag{4c}$$

Since (4) is symmetric, we need only integrate (4a) and double the result. Thus, the Ohmic self-coupling, using (3), yields:

$$S_{VRFXtoSelf} = \frac{2}{\sigma} \int_{x=0}^{2\Delta x} \int_{y=-\Delta y}^{\Delta y} \int_{z=0}^{h} \left(1 - \frac{x}{2\Delta x}\right)^2 dx\,dy\,dz \tag{5}$$

$$= \frac{4\Delta yh}{\sigma} \int_{x=0}^{2\Delta x} 1 - \frac{x}{\Delta x} + \frac{x^2}{4\Delta x^2} dx \tag{6}$$

-continued $$= \frac{4\Delta yh}{\sigma} \left[ x - \frac{x^2}{2\Delta x} + \frac{x^3}{12\Delta x^2} \right]_{x=0}^{x=2\Delta x} \tag{7}$$

$$= \frac{4\Delta yh}{\sigma}(2\Delta x - 2\Delta x + 2\Delta x/3) \tag{8}$$

$$= \frac{8\Delta x \Delta yh}{3\sigma} \tag{9}$$

The x-directed rooftop is composed of two adjacent cells. The left cell is called 'ramp-up' and the right cell is called 'ramp-down'. The y-directed rooftop has a similar structure, only along the y-axis Each of the two cells have base dimensions of $2\Delta x$ by $2\Delta y$. Thus, we can put (9) in terms of cell volume. In addition, the self-coupling for a y-directed rooftop that has the same cell volume is identical:

$$V_{Cell} = (2\Delta x)(2\Delta y)h = 4\Delta x \Delta yh \tag{10}$$

$$S_{VRFXtoSelf} = S_{VRFYtoSelf} = \frac{2V_{Cell}}{3\sigma} \tag{11}$$

For surface rooftop basis function self-coupling, we do not perform the integration over z in (5). Thus, we can modify (11) to use the area of a cell and a surface conductance:

$$A_{Cell} = (2\Delta x)(2\Delta y)h = 4\Delta x \Delta y \tag{12}$$

$$S_{RFXtoSelf} = S_{RFYtoSelf} = \frac{2A_{Cell}}{3\sigma_S} \tag{13}$$

Rooftop Ohmic Adjacent-Coupling

Two rooftop basis functions are considered adjacent if one eaves of each roof-top touches the peak of the other. Two adjacent same-directed rooftops overlap over half of each rooftop, i.e., over the area of one cell. For example a rooftop centered at (0,0,0) and a second one at $(2\Delta x, 0,0)$ overlap over the range of $0 \le x \le 2\Delta x$. It is only this overlapping region where Ohmic coupling can take place. The current distribution for the first rooftop in this example is given in (4). The (symmetric) volume rooftop basis function for x-directed current, centered at $(x_0, y_0, z_0)=(2\Delta x, 0,0)$ is:

$$J_{VRFX}(2\Delta x, 0,0) = \frac{x}{2\Delta x}, \; 0 \le x \le 2\Delta x, \; -\Delta y \le y \le \Delta y, \tag{14a}$$
$$0 \le z \le h$$

$$= 2 - \frac{x}{2\Delta x}, \; 2\Delta x \le x \le 4\Delta x, \; -\Delta y \le y \le \Delta y, \; 0 \le z \le h \tag{14b}$$

$$= 0, \text{ otherwise} \tag{14c}$$

Since this rooftop and the rooftop of (4) overlap only over the range $0 \le x \le 2\Delta x$, that is the range over which we integrate. Substituting (4a) and (14a) into (3), we evaluating the Ohmic adjacent-coupling as:

$$S_{VRFXtoSelf} = \frac{1}{\sigma} \int_{x=0}^{2\Delta x} \int_{y=-\Delta y}^{\Delta y} \int_{z=0}^{h} \left(1 - \frac{x}{2\Delta x}\right)\frac{x}{2\Delta x} dx\,dy\,dz \tag{15}$$

$$= \frac{2\Delta yh}{\sigma} \int_{x=0}^{2\Delta x} \frac{x}{2\Delta x} - \frac{x^2}{4\Delta x^2} dx \quad (16)$$

$$= \frac{2\Delta yh}{\sigma} \left[ \frac{x^2}{4\Delta x} + \frac{x^3}{12\Delta x^2} \right]_{x=0}^{x=2\Delta x} \quad (17)$$

$$= \frac{2\Delta yh}{\sigma} \left( \frac{x^2}{4\Delta x} + \frac{x^3}{12\Delta x^2} \right) \quad (18)$$

$$= \frac{2\Delta x \Delta y h}{3\sigma} \quad (19)$$

Using (10), we see that the adjacent subsection Ohmic coupling is:

$$S_{VRFXtoAdj} = S_{VRFYtoAdj} = \frac{V_{Cell}}{6\sigma} \quad (20)$$

For surface rooftop basis function self-coupling, we do not perform the integration over z in (15). Thus, we can modify (20) to use the area of a cell and a surface conductance:

$$S_{RFXtoAdj} = S_{RFYtoAdj} = \frac{A_{Cell}}{6\sigma_S} \quad (21)$$

Uniform Via Ohmic Self-Coupling

Since the uniform via has uniform z-directed over its entire volume (one cell), the integral of (3) results in:

$$S_{UVIAtoSelf} = \frac{V_{Cell}}{\sigma_S} \quad (22)$$

Uniform Via to Tapered Via Ohmic Coupling

The uniform via has uniform z-directed current over its entire volume. The tapered via, with its lower end centered at (0,0,0) has the following current distribution:

$$J_{TVIA}(0,0,0) = \frac{z}{h}, -\Delta x \le x \le \Delta x, -\Delta y \le y \le \Delta y, 0 \le z \le h \quad (23a)$$

$$= 0, \text{otherwise} \quad (23b)$$

The integral of (3) results in:

$$S_{UVIAtoTVIA} = \frac{1}{\sigma} \int_{x=-\Delta x}^{\Delta x} \int_{y=-\Delta y}^{\Delta y} \int_{z=0}^{h} \frac{z}{h} dxdydz \quad (24)$$

$$= \frac{4\Delta x \Delta y}{\sigma} \int_{z=0}^{h} \frac{z}{h} dx \quad (25)$$

$$= \frac{4\Delta x \Delta y}{\sigma} \left[ \frac{z^2}{2h} \right]_{x=0}^{x=h} \quad (26)$$

$$= \frac{4\Delta x \Delta y}{\sigma} \left( \frac{h^2}{2h} \right) \quad (27)$$

$$= \frac{2\Delta x \Delta y h}{\sigma} \quad (28)$$

Putting this result in terms of the cell volume, (10):

$$S_{UVIAtoTVIA} = \frac{V_{Cell}}{2\sigma_S} \quad (29)$$

Keep in mind that this result is valid only for UVIAs and TVIAs that share the same cell. All other UVIA to TVIA Ohmic-couplings are zero.

Tapered Via Ohmic Self-Coupling

Applying (23a) for both current distributions, the integral of (3) results in:

$$S_{TVIAtoSelf} = \frac{1}{\sigma} \int_{x=-\Delta x}^{\Delta x} \int_{y=-\Delta y}^{\Delta y} \int_{z=0}^{h} \frac{z^2}{h^2} dxdydz \quad (30)$$

$$= \frac{4\Delta x \Delta y}{\sigma} \int_{z=0}^{h} \frac{z^2}{h^2} dx \quad (31)$$

$$= \frac{4\Delta x \Delta y}{\sigma} \left[ \frac{z^3}{3h^2} \right]_{x=0}^{x=h} \quad (32)$$

$$= \frac{4\Delta x \Delta y}{\sigma} \left( \frac{h^3}{3h^2} \right) \quad (33)$$

$$= \frac{4\Delta x \Delta y h}{3\sigma} \quad (34)$$

Putting this result in terms of the cell volume, (10):

$$S_{TVIAtoSelf} = \frac{V_{Cell}}{3\sigma_S} \quad (35)$$

All Other Ohmic Couplings

All other Ohmic couplings are zero because all other possible pairs of subsections do not have any component of current ($J_x$, $J_y$, or $J_z$) that are in common with each other. In other words, the dot product of (3) is zero for all other cases.

What is claimed is:

1. A computer-implemented method of simulating a vertically-oriented current distribution of current flowing through a plurality of layers of a three-dimensional structure embedded in a shielded multi-layered dielectric, comprising the steps of:

dividing the three-dimensional structure embedded in the shielded multi-layered dielectric into a plurality of subsections, wherein at least one portion of the structure having vertically-oriented current is divided into a plurality of rectangular prism subsections arranged in a stacked configuration, each having a first surface disposed perpendicular to a z-axis and a second surface disposed perpendicular to the z-axis;

independently assigning a current in each of the subsections, the independently assigned currents in the plurality of rectangular prism subsections arranged in the stacked configuration together forming a piecewise linear representation of vertically-oriented current, wherein the independently assigned current in at least one rectangular prism subsection of the plurality of rectangular prism subsections is a vertically oriented current that linearly changes from a first value at the first surface of the rectangular prism subsection to a second value at the second surface of the rectangular prism subsection; wherein the first value is different from the second value;

calculating an induced voltage in each of the plurality of subsections resulting from the electric field created by each independently assigned current, the induced voltage in each of the plurality of subsections representing a transfer impedance or transfer admittance; and calculating the vertically oriented current distribution of current flowing through the plurality of layers of the three-dimensional structure according to the transfer impedance or transfer admittance of each subsection of the plurality of subsections and an assumed voltage across each subsection of the plurality of subsections.

2. The computer-implemented method of claim 1, wherein the assumed voltage is zero except where a voltage source is coupled.

3. The computer-implemented method of claim 1, wherein the assumed voltage is nonzero across subsection of the plurality of subsections.

4. The computer-implemented method of claim 1, wherein the first value is higher than the second value.

5. The computer-implemented method of claim 1, wherein the first value is lower than the second value.

6. The computer-implemented method of claim 1, wherein the assigned current in a second rectangular prism subsection is a vertically oriented current that is constant throughout.

7. The computer-implemented method of claim 1, wherein both the first value and second value are nonzero.

8. The computer-implemented method of claim 1, wherein at least one portion of the structure carrying horizontal current is divided into volume rooftop subsections.

9. The computer-implemented method of claim 1, wherein at least one portion of the structure carrying horizontal current is divided into rooftop subsections.

10. The computer-implemented method of claim 1, wherein the vertically oriented current distribution is calculated, at least in part, via a matrix inversion.

11. A computer program product stored on a non-transitory computer-readable medium which includes a set of non-transitory computer-readable instructions for simulating a vertically-oriented current distribution of current flowing through a plurality of layers of a three-dimensional structure embedded in a shielded multi-layered dielectric, the instructions comprising the steps of:

dividing the three-dimensional structure embedded in the shielded multi-layered dielectric into a plurality of subsections, wherein at least one portion of the structure having vertically-oriented current is divided into a plurality of rectangular prism subsections arranged in a stacked configuration, each having a first surface disposed perpendicular to a z-axis and a second surface disposed perpendicular to the z-axis;

independently assigning a current in each of the subsections, the independently assigned currents in the plurality of rectangular prism subsections together forming a piecewise linear representation of vertically-oriented current, wherein the independently assigned current in at least one rectangular prism subsection of the plurality of rectangular prism subsections is a vertically oriented current that linearly changes from a first value at the first surface of the rectangular prism subsection to a second value at the second surface of the rectangular prism subsection; wherein the first value is different from the second value;

calculating an induced voltage in each of the plurality of subsections resulting from the electric field created by each independently assigned current, the induced voltage in each of the plurality of subsections representing a transfer impedance or transfer admittance; and calculating the vertically oriented current distribution of current flowing through the plurality of layers of the three-dimensional structure according to the transfer impedance or transfer admittance of each subsection of the plurality of subsections and an assumed voltage across each subsection of the plurality of subsections.

12. The computer program product of claim 11, wherein the assumed voltage is zero except where a voltage source is coupled.

13. The computer program product of claim 11, wherein the assumed voltage is nonzero across each subsection of the plurality of subsections.

14. The computer program product of claim 11, wherein the first value is higher than the second value.

15. The computer program product of claim 11, wherein the first value is lower than the second value.

16. The computer program product of claim 11, wherein the assigned current in a second rectangular prism subsection is vertically oriented current that is constant throughout.

17. The computer program product of claim 11, wherein both the first value and second value are nonzero.

18. The computer program product of claim 11, wherein at least one portion of the structure carrying horizontal current is divided into volume rooftop subsections.

19. The computer program product of claim 11, wherein at least one portion of the structure carrying horizontal current is divided into rooftop subsections.

20. The computer program product of claim 11, wherein the vertically oriented current distribution is calculated, at least in part, via a matrix inversion.

* * * * *